US006301203B1

(12) United States Patent
Maeda et al.

(10) Patent No.: US 6,301,203 B1
(45) Date of Patent: Oct. 9, 2001

(54) APPARATUS AND METHOD FOR REPRODUCING MAIN DATA AND SUB DATA IN SYNCHRONIZATION

(75) Inventors: Yasuaki Maeda, Kanagawa; Hideki Nagashima, Tokyo; Tsutomu Harada, Kanagawa, all of (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 09/414,469

(22) Filed: Oct. 7, 1999

(30) Foreign Application Priority Data

Oct. 8, 1998 (JP) .................................................. 10-286539

(51) Int. Cl.[7] .................................................... G11B 17/22
(52) U.S. Cl. ............................................................... 369/32
(58) Field of Search ......................... 369/32, 47.1, 47.15, 369/53.41, 275.3, 33, 53.2

(56) References Cited

U.S. PATENT DOCUMENTS 5,687,397 * 11/1997 Ohmori ................................. 369/32
5,825,731 * 10/1998 Yokota .................................. 369/48

* cited by examiner

*Primary Examiner*—Tan Dinh
(74) *Attorney, Agent, or Firm*—Frommer Lawrence & Haug LLP.; William S. Frommer; Dexter T. Chang

(57) ABSTRACT

The invention provides a reproduction apparatus and method by which main data and sub data for modifying the main data can be reproduced in synchronism with each other readily by simple operation. Main data and sub data which are being reproduced in synchronism with the main data are searched in response to a searching operation of a user based on main data management information to be used for management of the main data or sub data management information to be used for management of the sub data to find out data to be reproduced in a unit of main data or sub data.

14 Claims, 31 Drawing Sheets

DIGITAL I/F
Din
Dout
Ain
A/D
D/A
OUTPUT PROCESSING
Aout
HPout
AUDIO COMPRESSION ENCODER-DECODER
RAM
MEMORY CONTROLLER
JPEG DECODER
I/F
SYSTEM CONTROLLER (CPU)
DISPLAY SECTION
OPERATION SECTION
EFM/ACIRC ENCODER-DECODER
MAGNETIC HEAD DRIVE
ADDRESS DECODER
GFM
RF AMPLIFIER
RF
TE, FE
SERVO CIRCUIT
OPTICAL HEAD
SLED
1
2
3
3a
4
5
6
6a
7
8
9
10
11
12
13
14
15
16
17
18
19
20
21
22
23
24
25
26
27
90

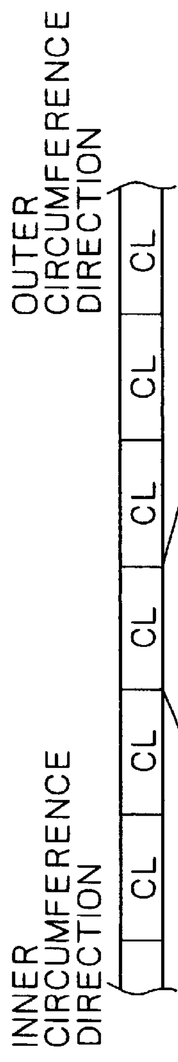
FIG.2A
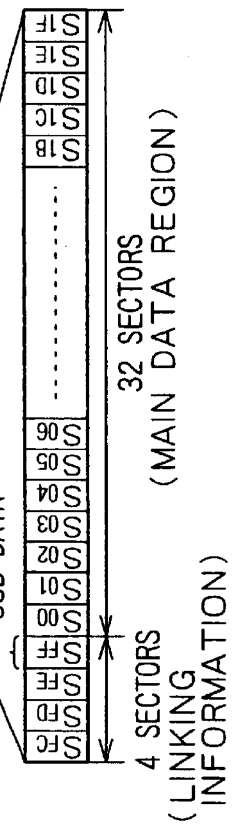
FIG.2B
FIG.2C
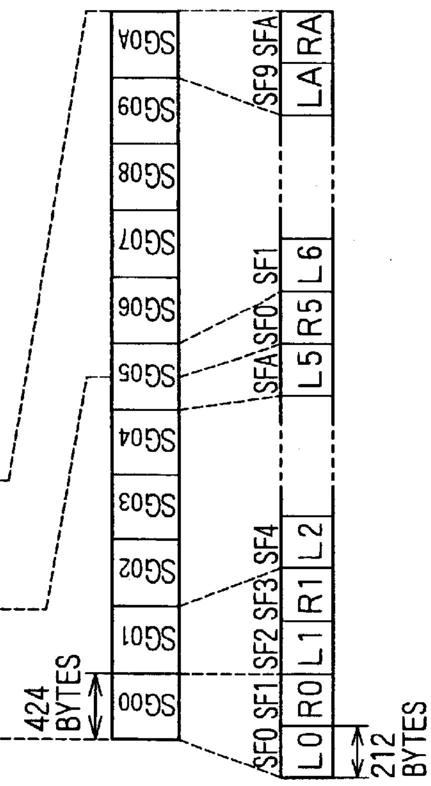
FIG.2D
FIG.2E

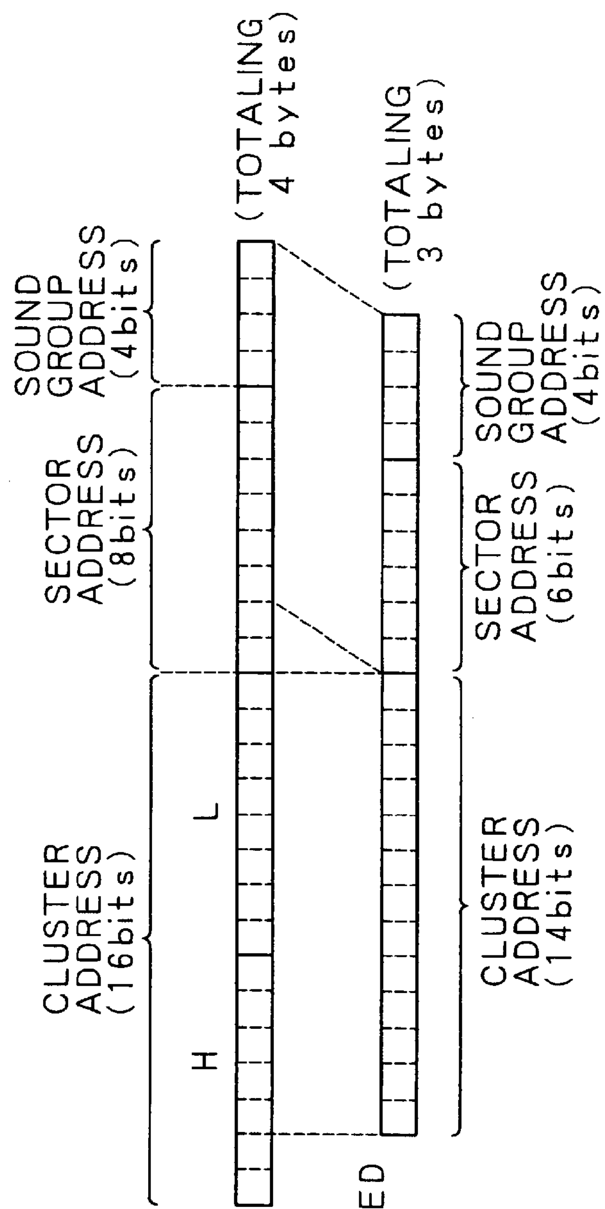
FIG.3A
FIG.3B
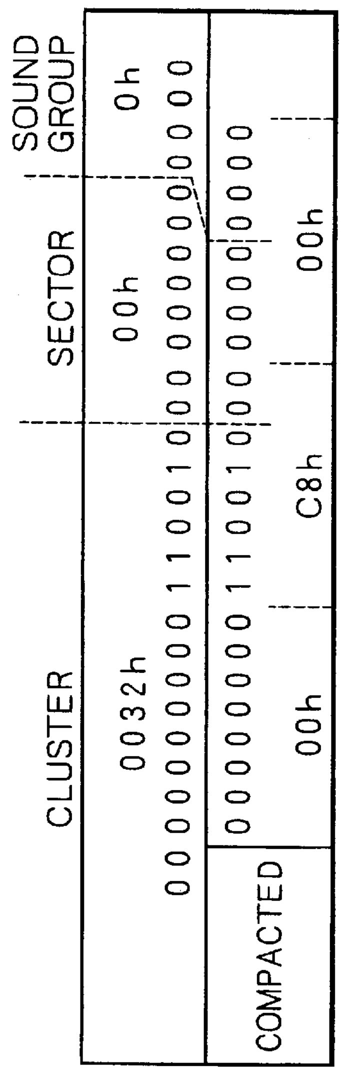
FIG.4A
FIG.4B

FIG. 4C

| 0032h | 04h | 0h |
| --- | --- | --- |
| 0 0 0 0 0 0 0 0 0 0 1 1 0 0 1 0 | 0 0 0 0 0 1 0 0 | 0 0 0 0 |

FIG. 4D

| COMPACTED ABSOLUTE ADDRESS | 0 0 0 0 0 0 0 0 1 1 0 0 1 0 \| 0 0 0 1 0 0 \| 0 0 0 0 | | |
| --- | --- | --- | --- |
| | 00h | C8h | 40h |

FIG. 4E

| COMPACTED OFFSET ADDRESS | 0 0 0 0 0 0 0 0 0 0 0 0 0 0 \| 0 0 0 1 0 0 \| 0 0 0 0 | | |
| --- | --- | --- | --- |
| | 00h | 00h | 40h |

FIG. 4F

| 0032h | 13h | 9h |
| --- | --- | --- |
| 0 0 0 0 0 0 0 0 0 0 1 1 0 0 1 0 | 0 0 0 1 0 0 1 1 | 1 0 0 1 |

FIG. 4G

| COMPACTED ABSOLUTE ADDRESS | 0 0 0 0 0 0 0 0 1 1 0 0 1 0 \| 1 0 0 0 1 1 \| 1 0 0 1 | | |
| --- | --- | --- | --- |
| | 00h | C9h | 39h |

FIG. 4H

| COMPACTED OFFSET ADDRESS | 0 0 0 0 0 0 0 0 0 0 0 0 0 0 \| 0 1 0 0 1 1 \| 1 0 0 1 | | |
| --- | --- | --- | --- |
| | 00h | 01h | 39h |

FIG. 6

| | 16bits | | 16bits | | |
|---|---|---|---|---|---|
| | MSB LSB | MSB LSB | MSB LSB | MSB LSB | |
| HEADER | 00000000 | 11111111 | 11111111 | 11111111 | 0 |
| | 11111111 | 11111111 | 11111111 | 11111111 | 1 |
| | 11111111 | 11111111 | 11111111 | 00000000 | 2 |
| | ClusterH | ClusterL | Sector (00h) | MODE (02h) | 3 |
| | 00000000 | 00000000 | 00000000 | 00000000 | 4 |
| | 00000000 | 00000000 | 00000000 | 00000000 | 5 |
| | 00000000 | 00000000 | 00000000 | 00000000 | 6 |
| | Maker code | Model code | First TNO | Last TNO | 7 |
| | 00000000 | 00000000 | 00000000 | Used Sectors | 8 |
| | 00000000 | 00000000 | 00000000 | 00000000 | 9 |
| | 00000000 | 00000000 | 00000000 | Disc Serial No | 10 |
| POINTER SECTION | Disc | ID | P-DFA | P-EMPTY | 11 |
| | P-FRA | P-TN01 | P-TN02 | P-TN03 | 12 |
| | P-TN04 | P-TN05 | P-TN06 | P-TN07 | 13 |
| | P-TN0248 | P-TN0249 | P-TN0250 | P-TN0251 | 74 |
| | P-TN0252 | P-TN0253 | P-TN0254 | P-TN0255 | 75 |
| | 00000000 | 00000000 | 00000000 | 00000000 | 76 |
| | 00000000 | 00000000 | 00000000 | 00000000 | 77 |
| TABLE SECTION (255 PART TABLES) (01h) | Start address | (TRACK ADDRESS) | | TRACK MODE | 78 |
| | End address | | | LINK INFORMATION | 79 |
| (02h) | Start address | (TRACK ADDRESS) | | TRACK MODE | 80 |
| | End address | | | LINK INFORMATION | 81 |
| (03h) | Start address | (TRACK ADDRESS) | | TRACK MODE | 82 |
| | End address | | | LINK INFORMATION | 83 |
| (FCh) | Start address | (TRACK ADDRESS) | | TRACK MODE | 580 |
| | End address | | | LINK INFORMATION | 581 |
| (FDh) | Start address | (TRACK ADDRESS) | | TRACK MODE | 582 |
| | End address | | | LINK INFORMATION | 583 |
| (FEh) | Start address | (TRACK ADDRESS) | | TRACK MODE | 584 |
| | End address | | | LINK INFORMATION | 585 |
| (FFh) | Start address | (TRACK ADDRESS) | | TRACK MODE | 586 |
| | End address | | | LINK INFORMATION | 587 |

U-TOC SECTOR 0

FIG. 8

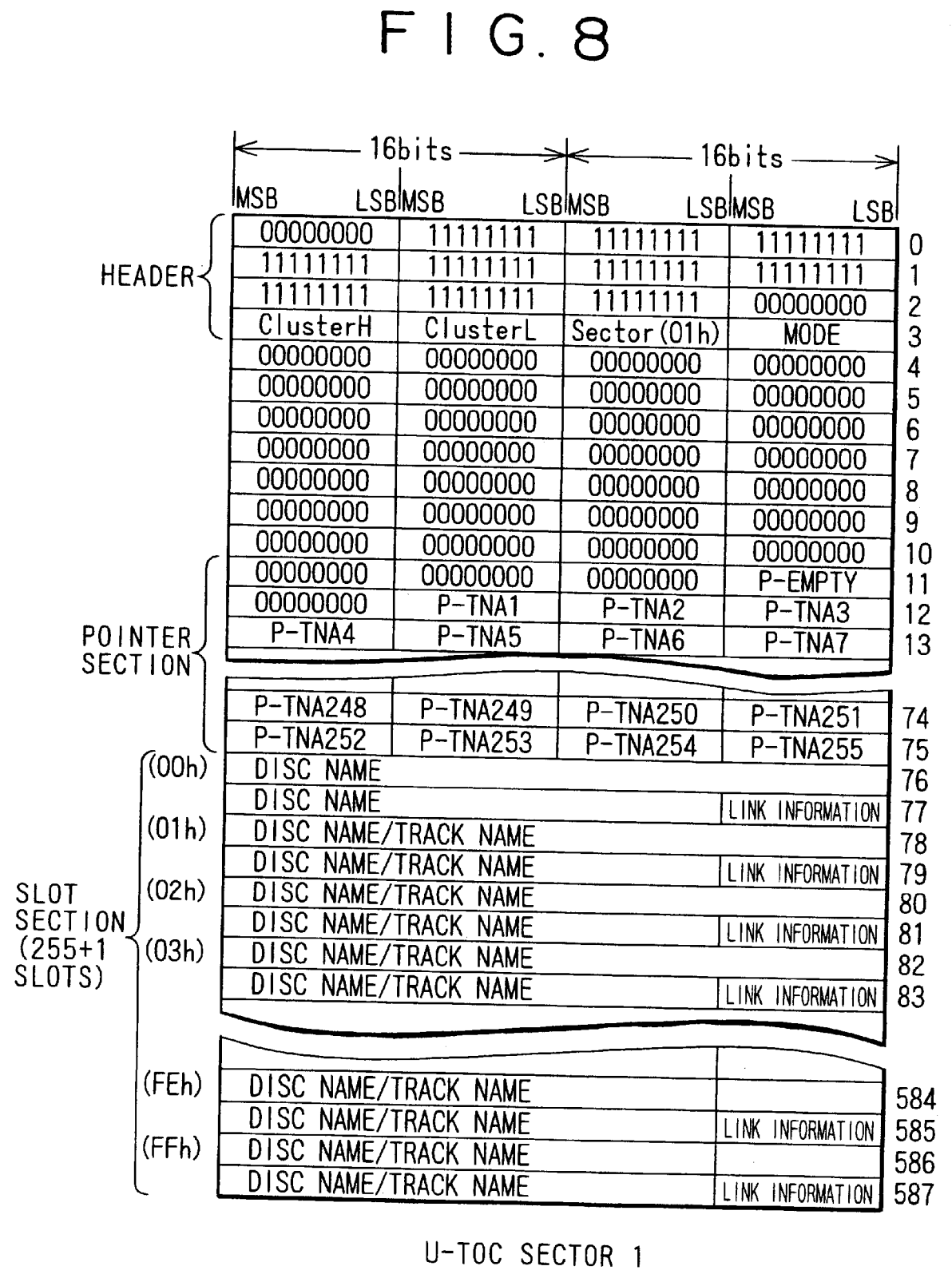

| Section | Slot | 16bits MSB–LSB | MSB–LSB | 16bits MSB–LSB | MSB–LSB | Row |
|---|---|---|---|---|---|---|
| HEADER | | 00000000 | 11111111 | 11111111 | 11111111 | 0 |
| HEADER | | 11111111 | 11111111 | 11111111 | 11111111 | 1 |
| HEADER | | 11111111 | 11111111 | 11111111 | 00000000 | 2 |
| HEADER | | ClusterH | ClusterL | Sector (01h) | MODE | 3 |
| | | 00000000 | 00000000 | 00000000 | 00000000 | 4 |
| | | 00000000 | 00000000 | 00000000 | 00000000 | 5 |
| | | 00000000 | 00000000 | 00000000 | 00000000 | 6 |
| | | 00000000 | 00000000 | 00000000 | 00000000 | 7 |
| | | 00000000 | 00000000 | 00000000 | 00000000 | 8 |
| | | 00000000 | 00000000 | 00000000 | 00000000 | 9 |
| | | 00000000 | 00000000 | 00000000 | 00000000 | 10 |
| POINTER SECTION | | 00000000 | 00000000 | 00000000 | P-EMPTY | 11 |
| POINTER SECTION | | 00000000 | P-TNA1 | P-TNA2 | P-TNA3 | 12 |
| POINTER SECTION | | P-TNA4 | P-TNA5 | P-TNA6 | P-TNA7 | 13 |
| POINTER SECTION | | P-TNA248 | P-TNA249 | P-TNA250 | P-TNA251 | 74 |
| POINTER SECTION | | P-TNA252 | P-TNA253 | P-TNA254 | P-TNA255 | 75 |
| SLOT SECTION (255+1 SLOTS) | (00h) | DISC NAME | | | | 76 |
| SLOT SECTION (255+1 SLOTS) | | DISC NAME | | | LINK INFORMATION | 77 |
| SLOT SECTION (255+1 SLOTS) | (01h) | DISC NAME/TRACK NAME | | | | 78 |
| SLOT SECTION (255+1 SLOTS) | | DISC NAME/TRACK NAME | | | LINK INFORMATION | 79 |
| SLOT SECTION (255+1 SLOTS) | (02h) | DISC NAME/TRACK NAME | | | | 80 |
| SLOT SECTION (255+1 SLOTS) | | DISC NAME/TRACK NAME | | | LINK INFORMATION | 81 |
| SLOT SECTION (255+1 SLOTS) | (03h) | DISC NAME/TRACK NAME | | | | 82 |
| SLOT SECTION (255+1 SLOTS) | | DISC NAME/TRACK NAME | | | LINK INFORMATION | 83 |
| SLOT SECTION (255+1 SLOTS) | (FEh) | DISC NAME/TRACK NAME | | | | 584 |
| SLOT SECTION (255+1 SLOTS) | | DISC NAME/TRACK NAME | | | LINK INFORMATION | 585 |
| SLOT SECTION (255+1 SLOTS) | (FFh) | DISC NAME/TRACK NAME | | | | 586 |
| SLOT SECTION (255+1 SLOTS) | | DISC NAME/TRACK NAME | | | LINK INFORMATION | 587 |

U-TOC SECTOR 1

FIG. 9

| Section | Slot | MSB … LSB (16bits) | MSB … LSB (16bits) | MSB … LSB (16bits) | MSB … LSB (16bits) | Row |
|---|---|---|---|---|---|---|
| HEADER | | 00000000 | 11111111 | 11111111 | 11111111 | 0 |
| HEADER | | 11111111 | 11111111 | 11111111 | 11111111 | 1 |
| HEADER | | 11111111 | 11111111 | 11111111 | 00000000 | 2 |
| HEADER | | ClusterH | ClusterL | Sector (02h) | MODE | 3 |
| | | 00000000 | 00000000 | 00000000 | 00000000 | 4 |
| | | 00000000 | 00000000 | 00000000 | 00000000 | 5 |
| | | 00000000 | 00000000 | 00000000 | 00000000 | 6 |
| | | 00000000 | 00000000 | 00000000 | 00000000 | 7 |
| | | 00000000 | 00000000 | 00000000 | 00000000 | 8 |
| | | 00000000 | 00000000 | 00000000 | 00000000 | 9 |
| | | 00000000 | 00000000 | 00000000 | 00000000 | 10 |
| POINTER SECTION | | 00000000 | 00000000 | 00000000 | P-EMPTY | 11 |
| POINTER SECTION | | 00000000 | P-TRD1 | P-TRD2 | P-TRD3 | 12 |
| POINTER SECTION | | P-TRD4 | P-TRD5 | P-TRD6 | P-TRD7 | 13 |
| POINTER SECTION | | P-TRD248 | P-TRD249 | P-TRD250 | P-TRD251 | 74 |
| POINTER SECTION | | P-TRD252 | P-TRD253 | P-TRD254 | P-TRD255 | 75 |
| SLOT SECTION 255+1 SLOTS | (00h) | DISC RECORDING DATE/TIME | | | | 76 |
| SLOT SECTION 255+1 SLOTS | | | | MAKER CODE | MODEL CODE | 77 |
| SLOT SECTION 255+1 SLOTS | (01h) | DISC RECORDING DATE/TIME | | | | 78 |
| SLOT SECTION 255+1 SLOTS | | | | MAKER CODE | MODEL CODE | 79 |
| SLOT SECTION 255+1 SLOTS | (02h) | DISC RECORDING DATE/TIME | | | | 80 |
| SLOT SECTION 255+1 SLOTS | | | | MAKER CODE | MODEL CODE | 81 |
| SLOT SECTION 255+1 SLOTS | (03h) | DISC RECORDING DATE/TIME | | | | 82 |
| SLOT SECTION 255+1 SLOTS | | | | MAKER CODE | MODEL CODE | 83 |
| SLOT SECTION 255+1 SLOTS | (FEh) | DISC RECORDING DATE/TIME | | | | 584 |
| SLOT SECTION 255+1 SLOTS | | | | MAKER CODE | LINK INFORMATION | 585 |
| SLOT SECTION 255+1 SLOTS | (FFh) | DISC RECORDING DATE/TIME | | | | 586 |
| SLOT SECTION 255+1 SLOTS | | | | MAKER CODE | LINK INFORMATION | 587 |

U-TOC SECTOR 2

U-TOC SECTOR 4

FIG. 11

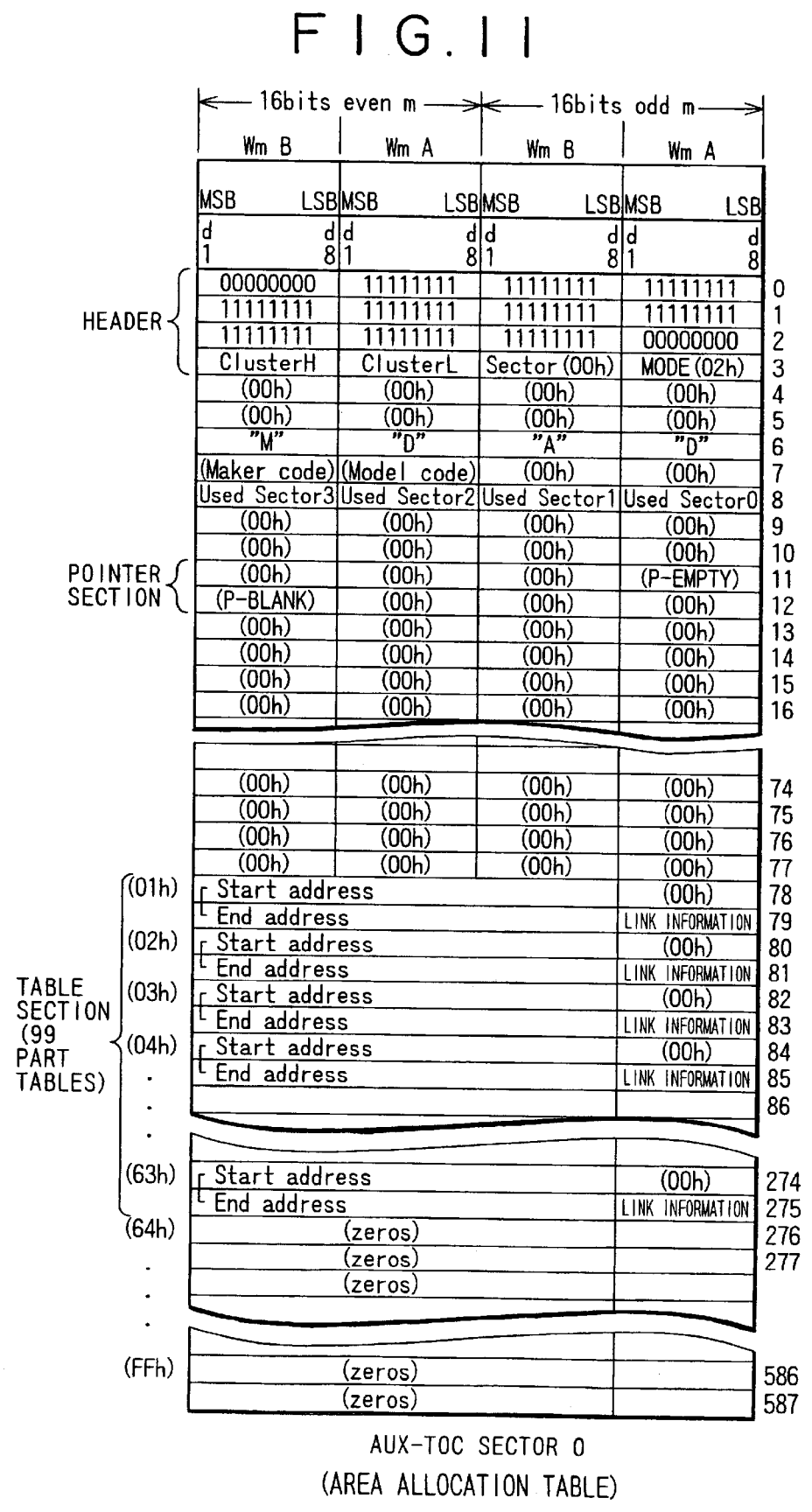

| | 16bits even m | | 16bits odd m | | |
|---|---|---|---|---|---|
| | Wm B | Wm A | Wm B | Wm A | |
| | MSB d1 … LSB d8 | MSB d1 … LSB d8 | MSB d1 … LSB d8 | MSB d1 … LSB d8 | |
| HEADER | 00000000 | 11111111 | 11111111 | 11111111 | 0 |
| HEADER | 11111111 | 11111111 | 11111111 | 11111111 | 1 |
| HEADER | 11111111 | 11111111 | 11111111 | 00000000 | 2 |
| HEADER | ClusterH | ClusterL | Sector (00h) | MODE (02h) | 3 |
| | (00h) | (00h) | (00h) | (00h) | 4 |
| | (00h) | (00h) | (00h) | (00h) | 5 |
| | "M" | "D" | "A" | "D" | 6 |
| | (Maker code) | (Model code) | (00h) | (00h) | 7 |
| | Used Sector3 | Used Sector2 | Used Sector1 | Used Sector0 | 8 |
| | (00h) | (00h) | (00h) | (00h) | 9 |
| | (00h) | (00h) | (00h) | (00h) | 10 |
| POINTER SECTION | (00h) | (00h) | (00h) | (P-EMPTY) | 11 |
| POINTER SECTION | (P-BLANK) | (00h) | (00h) | (00h) | 12 |
| | (00h) | (00h) | (00h) | (00h) | 13 |
| | (00h) | (00h) | (00h) | (00h) | 14 |
| | (00h) | (00h) | (00h) | (00h) | 15 |
| | (00h) | (00h) | (00h) | (00h) | 16 |
| | | | | | |
| | (00h) | (00h) | (00h) | (00h) | 74 |
| | (00h) | (00h) | (00h) | (00h) | 75 |
| | (00h) | (00h) | (00h) | (00h) | 76 |
| | (00h) | (00h) | (00h) | (00h) | 77 |
| TABLE SECTION (99 PART TABLES) (01h) | Start address | | | (00h) | 78 |
| | End address | | | LINK INFORMATION | 79 |
| (02h) | Start address | | | (00h) | 80 |
| | End address | | | LINK INFORMATION | 81 |
| (03h) | Start address | | | (00h) | 82 |
| | End address | | | LINK INFORMATION | 83 |
| (04h) | Start address | | | (00h) | 84 |
| | End address | | | LINK INFORMATION | 85 |
| ⋮ | | | | | 86 |
| (63h) | Start address | | | (00h) | 274 |
| | End address | | | LINK INFORMATION | 275 |
| (64h) | (zeros) | | | | 276 |
| ⋮ | (zeros) | | | | 277 |
| | (zeros) | | | | |
| (FFh) | (zeros) | | | | 586 |
| | (zeros) | | | | 587 |

AUX-TOC SECTOR 0
(AREA ALLOCATION TABLE)

FIG. 12

| Section | Part | 16bits even m: Wm B (MSB d1 … LSB d8) | 16bits even m: Wm A (MSB d1 … LSB d8) | 16bits odd m: Wm B (MSB d1 … LSB d8) | 16bits odd m: Wm A (MSB d1 … LSB d8) | Row |
|---|---|---|---|---|---|---|
| HEADER | | 00000000 | 11111111 | 11111111 | 11111111 | 0 |
| HEADER | | 11111111 | 11111111 | 11111111 | 11111111 | 1 |
| HEADER | | 11111111 | 11111111 | 11111111 | 00000000 | 2 |
| HEADER | | ClusterH | ClusterL | Sector (01h) | MODE (02h) | 3 |
| | | (00h) | (00h) | (00h) | (00h) | 4 |
| | | (00h) | (00h) | (00h) | (00h) | 5 |
| | | "M" | "D" | "A" | "D" | 6 |
| | | (Maker code) | (Model code) | First PNO | Last PNO | 7 |
| | | (00h) | (00h) | (00h) | (00h) | 8 |
| | | (00h) | (00h) | (00h) | (00h) | 9 |
| | | (00h) | (00h) | (00h) | (00h) | 10 |
| POINTER SECTION | | (00h) | (00h) | (00h) | (P-EMPTY) | 11 |
| POINTER SECTION | | (P-PFRA) | P-PN01 | P-PN02 | P-PN03 | 12 |
| POINTER SECTION | | P-PN04 | P-PN05 | P-PN06 | P-PN07 | 13 |
| POINTER SECTION | | | | | | |
| POINTER SECTION | | P-PN092 | P-PN093 | P-PN094 | P-PN095 | 35 |
| POINTER SECTION | | P-PN096 | P-PN097 | P-PN098 | P-PN099 | 36 |
| | | (00h) | (00h) | (00h) | (00h) | 37 |
| | | | | | | |
| | | (00h) | (00h) | (00h) | (00h) | 74 |
| | | (00h) | (00h) | (00h) | (P-PN0255) | 75 |
| TABLE SECTION (99+1 PART TABLES) | (00h) | Start address (cover picture) | | | S.Pict.MODE | 76 |
| TABLE SECTION (99+1 PART TABLES) | | End address | | | (00h) | 77 |
| TABLE SECTION (99+1 PART TABLES) | (01h) | Start address | | | S.Pict.MODE | 78 |
| TABLE SECTION (99+1 PART TABLES) | | End address | | | (00h) | 79 |
| TABLE SECTION (99+1 PART TABLES) | (02h) | Start address | | | S.Pict.MODE | 80 |
| TABLE SECTION (99+1 PART TABLES) | | End address | | | (00h) | 81 |
| TABLE SECTION (99+1 PART TABLES) | (03h) | Start address | | | S.Pict.MODE | 82 |
| TABLE SECTION (99+1 PART TABLES) | | End address | | | (00h) | 83 |
| TABLE SECTION (99+1 PART TABLES) | (04h) | Start address | | | S.Pict.MODE | 84 |
| TABLE SECTION (99+1 PART TABLES) | | End address | | | (00h) | 85 |
| TABLE SECTION (99+1 PART TABLES) | . . . | | | | | 86 |
| TABLE SECTION (99+1 PART TABLES) | (63h) | Start address | | | (00h) | 274 |
| TABLE SECTION (99+1 PART TABLES) | | End address | | | LINK INFORMATION | 275 |
| | (64h) | (zeros) | | | | 276 |
| | | (zeros) | | | | 277 |
| | . . . | (zeros) | | | | |
| | (FFh) | (zeros) | | | | 586 |
| | | (zeros) | | | | 587 |

AUX-TOC SECTOR 1
(PICTRE ALLOCATION TABLE)

FIG. 13

| | 16bits even m | | 16bits odd m | | |
|---|---|---|---|---|---|
| | Wm B | Wm A | Wm B | Wm A | |
| | MSB d1 … LSB d8 | MSB d1 … LSB d8 | MSB d1 … LSB d8 | MSB d1 … LSB d8 | |
| HEADER | 00000000 | 11111111 | 11111111 | 11111111 | 0 |
| | 11111111 | 11111111 | 11111111 | 11111111 | 1 |
| | 11111111 | 11111111 | 11111111 | 00000000 | 2 |
| | ClusterH | ClusterL | Sector (02h) | MODE (02h) | 3 |
| | (00h) | (00h) | (00h) | (00h) | 4 |
| | (00h) | (00h) | (00h) | (00h) | 5 |
| | "M" | "D" | "A" | "D" | 6 |
| | (Maker code) | (Model code) | First PIF | Last PIF | 7 |
| | (00h) | (00h) | (00h) | (00h) | 8 |
| | (00h) | (00h) | (00h) | (00h) | 9 |
| | (00h) | (00h) | (00h) | char. code | 10 |
| POINTER SECTION | (00h) | (00h) | (00h) | (P-EMPTY) | 11 |
| | (00h) | P-PIF1 | P-PIF2 | P-PIF3 | 12 |
| | P-PIF4 | P-PIF5 | P-PIF6 | P-PIF7 | 13 |
| | P-PIF92 | P-PIF93 | P-PIF94 | P-PIF95 | 35 |
| | P-PIF96 | P-PIF97 | P-PIF98 | P-PIF99 | 36 |
| | (00h) | (00h) | (00h) | (00h) | 37 |
| | (00h) | (00h) | (00h) | (00h) | 74 |
| | (00h) | (00h) | (00h) | (P-PIF255) | 75 |
| TABLE SECTION (255+1 SLOTS) (00h) | Cover Picture information | | | | 76 |
| | Cover Picture information | | | LINK INFORMATION | 77 |
| (01h) | Cover Picture or still Picture information | | | | 78 |
| | Cover Picture or still Picture information | | | LINK INFORMATION | 79 |
| (02h) | Cover Picture or still Picture information | | | | 80 |
| | Cover Picture or still Picture information | | | LINK INFORMATION | 81 |
| (03h) | Cover Picture or still Picture information | | | | 82 |
| | Cover Picture or still Picture information | | | LINK INFORMATION | 83 |
| (04h) | Cover Picture or still Picture information | | | | 84 |
| | Cover Picture or still Picture information | | | LINK INFORMATION | 85 |
| | | | | | 86 |
| (63h) | Cover Picture or still Picture information | | | | 274 |
| | Cover Picture or still Picture information | | | LINK INFORMATION | 275 |
| (64h) | Cover Picture or still Picture information | | | | 276 |
| | Cover Picture or still Picture information | | | LINK INFORMATION | 277 |
| (FFh) | Cover Picture or still Picture information | | | | 586 |
| | Cover Picture or still Picture information | | | LINK INFORMATION | 587 |

AUX-TOC SECTOR 2
(PICTURE INFORMATION TABLE)

FIG. 14

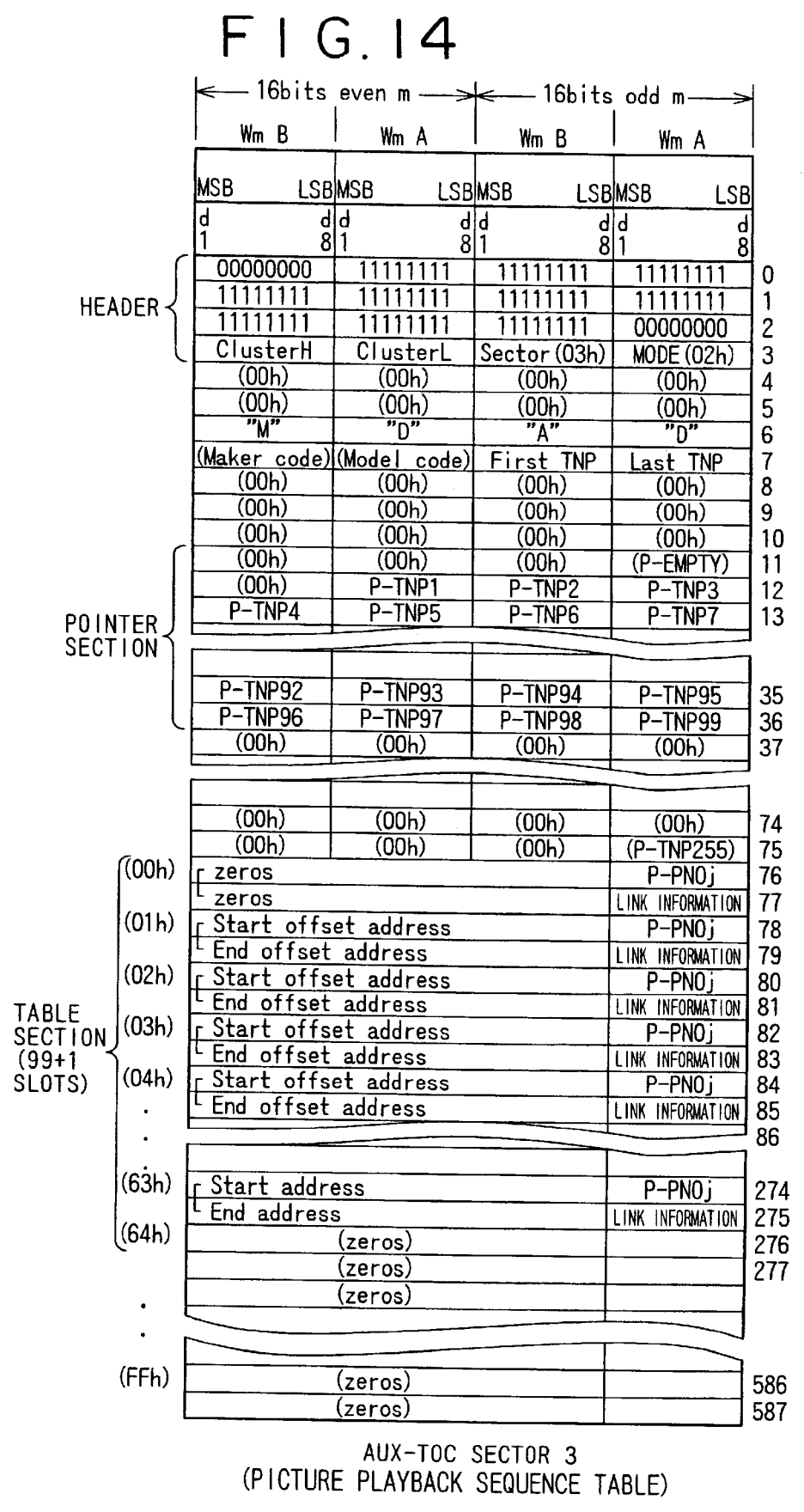

| Section | 16bits even m: Wm B (MSB d1 … LSB d8) | 16bits even m: Wm A (MSB d1 … LSB d8) | 16bits odd m: Wm B (MSB d1 … LSB d8) | 16bits odd m: Wm A (MSB d1 … LSB d8) | Row |
|---|---|---|---|---|---|
| HEADER | 00000000 | 11111111 | 11111111 | 11111111 | 0 |
| HEADER | 11111111 | 11111111 | 11111111 | 11111111 | 1 |
| HEADER | 11111111 | 11111111 | 11111111 | 00000000 | 2 |
| HEADER | ClusterH | ClusterL | Sector (03h) | MODE (02h) | 3 |
| | (00h) | (00h) | (00h) | (00h) | 4 |
| | (00h) | (00h) | (00h) | (00h) | 5 |
| | "M" | "D" | "A" | "D" | 6 |
| | (Maker code) | (Model code) | First TNP | Last TNP | 7 |
| | (00h) | (00h) | (00h) | (00h) | 8 |
| | (00h) | (00h) | (00h) | (00h) | 9 |
| | (00h) | (00h) | (00h) | (00h) | 10 |
| POINTER SECTION | (00h) | (00h) | (00h) | (P-EMPTY) | 11 |
| POINTER SECTION | (00h) | P-TNP1 | P-TNP2 | P-TNP3 | 12 |
| POINTER SECTION | P-TNP4 | P-TNP5 | P-TNP6 | P-TNP7 | 13 |
| POINTER SECTION | P-TNP92 | P-TNP93 | P-TNP94 | P-TNP95 | 35 |
| POINTER SECTION | P-TNP96 | P-TNP97 | P-TNP98 | P-TNP99 | 36 |
| | (00h) | (00h) | (00h) | (00h) | 37 |
| | (00h) | (00h) | (00h) | (00h) | 74 |
| | (00h) | (00h) | (00h) | (P-TNP255) | 75 |
| TABLE SECTION (99+1 SLOTS) (00h) | zeros | | | P-PNOj | 76 |
| | zeros | | | LINK INFORMATION | 77 |
| (01h) | Start offset address | | | P-PNOj | 78 |
| | End offset address | | | LINK INFORMATION | 79 |
| (02h) | Start offset address | | | P-PNOj | 80 |
| | End offset address | | | LINK INFORMATION | 81 |
| (03h) | Start offset address | | | P-PNOj | 82 |
| | End offset address | | | LINK INFORMATION | 83 |
| (04h) | Start offset address | | | P-PNOj | 84 |
| | End offset address | | | LINK INFORMATION | 85 |
| ⋮ | | | | | 86 |
| (63h) | Start address | | | P-PNOj | 274 |
| | End address | | | LINK INFORMATION | 275 |
| (64h) | (zeros) | | | | 276 |
| | (zeros) | | | | 277 |
| | (zeros) | | | | |
| ⋮ | | | | | |
| (FFh) | (zeros) | | | | 586 |
| | (zeros) | | | | 587 |

AUX-TOC SECTOR 3
(PICTURE PLAYBACK SEQUENCE TABLE)

FIG. 15

| | 16bits even m: Wm B (MSB d1 … LSB d8) | Wm A (MSB d1 … LSB d8) | 16bits odd m: Wm B (MSB d1 … LSB d8) | Wm A (MSB d1 … LSB d8) | |
|---|---|---|---|---|---|
| HEADER | 00000000 | 11111111 | 11111111 | 11111111 | 0 |
| HEADER | 11111111 | 11111111 | 11111111 | 11111111 | 1 |
| HEADER | 11111111 | 11111111 | 11111111 | 00000000 | 2 |
| HEADER | ClusterH | ClusterL | Sector (04h) | MODE (02h) | 3 |
| | (00h) | (00h) | (00h) | (00h) | 4 |
| | (00h) | (00h) | (00h) | (00h) | 5 |
| | "M" | "D" | "A" | "D" | 6 |
| | (Maker code) | (Model code) | First TXNO | Last TXNO | 7 |
| | (00h) | (00h) | (00h) | (00h) | 8 |
| | (00h) | (00h) | (00h) | (00h) | 9 |
| | (00h) | (00h) | (00h) | (00h) | 10 |
| POINTER SECTION | (00h) | (00h) | (00h) | (P-EMPTY) | 11 |
| POINTER SECTION | (P-PFRA) | P-TXN01 | P-TXN02 | P-TXN03 | 12 |
| POINTER SECTION | P-TXN04 | P-TXN05 | P-TXN06 | P-TXN07 | 13 |
| POINTER SECTION | | | | | |
| POINTER SECTION | P-TXN092 | P-TXN093 | P-TXN094 | P-TXN095 | 35 |
| POINTER SECTION | P-TXN096 | P-TXN097 | P-TXN098 | P-TXN099 | 36 |
| | (00h) | (00h) | (00h) | (00h) | 37 |
| | | | | | |
| | (00h) | (00h) | (00h) | (00h) | 74 |
| | (00h) | (00h) | (00h) | (P-TXN0255) | 75 |
| TABLE SECTION (99+1 PART TABLES) (00h) | Start address (cover text) | | | Text MODE | 76 |
| | End address | | | LINK INFORMATION | 77 |
| (01h) | Start address | | | Text MODE | 78 |
| | End address | | | LINK INFORMATION | 79 |
| (02h) | Start address | | | Text MODE | 80 |
| | End address | | | LINK INFORMATION | 81 |
| (03h) | Start address | | | Text MODE | 82 |
| | End address | | | LINK INFORMATION | 83 |
| (04h) | Start address | | | Text MODE | 84 |
| | End address | | | LINK INFORMATION | 85 |
| . | | | | | 86 |
| . | | | | | |
| (63h) | Start address | | | Text MODE | 274 |
| | End address | | | LINK INFORMATION | 275 |
| (64h) | (zeros) | | | | 276 |
| | (zeros) | | | | 277 |
| | (zeros) | | | | |
| . | | | | | |
| (FFh) | (zeros) | | | | 586 |
| | (zeros) | | | | 587 |

AUX-TOC SECTOR 4
(TEXT ALLOCATION TABLE)

FIG. 16

| | 16bits even m | | 16bits odd m | | |
|---|---|---|---|---|---|
| | Wm B | Wm A | Wm B | Wm A | |
| | MSB d1 … LSB d8 | MSB d1 … LSB d8 | MSB d1 … LSB d8 | MSB d1 … LSB d8 | |
| HEADER | 00000000 | 11111111 | 11111111 | 11111111 | 0 |
| HEADER | 11111111 | 11111111 | 11111111 | 11111111 | 1 |
| HEADER | 11111111 | 11111111 | 11111111 | 00000000 | 2 |
| HEADER | ClusterH | ClusterL | Sector (05h) | MODE (02h) | 3 |
| | (00h) | (00h) | (00h) | (00h) | 4 |
| | (00h) | (00h) | (00h) | (00h) | 5 |
| | "M" | "D" | "A" | "D" | 6 |
| | (Maker code) | (Model code) | First TXIF | Last TXIF | 7 |
| | (00h) | (00h) | (00h) | (00h) | 8 |
| | (00h) | (00h) | (00h) | (00h) | 9 |
| | (00h) | (00h) | (00h) | char. code | 10 |
| POINTER SECTION | (00h) | (00h) | (00h) | (P-EMPTY) | 11 |
| POINTER SECTION | (00h) | P-TXIF1 | P-TXIF2 | P-TXIF3 | 12 |
| POINTER SECTION | P-TXIF4 | P-TXIF5 | P-TXIF6 | P-TXIF7 | 13 |
| POINTER SECTION | P-TXIF92 | P-TXIF93 | P-TXIF94 | P-TXIF95 | 35 |
| POINTER SECTION | P-TXIF96 | P-TXIF97 | P-TXIF98 | P-TXIF99 | 36 |
| | (00h) | (00h) | (00h) | (00h) | 37 |
| | (00h) | (00h) | (00h) | (00h) | 74 |
| | (00h) | (00h) | (00h) | (P-TXIF255) | 75 |
| TABLE SECTION (255+1 SLOTS) (00h) | Cover text information | | | | 76 |
| | Cover text information | | | LINK INFORMATION | 77 |
| (01h) | Cover text or text information | | | | 78 |
| | Cover text or text information | | | LINK INFORMATION | 79 |
| (02h) | Cover text or text information | | | | 80 |
| | Cover text or text information | | | LINK INFORMATION | 81 |
| (03h) | Cover text or text information | | | | 82 |
| | Cover text or text information | | | LINK INFORMATION | 83 |
| (04h) | Cover text or text information | | | | 84 |
| | Cover text or text information | | | LINK INFORMATION | 85 |
| ⋮ | | | | | 86 |
| (63h) | Cover text or text information | | | | 274 |
| | Cover text or text information | | | LINK INFORMATION | 275 |
| (64h) | Cover text or text information | | | | 276 |
| | Cover text or text information | | | LINK INFORMATION | 277 |
| ⋮ | | | | | |
| (FFh) | Cover text or text information | | | | 586 |
| | Cover text or text information | | | LINK INFORMATION | 587 |

AUX-TOC SECTOR 5
(TEXT INFORMATION TABLE)

PICTURE FILE SECTOR

TEXT FILE SECTOR

FIG. 19A

| | | |
|---|---|---|
| d1–d2 (COPY STATUS) | 0h | COPY PERMITTED |
| | 1h | COPY PERMITTED ONLY ONCE |
| | 2h | COPY PERMITTED ONLY ONCE THROUGH AUTHENTICATED BUS (COPY INHIBITED THROUGH BUS NOT AUTHENTICATED) |
| | 3h | COPY INHIBITED |
| d3 ～ d8 | Reserved(UNDEFINED) | |

S. Pict. MODE (COPY STATUS)

FIG. 19B

| | BEFORE COPY | AFTER COPY |
|---|---|---|
| COPY STATUS | 0h (COPY PERMITTED) | 0h (COPY PERMITTED) |
| | 1h (COPY PERMITTED ONLY ONCE) | 3h (COPY INHIBITED) |
| | 2h (COPY PERMITTED ONLY ONCE THROUGH AUTHENTICATED BUS) | 3h (COPY INHIBITED) |
| | 3h (COPY INHIBITED) | — |

COPY STATUS UPDATING TABLE

DATA STRUCTURE OF PICTURE (TEXT) INFORMATION FILE

FIG. 21

| | | |
|---|---|---|
| d1–d2 (COPY STATUS) | 0h | COPY PERMITTED |
| | 1h | COPY PERMITTED ONLY ONCE |
| | 2h | COPY PERMITTED ONLY ONCE THROUGH AUTHENTICATED BUS (COPY INHIBITED THROUGH BUS NOT AUTHENTICATED) |
| | 3h | COPY INHIBITED |
| d3–d4 | 0h | sung text |
| | 1h | ARTIST INFORMATION |
| | 2h | LINER NOTE |
| | 3h | OTHERS |
| d5 | 0 | TIME STAMP ABSENT |
| | 1 | TIME STAMP PRESENT |
| d6–d8 | 0h | ASCII |
| | 1h | modified ISO 8859-1 |
| | 2h | Music Shifted JIS |
| | 3h | KS C 5601-1989 |
| | 4h | GB2312-80 |
| | 5h | reserved |
| | 6h | reserved |
| | 7h | plain text |

Text MODE

1Eh
TIME STAMP
(offset address (3bytes pure binary)
PARAGRAPH LENGTH(3bytes pure binary)
1Fh
PARAGRAPH
TEXT
FILE FIG.23A TRACK (AUDIO DATA)
FIG.23B AUDIO DATA ADDRESS
FIG.23C REPRODUCTION TIME
FIG.23D DISPLAY PICTURE
FIG.23E PICTURE PLAYBACK ADDRESS
TR#1
TR#2
TR#3
PART a
PART b
PART c
PART d
PART e
La
La+L1
La+L2
Lb
Lc
Lc+L3-(Lb-La)
Ld
Le
Le+L5
Lf
Lg
Lg+L6
Lg+L7
Lh
Li
Li+L8-(Lh-Lg)
Lj
T1
T1+f(L1)
T1+f(L2)
T1+f(Lb-La)
T1+f(L3)
T2
T2+f(L5)
T3
T3+f(L6)
T3+f(L7)
T1+f(Lh-Lg)
T1+f(L8)
T4
Picture #1
Picture #2
Picture #4
Picture #3
Picture #5
Picture #3
L1
L2
L3
L4=0
L5
L6
L7
L8

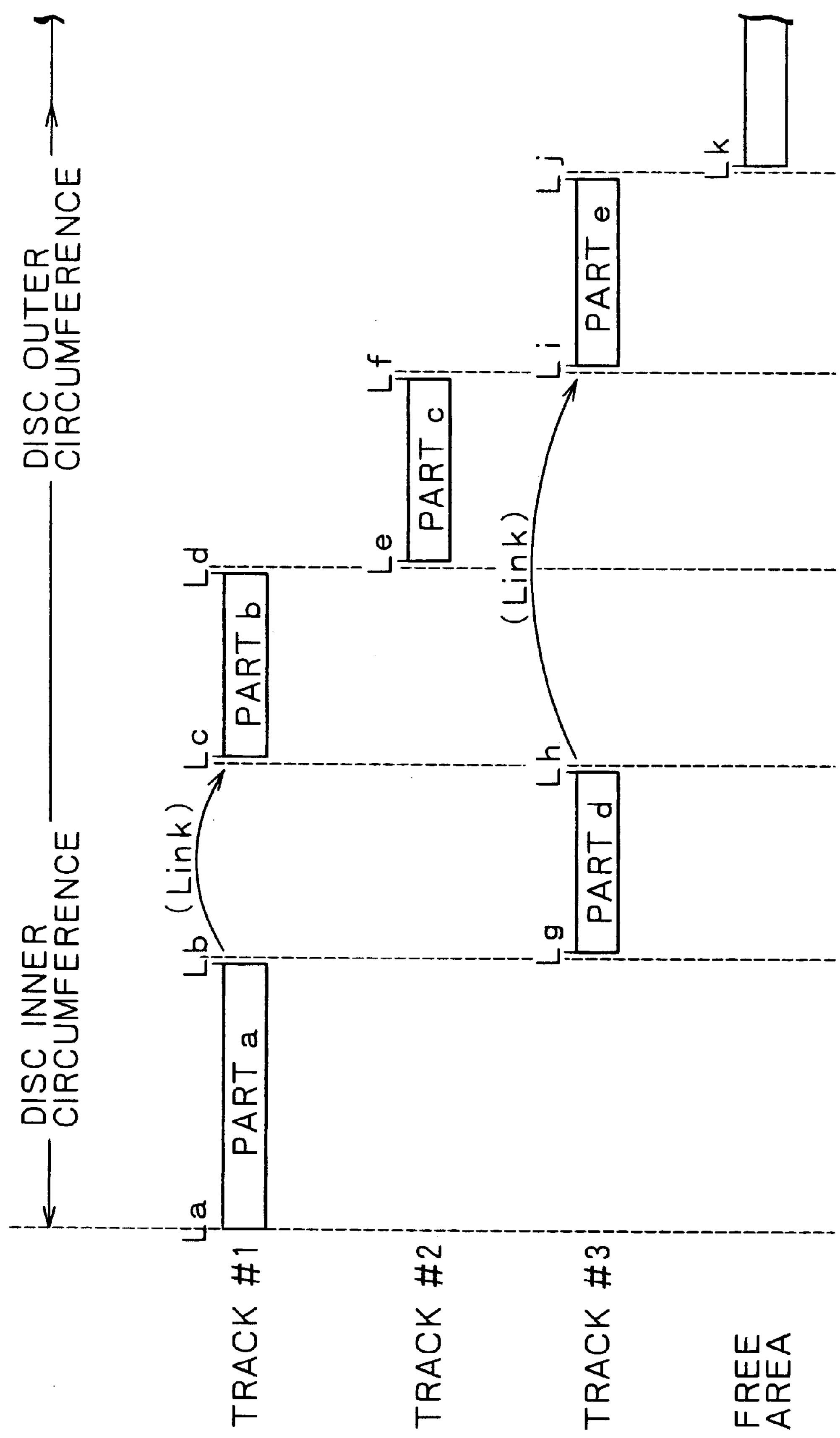
F I G. 24
DISC INNER CIRCUMFERENCE
DISC OUTER CIRCUMFERENCE
TRACK #1
TRACK #2
TRACK #3
FREE AREA
PART a
PART b
PART c
PART d
PART e
(Link)
(Link)
La
Lb
Lc
Ld
Le
Lf
Lg
Lh
Li
Lj
Lk

FIG. 25

16bits | 16bits

| Section | Entry | MSB … LSB | MSB … LSB | MSB … LSB | MSB … LSB | Row |
|---|---|---|---|---|---|---|
| HEADER | | 00000000 | 11111111 | 11111111 | 11111111 | 0 |
| HEADER | | 11111111 | 11111111 | 11111111 | 11111111 | 1 |
| HEADER | | 11111111 | 11111111 | 11111111 | 00000000 | 2 |
| HEADER | | CL·H (00h) | CL·L (03h~05h) | Sector (00h) | MODE (02h) | 3 |
| | | 00000000 | 00000000 | 00000000 | 00000000 | 4 |
| | | 00000000 | 00000000 | 00000000 | 00000000 | 5 |
| | | 00000000 | 00000000 | 00000000 | 00000000 | 6 |
| | | Maker code | Model code | F·TNO (01h) | L·TNO (03h) | 7 |
| | | 00000000 | 00000000 | 00000000 | US (01h) | 8 |
| | | 00000000 | 00000000 | 00000000 | 00000000 | 9 |
| | | 00000000 | 00000000 | 00000000 | Disc Serial No | 10 |
| POINTER SECTION | | Disc | ID | P-DFA (00h) | P-EMPTY (07h) | 11 |
| POINTER SECTION | | P-FRA (06h) | P-TN01 (01h) | P-TN02 (03h) | P-TN03 (04h) | 12 |
| POINTER SECTION | | P-TN04 (00h) | P-TN05 | P-TN06 | P-TN07 | 13 |
| POINTER SECTION | | P-TN0248 | P-TN0249 | P-TN0250 | P-TN0251 | 74 |
| POINTER SECTION | | P-TN0252 | P-TN0253 | P-TN0254 | P-TN0255 | 75 |
| | | 00000000 | 00000000 | 00000000 | 00000000 | 76 |
| | | 00000000 | 00000000 | 00000000 | 00000000 | 77 |
| TABLE SECTION (255 PART TABLES) | (01h) | Start address | | 32h. 00h-La | TRACK MODE (06h) | 78 |
| | | End address | | Lb | LINK INFORMATION (02h) | 79 |
| | (02h) | Start address | | Lc | C6h | 80 |
| | | End address | | Ld | 00h | 81 |
| | (03h) | Start address | | Le | C6h | 82 |
| | | End address | | Lf | 00h | 83 |
| | (04h) | Start address | | Lg | C6h | 84 |
| | | End address | | Lh | 05h | 85 |
| | (05h) | Start address | | Li | C6h | 86 |
| | | End address | | Lj | 00h | 87 |
| | (06h) | Start address | | Lk | TRACK MODE | 88 |
| | | End address | | 8Ch. 1Fh | 00h | 89 |
| | (07h) | Start address | (TRACK ADDRESS) | | TRACK MODE | 90 |
| | | End address | | | 08h | 91 |
| | (08h) | Start address | (TRACK ADDRESS) | | TRACK MODE | 92 |
| | | End address | | | 09h | 93 |
| | (09h) | Start address | (TRACK ADDRESS) | | TRACK MODE | 94 |
| | | End address | | | 0Ah | 95 |
| | (FCh) | Start address | (TRACK ADDRESS) | | TRACK MODE | 580 |
| | | End address | | | LINK INFORMATION | 581 |
| | (FDh) | Start address | (TRACK ADDRESS) | | TRACK MODE | 582 |
| | | End address | | | LINK INFORMATION | 583 |
| | (FEh) | Start address | (TRACK ADDRESS) | | TRACK MODE | 584 |
| | | End address | | | LINK INFORMATION | 585 |
| | (FFh) | Start address | (TRACK ADDRESS) | | TRACK MODE | 586 |
| | | End address | | | LINK INFORMATION | 587 |

U-TOC SECTOR 0

FIG. 26

AUX-TOC SECTOR 3

| Section | Slot | 16bits even m: Wm B (MSB d1 … LSB d8) | 16bits even m: Wm A (MSB d1 … LSB d8) | 16bits odd m: Wm B (MSB d1 … LSB d8) | 16bits odd m: Wm A (MSB d1 … LSB d8) | Row |
|---|---|---|---|---|---|---|
| HEADER | | 00000000 | 11111111 | 11111111 | 11111111 | 0 |
| HEADER | | 11111111 | 11111111 | 11111111 | 11111111 | 1 |
| HEADER | | 11111111 | 11111111 | 11111111 | 00000000 | 2 |
| HEADER | | CL·H (00h) | CL·L (07h~09h) | Sector (03h) | MODE (02h) | 3 |
| | | (00h) | (00h) | (00h) | (00h) | 4 |
| | | (00h) | (00h) | (00h) | (00h) | 5 |
| | | "M" | "D" | "A" | "D" | 6 |
| | | (Maker code) | (Model code) | F·TNP (01h) | L·TNP (03h) | 7 |
| | | (00h) | (00h) | (00h) | (00h) | 8 |
| | | (00h) | (00h) | (00h) | (00h) | 9 |
| | | (00h) | (00h) | (00h) | (00h) | 10 |
| POINTER SECTION | | (00h) | (00h) | (00h) | P-EMPTY (07h) | 11 |
| POINTER SECTION | | (00h) | P-TNP1 (01h) | P-TNP2 (04h) | P-TNP3 (05h) | 12 |
| POINTER SECTION | | P-TNP4 | P-TNP5 | P-TNP6 | P-TNP7 | 13 |
| POINTER SECTION | | P-TNP92 | P-TNP93 | P-TNP94 | P-TNP95 | 35 |
| POINTER SECTION | | P-TNP96 | P-TNP97 | P-TNP98 | P-TNP99 | 36 |
| | | (00h) | (00h) | (00h) | (00h) | 37 |
| | | (00h) | (00h) | (00h) | (00h) | 74 |
| | | (00h) | (00h) | (00h) | (P-TNP255) | 75 |
| TABLE SECTION (99+1 SLOTS) | (00h) | zeros | | | P-PNOj | 76 |
| | | zeros | | | LINK INFORMATION | 77 |
| | (01h) | Start offset address (L1) | | | 01h | 78 |
| | | End offset address (all zero) | | | 02h | 79 |
| | (02h) | Start offset address (L2) | | | 02h | 80 |
| | | End offset address (all zero) | | | 03h | 81 |
| | (03h) | Start offset address (L3) | | | 04h | 82 |
| | | End offset address (all zero) | | | 00h | 83 |
| | (04h) | Start offset address (L4=0) | | | 03h | 84 |
| | | End offset address (L5) | | | 00h | 85 |
| | (05h) | Start offset address (L6) | | | 05h | 86 |
| | | End offset address (all zero) | | | 06h | 87 |
| | (06h) | Start offset address (L7) | | | 03h | 88 |
| | | End offset address (L8) | | | 00h | 89 |
| | (07h) | Start offset address | | | P-PNOj | 90 |
| | | End offset address | | | 08h | 91 |
| | (08h) | Start offset address | | | P-PNOj | 92 |
| | | End offset address | | | 09h | 93 |
| | (09h) | Start offset address | | | P-PNOj | 94 |
| | | End offset address | | | 0Ah | 95 |
| | (63h) | Start offset address | | | P-PNOj | 274 |
| | | End offset address | | | LINK INFORMATION | 275 |
| | (64h) | (zeros) | | | | 276 |
| | · | (zeros) | | | | 277 |
| | · | (zeros) | | | | 278 |
| | (FFh) | (zeros) | | | | 586 |
| | | (zeros) | | | | 587 |

START
S101
ACCESS REQUEST ?
Y
N
S102
TRACK NUMBER BEING REPRODUCED=CurTr
S103
REVERSE ACCESS ?
Y
N
S104
ADDRESS BEING REPRODUCED =TOP PORTION IN TRACK ?
Y
N
S105
CurTr=1 ?
Y
N
S106
ACCESS Sad (CurTr-1,0)
S107
CurTr= MAXIMUM VALUE ?
Y
N
S108
ACCESS Sad (CurTr,0)
S109
ACCESS Sad (CurTr+1,0)
RETURN

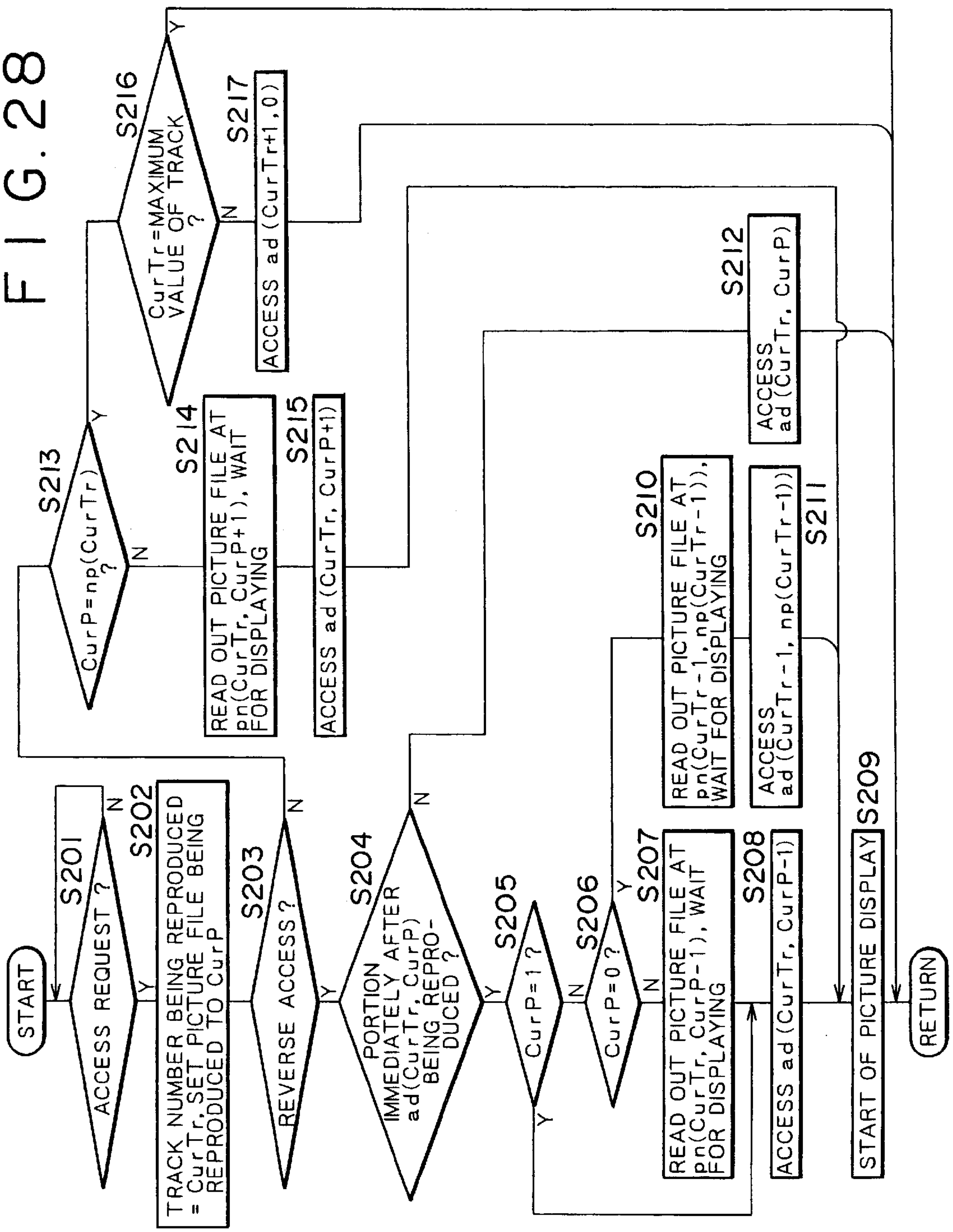
F I G. 28
START
S201
ACCESS REQUEST ?
S202
TRACK NUMBER BEING REPRODUCED = CurTr, SET PICTURE FILE BEING REPRODUCED TO CurP
S203
REVERSE ACCESS?
S204
PORTION IMMEDIATELY AFTER ad(CurTr, CurP) BEING REPRO-DUCED ?
S205
CurP=1 ?
S206
CurP=0 ?
S207
READ OUT PICTURE FILE AT pn(CurTr, CurP-1), WAIT FOR DISPLAYING
S208
ACCESS ad(CurTr, CurP-1)
S209
START OF PICTURE DISPLAY
RETURN
S210
READ OUT PICTURE FILE AT pn(CurTr-1, np(CurTr-1)), WAIT FOR DISPLAYING
S211
ACCESS ad(CurTr-1, np(CurTr-1))
S212
ACCESS ad(CurTr, CurP)
S213
CurP=np(CurTr) ?
S214
READ OUT PICTURE FILE AT pn(CurTr, CurP+1), WAIT FOR DISPLAYING
S215
ACCESS ad(CurTr, CurP+1)
S216
CurTr=MAXIMUM VALUE OF TRACK ?
S217
ACCESS ad(CurTr+1, 0)
Y
N

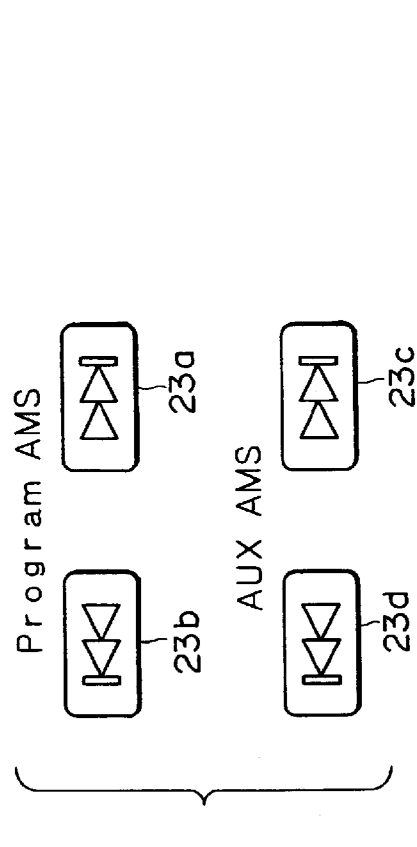
FIG. 29
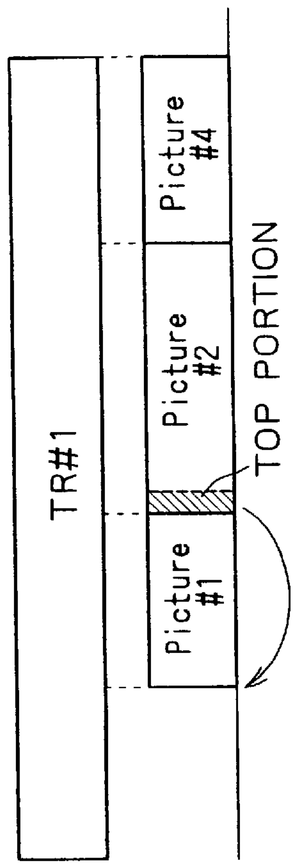
TRACK
DISPLAY PICTURE
FIG. 30A
FIG. 30B
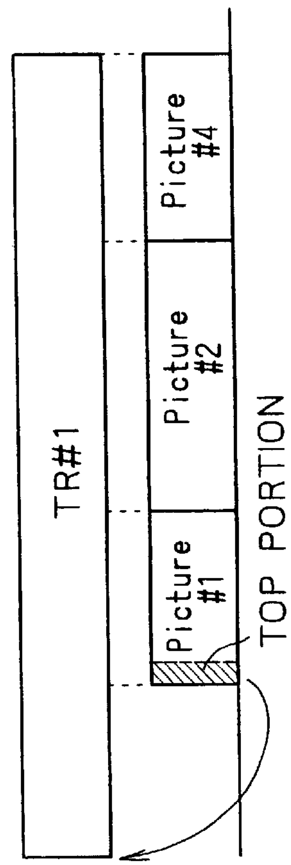
TRACK
DISPLAY PICTURE
FIG. 30C
FIG. 30D

Figures 30E, 30F, 30G, 30H, 30I, 30J:
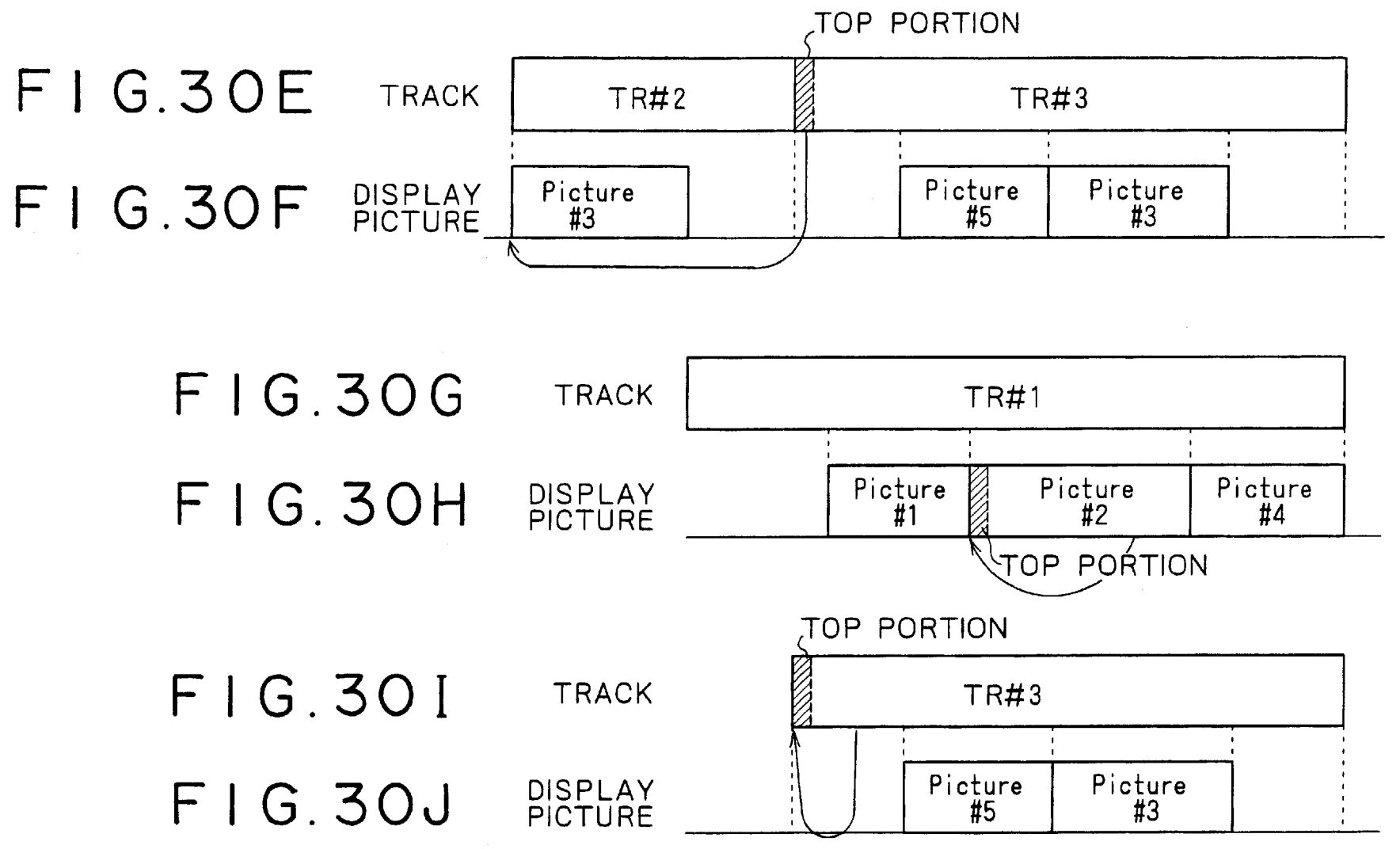

FIG.30E TRACK

TR#2

TR#3

TOP PORTION

FIG.30F DISPLAY PICTURE

Picture #3

Picture #5

Picture #3

FIG.30G TRACK

TR#1

FIG.30H DISPLAY PICTURE

Picture #1

TOP PORTION

Picture #2

Picture #4

FIG.30I TRACK

TOP PORTION

TR#3

FIG.30J DISPLAY PICTURE

Picture #5

Picture #3

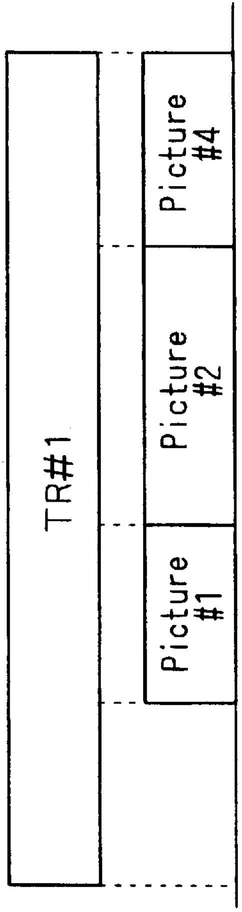
FIG. 30K
FIG. 30L
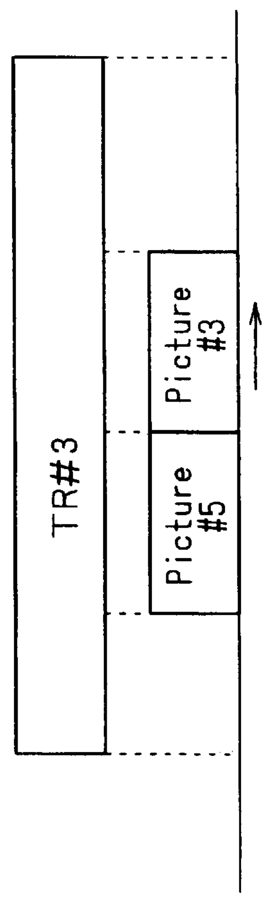
FIG. 30M
FIG. 30N
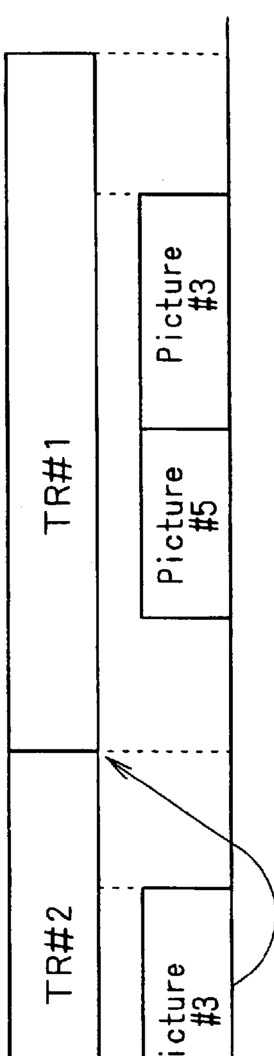
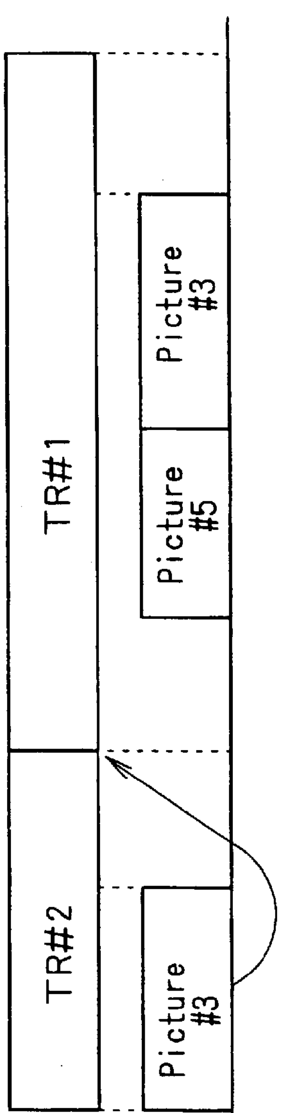
FIG. 30O
FIG. 30P

APPARATUS AND METHOD FOR REPRODUCING MAIN DATA AND SUB DATA IN SYNCHRONIZATION

BACKGROUND OF THE INVENTION

1. Field of the Invention

This invention relates to a reproduction apparatus and a reproduction method by which, from a recording medium on which main data, main management data to be used for management of recorded positions of the main data, sub data for modifying the main data and sub management data to be used for management of recorded positions of the sub data are recorded, the sub data are reproduced based on the sub management data in synchronism with the main data.

2. Description of the Related Art

As a recording apparatus and a reproduction apparatus which can record and reproduce music and so forth, a recording apparatus and a reproduction apparatus are known on which a magneto-optical disc, a magnetic tape or the like on which an audio signal is recorded as a digital signal is used as a recording medium.

In a recording and reproduction system in which a magneto-optical disc known as mini disc (Trade Mark) is used, a user not only can record and reproduce audio data of tunes and so forth as programs, but also can record a title of the disc, that is, a disc name, and titles, that is, track names, of the programs such as tunes recorded on the disc as character information on the disc. For example, upon reproduction, the disc title, the titles of the tunes, the names of artists and so forth can be displayed on a display section of a reproduction apparatus.

It is to be noted that, in the present specification, the term "program" is used to signify a unit of audio data or the like such as a tune as main data recorded on a disc. For Example, audio data for one tune make one program. Also the term "track" is used in the same significance as the "program".

A mini disc system in which a mini disc is used as a recording medium has been proposed by the Assignee of the present invention wherein a recording region into which sub data incidental to audio data as main data can be recorded is provided separately from a recording region into which the main data are recorded on a mini disc such that still picture data and character data can be recorded as the sub data. It is to be noted that the character data in the present specification include also data of symbols, marks and so forth.

For example, also a conventional mini disc system different from the mini disc system described above can record character information such as a disc name and a track name. Such character information is recorded in a corresponding relationship to each program in the U-TOC (User Table Of Contents) of a mini disc. However, since the U-TOC itself does not have a very large capacity, it merely allows recording of characters of titles and so forth.

In contrast, where a recording region for sub data is provided on a mini disc as described above, it can be realized readily to record not only character information but also video data which do not require a very large capacity such as, for example, a still picture.

As a form of utilization of sub data where a mini disc system is so configured as to record sub data such as images and character information in addition to main data onto a mini disc, it seems a possible idea, for example, to reproduce and output sub data corresponding to main data at a required timing synchronized with the reproduction time of the main data.

More particularly, for example, if it is assumed that a program of main data as a tune having a playing time of 2 minutes and two still picture files Picture #1 and #2 as sub data corresponding to the program are recorded on a disc, then the still picture file Picture #1 is displayed in synchronism for one minute of the former half of the 2-minute period within which reproduction of the program is performed, and the still picture file Picture #2 is displayed for one minute of the latter half.

The configuration which allows such synchronous reproduction not only allows enjoyment of a program reproduced as sound but allows a different manner of enjoyment such as to enjoy a still picture or characters displayed in accordance with a progress of the program being reproduced.

Conventionally, a mini disc system has a function of searching, for example, audio data as main data in a unit of a program in response to an operation of a user. In other words, by performing a search operation, a user can search for the head of a desired program and start reproduction of the program beginning with the head.

Here, if the configuration wherein a data file as sub data is reproduced or outputted in synchronism with the main data as described above is adopted, then the following search function can be provided to the mini disc system in addition to the search function by which the main data are searched in a unit of a program as described above.

In particular, a search function by which a search is performed with reference to sub data reproduced in synchronism with main data is provided. For example, the user designates, as an operation for the search, a desired still picture file or character information file from among files of sub data whose reproduction outputting times are prescribed with respect to programs, that is, main data. By the operation, the designated file of sub data is displayed, and audio reproduction of the main data in a section reproduced in synchronism with the thus displayed file of sub data is started.

Where the search function with reference to sub data just described is provided, for example, the user searches and quickly observes particular desired sub data files in the form of still picture files or character information files in an order of the reproduction time of the main data. The user can thus enjoy sound in the reproduction section of the main data synchronized with a sub data file being displayed. Reversely speaking, it is possible to confirm in what reproduction section of programs of main data what sub data file is set in a corresponding relationship so as to be reproduced in synchronism with each other. This preferentially augments the convenience of use of the mini disc system as much.

SUMMARY OF THE INVENTION

It is an object of the present invention to provide a reproduction apparatus and a reproduction method by which main data and sub data for modifying the main data can be reproduced in synchronism with each other readily by simple operation.

In order to attain the object described above, according to an aspect of the present invention, there is provided a reproduction apparatus for reproducing, from a recording medium on which main data, main management data to be used for management of recorded positions of the main data, sub data for modifying the main data, and sub management data to be used for management of recorded positions of the sub data are recorded, the sub data based on the sub management data in synchronism with the main data, comprising reproduction means for reproducing the main data, the sub data, the main management data and the sub management data from the recording medium, first calculation means for calculating a recorded position of a top portion of the main data based on the main management data as a first recorded position, second calculation means for calculating a recorded position of a top portion of the sub data based on the sub management data as a second recorded position, operation means for inputting a search operation of a user, and control means for feeding, when an instruction to feed the reproduction means to a top portion of a desired portion of the main data or the sub data is received from the operation means, the reproduction means to the recorded position of the top portion of the main data or the sub data based on at least one of the first recorded position and the second recorded position.

According to another aspect of the present invention, there is provided a reproduction method for reproducing, from a recording medium on which main data, main management data to be used for management of recorded positions of the main data, sub data for modifying the main data, and sub management data to be used for management of recorded positions of the sub data are recorded, the sub data based on the sub management data in synchronism with the main data, comprising the steps of reproducing the main data, the sub data, the main management data and the sub management data from the recording medium, calculating a recorded position of a top portion of the main data based on the main management data as a first recorded position, calculating a recorded position of a top portion of the sub data based on the sub management data as a second recorded position, inputting a search operation of a user, and feeding, when the operation means indicates an instruction to feed a reproduction position to a top portion of a desired portion of the main data or the sub data, the reproduction position to the recorded position of the top portion of the main data or the sub data based on at least one of the first recorded position and the second recorded position.

The above and other objects, features and advantages of the present invention will become apparent from the following description and the appended claims, taken in conjunction with the accompanying drawings in which like parts or elements denoted by like reference symbols.

BRIEF DESCRIPTION OF THE DRAWINGS

FIG. 2A is a diagrammatic view illustrating a track in a sector format of a disc used in the recording and reproduction apparatus of FIG. 1;

FIG. 2B is a diagrammatic view illustrating a cluster in the sector format of the disc;

FIG. 2C is a diagrammatic view illustrating arrangement of sectors in the sector format of the disc and sector lengths;

FIG. 2D is a diagrammatic view illustrating a sector in the sector format of the disc;

FIG. 2E is a diagrammatic view illustrating a sound group in the sector format of the disc;

FIG. 3A is a diagrammatic view illustrating an address format of the disc;

FIG. 3B is a diagrammatic view illustrating a compact type address format of the disc;

FIG. 4A is a diagrammatic view showing an example of a top address of a first program on the disc;

FIG. 4B is a diagrammatic view showing an example of a compact type top address of the first program;

FIG. 4C is a diagrammatic view showing an example of an address of a first certain position in the first program;

FIG. 4D is a diagrammatic view showing a compact type absolute address of the example of the address of the first certain position in the first program;

FIG. 4E is a diagrammatic view showing a compact type offset address of the example of the address of the first certain position in the first program;

FIG. 4F is a diagrammatic view showing an example of an address of a second certain position in the first program;

FIG. 4G is a diagrammatic view showing a compact type absolute address of the example of the address of the second certain position in the first program;

FIG. 4H is a diagrammatic view showing a compact type offset address of the example of the address of the second certain position in the first program;

FIG. 6 is a diagrammatic view illustrating the U-TOC sector 0 of the disc;

FIG. 8 is a diagrammatic view illustrating the U-TOC sector 1 of the disc;

FIG. 9 is a diagrammatic view illustrating the U-TOC sector 2 of the disc;

FIG. 11 is a diagrammatic view illustrating the AUX-TOC sector 0 of the disc;

FIG. 12 is a diagrammatic view illustrating the AUX-TOC sector 1 of the disc;

FIG. 13 is a diagrammatic view illustrating the AUX-TOC sector 2 of the disc;

FIG. 14 is a diagrammatic view illustrating the AUX-TOC sector 3 of the disc;

FIG. 15 is a diagrammatic view illustrating the AUX-TOC sector 4 of the disc;

FIG. 16 is a diagrammatic view illustrating the AUX-TOC sector 5 of the disc;

FIG. 19A is a diagrammatic view illustrating a copy status of the disc;

FIG. 19B is a diagrammatic view illustrating a copy status updating table for updating the copy status illustrated in FIG. 19A;

FIG. 21 is a diagrammatic view illustrating contents of a definition of a text mode used in the recording and reproduction apparatus shown in FIG. 1;

FIG. 24 is a diagrammatic view illustrating a concept of physical recorded conditions of tracks on the disc illustrated in FIGS. 23A to 23E;

FIG. 25 is a diagrammatic view illustrating an example of contents of the U-TOC sector 0 of the disc illustrated in FIGS. 23A to 23E;

FIG. 26 is a diagrammatic view illustrating an example of contents of the AUX-TOC sector 3 of the disc illustrated in FIGS. 23A to 23E;

FIG. 28 is a flow chart illustrating a processing operation for realizing a search operation with reference to an AUX data file;

FIG. 29 is a front elevational view showing an example of an arrangement of program search keys and AUX data search keys provided on the recording and reproduction apparatus of FIG. 1;

FIGS. 30A and 30B are diagrammatic views showing a track and corresponding picture files, respectively, and illustrating an example of an operation of the recording and reproduction apparatus of FIG. 1 wherein the accessing position changes from a top portion of the second picture file to the top of the first picture file;

FIGS. 30C and 30D are diagrammatic views showing a track and corresponding picture files, respectively, and illustrating an example of another operation of the recording and reproduction apparatus of FIG. 1 wherein the accessing position changes from a top portion of the first picture file to the top of the track;

FIGS. 30E and 30F are diagrammatic views showing tracks and corresponding picture files, respectively, and illustrating an example of a further operation of the recording and reproduction apparatus of FIG. 1 wherein the accessing position changes from a top portion of the second track to the top of the first track and the top of the corresponding picture file;

FIGS. 30G and 30H are diagrammatic views showing a track and corresponding picture files, respectively, and illustrating an example of a still further operation of the recording and reproduction apparatus of FIG. 1 wherein the accessing position changes from a portion later than a top portion of the second picture file to the top of the second picture file;

FIGS. 30I and 30J are diagrammatic views showing a track and corresponding picture files, respectively, and illustrating an example of a yet further operation of the recording and reproduction apparatus of FIG. 1 wherein the accessing position changes from a portion later than a top portion of the track to a top portion of the track;

FIGS. 30K and 30L are diagrammatic views showing a track and corresponding picture files, respectively, and illustrating an example of a yet further operation of the recording and reproduction apparatus of FIG. 1 wherein the accessing position changes from an intermediate portion of the second picture file to the top of the third picture file;

FIGS. 30M and 30N are diagrammatic views showing a track and corresponding picture files, respectively, and illustrating an example of a yet further operation of the recording and reproduction apparatus of FIG. 1 wherein an instruction for changing the accessing position to the top of a next picture file during reproduction of the last picture file is ignored; and FIGS. 30O and 30P are diagrammatic views showing tracks and corresponding picture files, respectively, and illustrating an example of a yet further operation of the recording and reproduction apparatus of FIG. 1 wherein the accessing position changes from an intermediate portion of the picture file corresponding to the first track to the top of the second track.

DESCRIPTION OF THE PREFERRED EMBODIMENT

A preferred embodiment of the present invention is described below.

In the present embodiment, a mini disc which is one of magneto-optical discs is used as a recording medium, and a mini disc recording and reproduction apparatus is used as a recording apparatus and a reproduction apparatus.

The description proceeds in the following order.

1. Construction of the Recording and Reproduction apparatus
2. Sector Format and Address Format
3. Area Structure
4. U-TOC
   - 4-1 U-TOC Sector 0
   - 4-2 U-TOC Sector 1
   - 4-3 U-TOC Sector 2
   - 4-4 U-TOC Sector 3
5. AUX-TOC
   - 5-1 AUX-TOC Sector 0
   - 5-2 AUX-TOC Sector 1
   - 5-3 AUX-TOC Sector 2
   - 5-4 AUX-TOC Sector 3
   - 5-5 AUX-TOC Sector 4
   - 5-6 AUX-TOC Sector 5
6. Data File
   - 6-1 Picture File Sector
   - 6-2 Text File Sector
7. Program Search and AUX Data File Search
   - 7-1 Example of Operation
   - 7-2 Processing Operation 1. Construction of the Recording and Reproduction Apparatus FIG. 1 shows an internal construction of the mini disc recording and reproduction apparatus 1 of the present embodiment.

Figure 1:
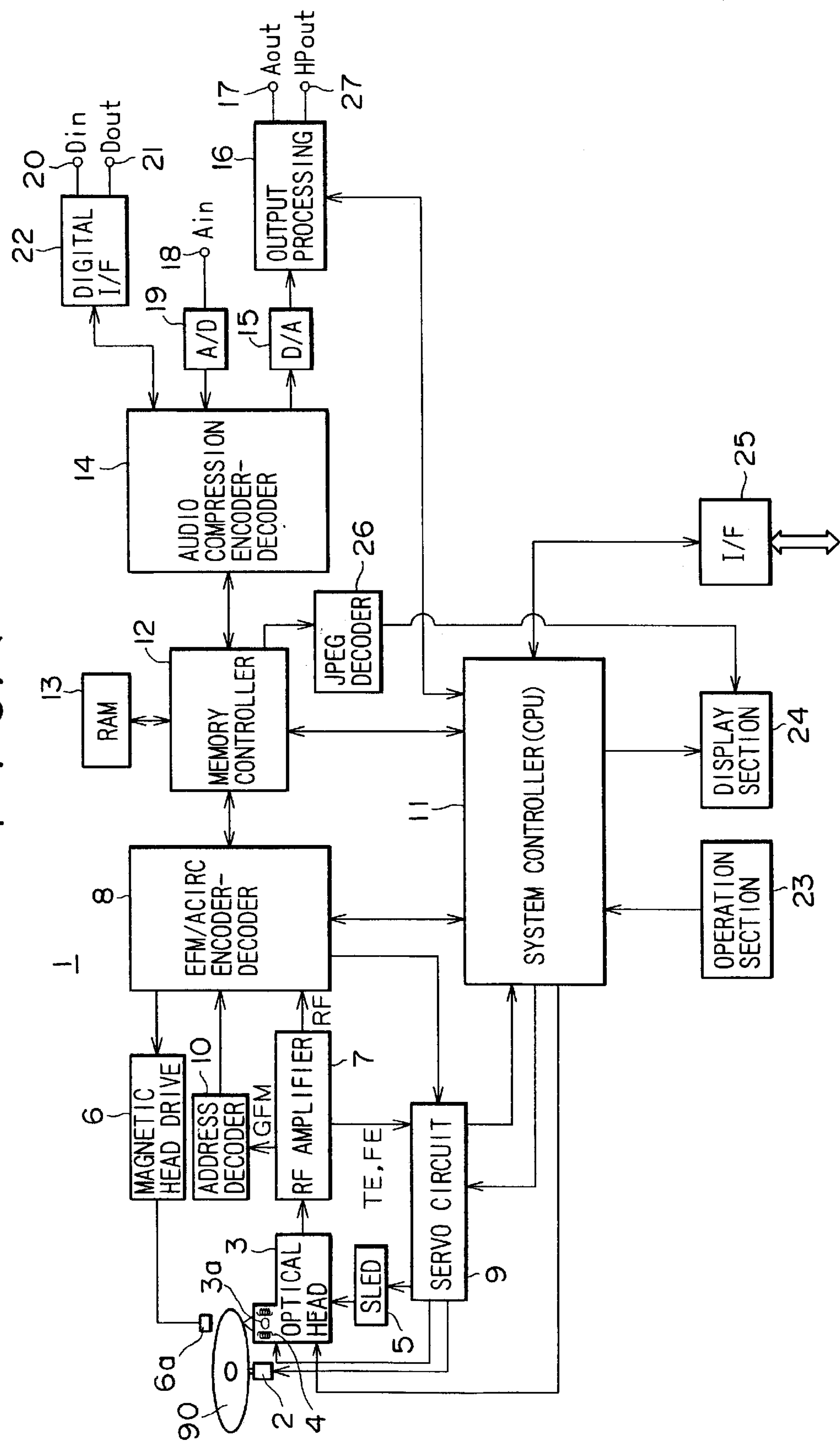
FIG. 1 is a block diagram of a recording and reproduction apparatus according to a preferred embodiment of the present invention.

Referring to FIG. 1, a magneto-optical disc 90 onto which audio data are to be recorded is driven to rotate by a spindle motor 2. Upon recording and reproduction, a laser beam from an optical head 3 is irradiated upon the magneto-optical disc 90.

Upon recording, the optical head 3 outputs a laser beam of a high level for heating a recording track to a Curie temperature, but upon reproduction, the optical head 3 outputs a laser beam of a comparatively low level for detecting data from reflected light from the magneto-optical disc 90 by a magnetic Kerr effect.

To this end, the optical head 3 includes an optical system which in turn includes a laser diode serving as laser outputting means, a polarizing beam splitter, an objective lens 3*a* and so forth, a detector for detecting reflected light, and other necessary elements. The objective lens 3*a* is supported for displacement in a radial direction of and in a direction toward or away from the magneto-optical disc 90 by a biaxial mechanism 4.

A magnetic head 6*a* is disposed in an opposing relationship to the optical head 3 across the magneto-optical disc 90. The magnetic head 6*a* is adapted to apply to the magneto-optical disc 90 a magnetic field modulated with data supplied thereto.

The entire optical head 3 and the magnetic head 6*a* are supported for movement in a radial direction of the magneto-optical disc 90 by a thread mechanism 5.

Information detected from the magneto-optical disc 90 by the optical head 3 upon reproduction is supplied to a RF amplifier 7. The RF amplifier 7 performs arithmetic processing for the information supplied thereto to detect a reproduction RF signal, a tracking error signal TE, a focusing error signal FE, groove information GFM and other necessary information. The groove information is absolute position information recorded as pre-grooves (wobbling grooves) on the magneto-optical disc 90.

The extracted reproduction RF signal is supplied to an encoder and decoder section 8. The tracking error signal TE and the focusing error signal FE are supplied to a servo circuit 9, and the groove information GFM is supplied to an address decoder 10.

The servo circuit 9 generates various servo driving signals based on the tracking error signal TE and the focusing error signal FE supplied thereto from the RF amplifier 7, a track jump instruction or an access instruction from a system controller 11, which is formed from a microcomputer, rotational speed detection information of the spindle motor 2, and so forth to control the biaxial mechanism 4 and the thread mechanism 5 to effect focusing and tracking control and control the spindle motor 2 to rotate at a constant linear velocity (CLV).

The address decoder 10 decodes the groove information GFM supplied thereto from the RF amplifier 7 to extract address information. The address information is supplied to the system controller 11 and used for various controlling operations by the system controller 11.

The reproduction RF signal is subject to decoding processing such as EFM (8 to 14 Modulation) demodulation and CIRC (Cross Interleave Reed Solomon Coding) in the encoder and decoder section 8. Upon such decoding processing, also an address, sub code data and so forth are extracted and supplied to the system controller 11.

Audio data as sector data obtained by the decoding processing such as EFM demodulation and CIRC by the encoder and decoder section 8 are written once into a buffer memory 13 by a memory controller 12. It is to be noted that reading of data from the disc 90 by the optical head 3 and transfer of reproduction data in a system from the optical head 3 to the buffer memory 13 are performed intermittently at the rate of 1.41 Mbit/sec.

The data written in the buffer memory 13 are read out at a timing at which transfer of the reproduction data is performed at the rate of 0.3 Mbit/sec, and are supplied to an encoder and decoder section 14. The data supplied to the encoder and decoder section 14 are subject to reproduction signal processing such as decoding processing corresponding to audio compression processing so that they are converted into a digital audio signal sampled with 44.1 KHz and quantized with 16 bits.

The digital audio signal is converted into an analog signal by a D/A converter 15 and then subject to level adjustment, impedance adjustment and so forth by an output processing section 16. A resulting signal from the output processing section 16 is outputted as an analog audio signal Aout from a line output terminal 17 to an external apparatus. The signal from the output processing section 16 is supplied also as a headphone output HPout to a headphone output terminal 27 so that it is outputted to a headphone connected to the headphone output terminal 27.

Meanwhile, the digital audio signal after decoded by the encoder and decoder section 14 is supplied to a digital interface section 22 so that it can be outputted as a digital audio signal Dout from a digital output terminal 21 to an external apparatus. The digital audio signal is outputted to the external apparatus, for example, by transmission over an optical cable.

When a recording operation onto the magneto-optical disc 90 is to be performed, an analog audio signal Ain as a recording signal supplied to a line input terminal 18 is converted into digital data by an A/D converter 19 and then supplied to the encoder and decoder section 14, by which audio compression encoding is performed therefor.

On the other hand, if a digital audio signal Din is supplied from an external apparatus to a digital input terminal 20, then extraction of audio data, control codes and so forth is performed by the digital interface section 22. The audio data are supplied to the encoder and decoder section 14, by which audio compression encoding processing is performed therefor.

Though not shown, it is naturally possible to provide a microphone input terminal so that a microphone input may be used as a recording signal.

The compressed recording data from the encoder and decoder section 14 are written once into and accumulated in the buffer memory 13 by the memory controller 12 and then read out for each data unit of a predetermined amount and sent to the encoder and decoder section 8. Then, the recording data are subject to encoding processing such as CIRC encoding and EFM modulation by the encoder and decoder section 8, and resulting data are supplied to a magnetic head drive circuit 6.

The magnetic head drive circuit 6 supplies a magnetic head driving signal to the magnetic head 6*a* in accordance with the encoded recording data from the encoder and decoder section 8. In other words, the magnetic head drive circuit 6 causes the magnetic head 6*a* to perform application of a magnetic field of the N or S pole to the magneto-optical disc 90. Further, the system controller 11 thereupon supplies a control signal to the optical head 3 so that the optical head 3 may output a laser beam of a recording level.

An operation section 23 is operated by a user and includes operation keys, a dial and so forth which serve as operation elements. The operation elements include, for example, operation elements regarding recording and reproduction operations such as reproduction, recording, pause, stop, FF (fast feeding), REW (rewinding) and AMS (Auto Music Search) (head search), operation elements regarding play modes such as normal reproduction, program reproduction and shuffle reproduction, an operation element for a display mode operation for switching the displaying state of a display section 24, and operation elements for program editing operations such as track (program) division, track connection, track erasure, track name inputting and disc name inputting.

Operation information by the operation keys and the dial is supplied to the system controller 11. The system controller 11 thus executes operation control based on the control information.

Particularly, the operation section 23 in the present embodiment includes, as operation elements for the AMS (head search), a pair of program search (program AMS) keys 23*a* and 23*b* for performing an ordinary head search with reference to a track (program) and a pair of AUX data search (AUX AMS) keys 23*c* and 23*d* for performing a head search with reference to an AUX data file (picture file or a character information (text) file) reproduced (displayed or outputted) in synchronism with a program, separately from one another.

The program search keys 23*a* and 23*b* correspond to program searches in the feeding direction and the rewiring direction, respectively. For example, each time the program search key 23*a* for the feeding direction is pressed once, the top of a program immediately following a program being reproduced at present in the order of reproduction is accessed to start reproduction of the program. If the program search key 23*a* is pressed twice successively, then the top of the second program following a program being reproduced upon press of the program search key 23*a* in the order of reproduction is accessed to start reproduction of the program.

In regard to the program search key 23*b* for the rewinding direction, if it is pressed once while a top portion of a track, for example, a portion of the track within a predetermined time of less than approximately one minute from the starting time of the reproduction is being reproduced at present, then the top of another track immediately preceding to the track being reproduced at present is accessed to start reproduction of the preceding track. However, if a press operation of the program search key 23*b* is performed while a portion of the track following the top portion is being reproduced, then the top of the track being reproduced at present is accessed to start reproduction of the track.

If the AUX data search key 23*c* or 23*d* is pressed, then an operation similar to that performed in response to a press operation of the program search key 23*a* or 23*b* is performed but with reference to an AUX data file. In particular, each time a press operation of the AUX data search key 23*c* for the feeding direction is performed, an AUX data file to be outputted next to an AUX data file being reproduced at present in synchronism with reproduction of a track in accordance with a reproduction time base of programs is reproduced and outputted, and simultaneously, an address of a track corresponding to the reproduction starting point of the AUX data file reproduced newly is accessed to start reproduction of the track.

In regard to the AUX data search key 23*d* for the rewinding direction, if it is pressed once while a top portion of an AUX data file being reproduced at present in synchronism with reproduction of a track is being reproduced, then in principle, an AUX data file immediately preceding in reproduction time to an AUX data file being reproduced at present is reproduced and outputted, and simultaneously, an address of a track corresponding to the reproduction starting point of the AUX data file reproduced newly is accessed to start reproduction of the track. On the other hand, if a press operation of the AUX data search key 23*d* is performed while a portion following the top portion of an AUX data file being reproduced at present in synchronism with reproduction of a track is reproduced, then the access point is returned to the reproduction starting point of the AUX data file being reproduced at present. In other words, although reproduction of an AUX data file being reproduced at present is continued, an address of a track corresponding to the reproduction starting point of the AUX data file is accessed to start reproduction of the track.

However, if a delimiting point of a track is present between an AUX data file being reproduced at present and another AUX data file preceding or following in reproduction time as hereinafter described, then irrespective of whether or not an AUX data file whose synchronous reproduction is to be started corresponding to the top of the track is present, the delimiting point of the track can be accessed in response to an operation of the AUX data search key 23*c* or 23*d*.

A displaying operation of the display section 24 is controlled by the system controller 11.

In particular, in order to cause the display section 24 to perform a displaying operation, the system controller 11 transmits data to be displayed to a display driver in the display section 24. The display driver drives a displaying operation of a display unit such as a liquid crystal panel based on the data supplied thereto to display required numerals, characters, marks and so forth.

The display section 24 displays an operation mode state of a disc being recorded or played back, a track number, a recording time or reproduction time, an editing operation state and so forth.

The disc 90 allows recording thereon of character information such as a track name which is managed incidentally to a program as main data. When such character information is inputted, the inputted characters are displayed, and also character information read out from the disc is displayed.

Further, in the present embodiment, sub data (AUX data) which make data files independent of data of tunes and so forth as programs can be recorded on the disc 90.

A data file as AUX data includes information of characters, a still picture or the like, and such characters or still picture can be displayed on the display section 24.

For such sub data, information which emphasizes main data is selected and is applied to a climax portion of the main data or a portion of the main data at which a flow of the main data changes, such as, for example, a delimiting point between parts of a tune such as the exposition and the development so that the main data may be emphasized effectively. For example, where the theme of a tune is a flower, if such sub data with which the image of the flower can be emphasized or with which characters for explaining the name of the flower of the theme and so forth can be displayed are used, then an effect of permitting the tune as the main data to be comprehended profoundly can be anticipated. Further, if reading aloud of a book or the like is selected as the main data, then if sub data for displaying an image which corresponds to an illustration of the book are used, this assists better comprehension of contents of the book.

In the present embodiment, a JPEG decoder 26 is provided as a component for allowing the display section 24 to display a still picture of AUX data.

In particular, in the present embodiment, still picture data of a data file as AUX data are recorded in the form of a file compressed in accordance with the JPEG (Joint Photographic Coding Experts Group) system. The JPEG decoder 26 receives a file of still picture data reproduced from the disc 90 and stored, for example, in the buffer memory 13 through the memory controller 12, performs decompression processing in accordance with the JPEG system for the file, and outputs resulting data to the display section 24. Consequently, the still picture data as the AUX data are displayed on the display section 24.

It is to be noted, however, that, where character information or still picture information of AUX data is outputted, a full dot display unit or a CRT display unit which has a comparatively large screen and can use the screen freely to some degree is preferably used frequently. Therefore, it is a possible idea to display AUX data on an external monitor apparatus or the like which is connected to an interface section 25.

Further, while a user can record an AUX data file onto the disc 90, it is sometimes necessary to use an image scanner, a personal computer or a keyboard as an inputting apparatus then, and it is a possible idea to input information as an AUX data file from such an inputting apparatus as just mentioned to the mini disc recording and reproduction apparatus 1 through the interface section 25.

The system controller 11 is formed as a microcomputer including a CPU, a program ROM, a working RAM, an interface unit and so forth and control the various operations described hereinabove.

When a recording or reproduction operation is performed for the magneto-optical disc 90, management information recorded on the magneto-optical disc 90, that is, the P-TOC (pre-mastered TOC) and the U-TOC (user TOC) must be read out. The system controller 11 discriminates an address of an area to be recorded or an address of an area to be played back on the magneto-optical disc 90 based on the management information.

The management information is stored in the buffer memory 13.

When the magneto-optical disc 90 is loaded into the recording and reproduction apparatus 1, the system controller 11 causes a reproduction operation of the innermost circumference of the magneto-optical disc 90, on which the management information is recorded, to be executed to read out the management information and stores the management information into the buffer memory 13 so that the management information may thereafter be referred to upon recording, reproduction or editing operation for the magneto-optical disc 90.

The U-TOC is rewritten in response to recording or editing processing of program data. More particularly, each time a recording or editing operation is performed, the system controller 11 performs U-TOC updating processing for the U-TOC information stored in the buffer memory 13 and rewrites the U-TOC area of the magneto-optical disc 90 at a predetermined timing in response to the rewriting operation.

While AUX data files are recorded on the magneto-optical disc 90 separately from programs, an AUX-TOC is formed on the magneto-optical disc 90 for allowing management of the AUX data files.

The system controller 11 performs also reading out of the AUX-TOC upon reading out of the U-TOC and stores the AUX-TOC into the buffer memory 13 so that, when necessary, it can refer to the AUX data management state.

Further, when necessary, the system controller 11 reads out an AUX data file at a predetermined timing or simultaneously upon reading out of the AUX-TOC and stores the AUX data file into the buffer memory 13. Then, in response to an outputting timing which is managed with the AUX-TOC, the system controller 11 causes the display section 24 or the external apparatus connected to the interface section 25 to execute an outputting operation of characters or an image.

2. Sector Format and Address Format

Data units called sector and cluster are described below with reference to FIGS. 2A to 2E.

In a recording track in the mini disc system, clusters CL are formed successively as seen in FIG. 2A, and one cluster makes a minimum unit upon recording. One cluster corresponds to 2 to 3 circumferential tracks.

Referring to FIG. 2B, one cluster CL includes a linking region of four sectors SFC to SFF and a main data region of 32 sectors S00 to S1F.

As seen from FIG. 2C, one sector is a unit of data including 2,352 bytes.

Of the sub data region of four sectors shown in FIG. 2B, the sector SFF is used as a sub data sector which can be used for recording of information as sub data. However, the remaining three sectors SFC to SFE are not used for recording of data.

Meanwhile, TOC data, audio data, AUX data and so forth are recorded into the main data region for 32 sectors.

It is to be noted that an address is recorded for each one sector.

Referring to FIG. 2D, one sector is further divided into units called sound groups. More particularly, two sectors are divided into 11 sound groups.

More specifically, as seen from FIGS. 2C and 2D, two successive sectors including an even-numbered sector such as the sector S00 and an odd-numbered sector such as the sector S01 include sound groups SG00 to SG0A. One sound group is formed from 424 bytes and includes an amount of audio data corresponding to the time of 11.61 msec.

As seen from FIGS. 2D and 2E, data are recorded separately for the L channel and the R channel in one sound group SG. For example, the sound group SG00 includes L channel data L0 and R channel data R0, and the sound group SG01 includes L channel data L1 and R channel data R1.

It is to be noted that 212 bytes which make a data region for the L channel or the R channel is called sound frame.

An address format in the mini disc system is described below with reference to FIGS. 3A and 3B.

An address of each sector is represented by a cluster address and a sector address. As seen from FIG. 3A, a cluster address has a value of 16 bits (=2 bytes), and a sector address has a value of 8 bits (=1 byte).

Thus, an address of 3 bytes is recorded at the top position of each sector.

Further, by adding a sound group address of 4 bits, also an address of a sound group in a sector can be represented. For example, if a sound group address is described for management of the U-TOC or the like, setting of a reproduction position in a unit of a sound group is allowed.

By the way, in the U-TOC or the AUX-TOC, in order to allow a cluster address, a sector address and a sound group address to be represented in three bytes, such a compacted type address as seen in FIG. 3B is used.

First, a sector can be represented with 6 bits because one cluster includes 36 sectors. Accordingly, the two high order bits of a sector address can be omitted. Similarly, since a cluster up to the outermost circumference of the disc can be represented with 14 bits, the two high order bits can be omitted.

By omitting the two most significant bits of each of a sector address and a cluster address, an address which allows designation also of a sound group can be represented with 3 bytes.

Further, in the U-TOC and the AUX-TOC which are hereinafter described, an address to be used for management of a reproduction position, a reproduction timing or the like is described in an address of the compacted type. The address may be represented in the form of an absolute address or in the form of an offset address. The offset address is, for example, a relative address which represents the position in each program such as a tune with reference to the top position of the program determined as a position of the address 0. An example of the offset address is described below with reference to FIGS. 4A, 4B, 4C, 4D, 4E, 4F, 4G and 4H.

As hereinafter described with reference to FIGS. 5A and 5B, programs such as tunes are recorded in clusters beginning with the 50th cluster on the disc, that is, the 32h-th cluster in hexadecimal notation. It is to be noted that any numerical value followed by "h" represents a value of the hexadecimal notation.

For example, the address value of the address of the top position of the first program (that is, cluster 32h, sector 00h, sound group 0h) is "00000000001100100000000000000" as seen in FIG. 4A, that is, 0032h, 00h, 0h. If this is represented in the compacted type, it is "000000001100100000000000", that is, 00h, C8h, 00h.

With the top address determined as a start point, the address of a certain point in the first program, for example, the address of the cluster 0032h, sector 04h, sound group 0h as in FIG. 4C is, in the compacted absolute address representation as in FIG. 4D, "00h, C8h, 40h". Meanwhile, the address described above in the offset address representation is "00h, 00h, 40h" as seen in FIG. 4E because the cluster 00h, sector 04h, sound group 0h is represented as a finite difference from the start portion provided by the top address.

On the other hand, with the top address of FIG. 4A determined as a start point, another certain position in the first program, for example, the address of the cluster 0032h, sector 13h, sound group 9h as in FIG. 4F is, in the compacted absolute address, "00h, C9h, 39h" as seen in FIG. 4G, but is, in the offset address, "00h, 01h, 39h" as seen in FIG. 4H.

Like the examples described above, a position in a program can be designated with an absolute address or an offset address.

3. Area Structure

An area structure of the disc 90 in the present embodiment is described below with reference to FIGS. 5A and 5B.

Figures 5A, 5B:
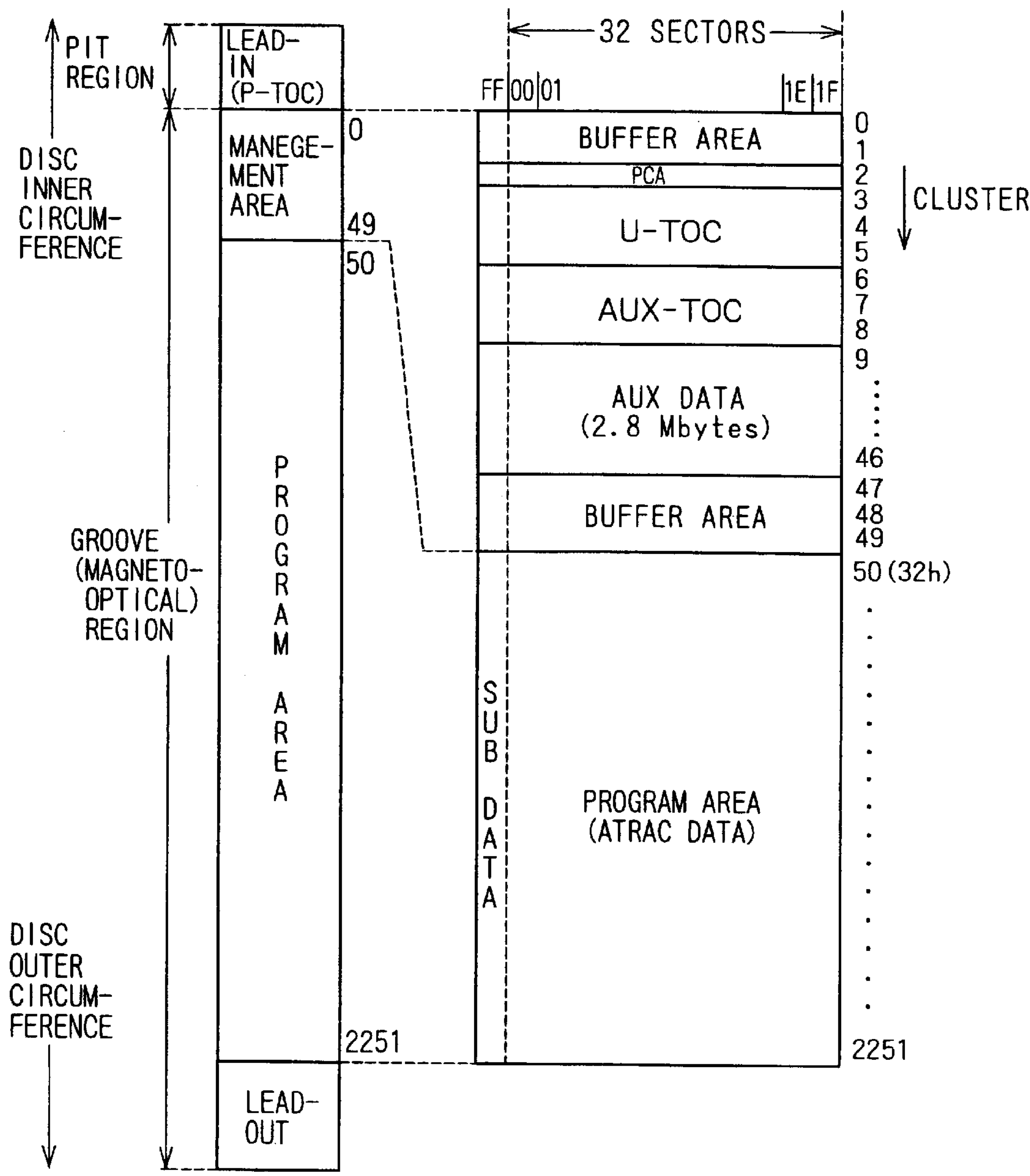
FIG. 5A is a diagrammatic view showing an area structure of the disc.
FIG. 5B is a diagrammatic view showing details of a management area of the area structure of the disc.

FIG. 5A shows different areas from the innermost circumference side to the outermost circumference side of the disc 90.

The disc 90 as a magneto-optical disc has, on the innermost circumference side, a pit region in which read only data in the form of embossed pits are formed and the P-TOC is recorded.

The remaining region on the outer circumferences with respect to the pit region is formed as a magneto-optical region and as a recording/reproduction allowing region in which grooves as guide grooves for recording tracks are formed.

A section of the magneto-optical region from the cluster 0 on the innermost circumference side to the cluster 49 is used as a management area whereas another section from the cluster 50 to the cluster 2,251 is used as a program area in which actual programs such as tunes are recorded. The remaining outer circumferential area with respect to the program area is used as a lead-out area.

The management area is illustrated more particularly in FIG. 5B. FIG. 5B shows sectors in a horizontal direction and shows clusters in a vertical direction.

The clusters 0 and 1 in the management area form a buffer area to the pit region. The cluster 2 is used as a power calibration area PCA and used for output power adjustment of a laser beam and so forth.

In the clusters 3, 4 and 5, the U-TOC are recorded. While contents of the U-TOC are hereinafter described, a data format is defined in each sector in one cluster, and predetermined management information is recorded in each sector. The U-TOC data are repetitively recorded three times in the three clusters 3, 4 and 5 having the sectors in which the U-TOC data are recorded.

The clusters 6, 7 and 8 are used to record the AUX-TOC. Although also contents of the AUX-TOC are hereinafter described, a data format is defined in each sector in one cluster and predetermined management information is recorded in each sector. The AUX-TOC data are repetitively recorded three times in the three clusters 6, 7 and 8 having the sectors in which the AUX-TOC data are recorded.

The region from the cluster 9 to the cluster 46 is used to record AUX data. A data file of AUX data is formed in a unit of a sector and includes picture file sectors as a still picture file, text file sectors as a character information file, karaoke text file sectors as a character information file synchronized with a program and so forth which are hereinafter described.

Data file of AUX data, a region in which AUX data files can be recorded in the AUX data area, and so forth are managed with the AUX-TOC.

It is to be noted that the recording capacity for data files in the AUX data area is 2.8 Mbytes where an error correction system mode 2 is presumed.

Also it is possible to form a second AUX data area, for example, in a rear half portion of the program area or a region on the outer circumference side than the program area such as, for example, the lead-out portion to increase the recording capacity for data files.

The clusters 47, 48 and 49 are used as a buffer area to the program area.

In the program area beginning with the cluster 50 (=32h), data of one or a plurality of tunes or the like are recorded in the form compressed by a compression system called ATRAC.

Programs recorded and a recording allowing region are managed with the U-TOC.

It is to be noted that, in each cluster in the program region, the sector FFh can be used for recording of some information as sub data as described hereinabove.

It is to be noted that, although, in the present mini disc system, a reproduction only disc on which programs and so forth are recorded as reproduction only data in the form of pits can be used, the entire area of the reproduction only disc is formed as a pit area. The programs recorded on the reproduction only disc are managed with the P-TOC in a manner substantially similar to that with the U-TOC, which is hereinafter described, and the U-TOC is not formed.

However, where reproduction only data files are recorded as AUX data, the AUX-TOC for managing the files is recorded.

4. U-TOC 4-1 U-TOC Sector 0

As described hereinabove, in order to perform a recording and reproduction operations of a track as a program onto and from the disc 90, the system controller 11 reads out the P-TOC and the U-TOC as management information recorded on the disc 90 in advance, and refers to them when necessary.

Here, the U-TOC sectors as management information to be used for management of recording and reproduction operations of tracks, tunes and so forth on the disc 90 are described.

It is to be noted that the P-TOC is formed in the pit area on the innermost circumference side of the disc 90 as described hereinabove with reference to FIG. 5A. Then, management of the positions of recordable areas (recordable user areas), the lead-out area and the U-TOC area and so forth of the disc is performed based on the P-TOC. It is to be noted that, with a read only optical disc on which all data are recorded in the form of pits, also management of tunes recorded as a ROM can be performed with the P-TOC, but no U-TOC is formed.

Detailed description of the P-TOC is omitted, and here, the U-TOC which is provided on a recordable magneto-optical disc is described.

FIG. 6 shows the format of the U-TOC sector 0.

It is to be noted that, as the U-TOC sectors, the sectors from the sector 0 up to the sector 32 can be provided, and among the sectors, the sector 1 and the sector 4 can be used as an area in which character information is to be recorded and the sector 2 is used as an area into which recording dates/times are to be recorded.

First, the U-TOC sector 0 required without fail for recording and reproduction operations for the disc 90 is described.

The U-TOC sector 0 is a data area in which management information principally regarding programs such as tunes recorded by a user and free areas into which programs can be recorded newly is recorded.

For example, if a user intends to record a certain tune onto the disc 90, the system controller 11 searches out a free area on the disc 90 from the U-TOC sector 0 and records audio data into the free area. On the other hand, upon reproduction, an area in which a tune to be reproduced is recorded is discriminated from the U-TOC sector 0, and the area is accessed to perform a reproduction operation.

At the top position of the data region (4 bytes×588=2,352 bytes) of the U-TOC sector 0, a synchronization pattern in which several 1-byte data of all 0s or all 1s are formed successively is recorded.

Then, an address including a cluster address (Cluster H) (Cluster L) and a sector address (Sector) is recorded over 3 bytes, and 1 byte of mode information (MODE) is added. The bytes mentioned form a header. The address of 3 bytes here is an address of the sector itself.

The structure of the header part in which the synchronization pattern and an address are recorded applies not only to the U-TOC sector 0 but also to the P-TOC sectors, AUX-TOC sectors, AUX file sectors and program sectors, and although description of the header part of any of the sectors hereinafter described with reference to several figures beginning with FIG. 8 is omitted, in the header part of any of the sectors, an address of the sector itself and the synchronization pattern are recorded in a unit of a sector.

It is to be noted that, as the address of a sector itself, the cluster address is represented in 2 bytes of a high order address (Cluster H) and a low order address (Cluster L) and the sector address (Sector) is represented with 1 byte. In other words, the address is not of the compacted type.

Then, at predetermined byte positions, data of a maker code, a model code, a track number (First TNO) of the first track, a track number (Last TNO) of the last track, a sector use situation (Used sectors), a disc serial number, a disc ID and so forth are recorded.

Further, a region is prepared in which various pointers (P-DFA, P-EMPTY, P-FRA, P-TNO1 to P-TNO255) provided to allow identification of regions of tracks or tunes recorded by recording operations performed by a user, free areas and so forth by making them correspond to a table section which is hereinafter described are to be recorded.

In the table section which is made correspond to the pointers (P-DFA to P-TNO255), 255 part tables 01h to FFh are provided. In each part table, a start address which defines a start point of a given part, an end address which defines an end point of the part, and mode information of the part called track mode are recorded. Further, since a part indicated by a part table may possibly be linked to another part, link information indicative of a part table in which a start address and an end address of the part of the destination of the link are recorded can be recorded.

It is to be noted that the term "part" signifies a track portion in which successive data in time are recorded physically continuously in one track.

Addresses represented as start addresses and end addresses designate a part or each of a plurality of parts which form a track of a tune.

Those addresses are recorded in compacted representations and each designates a cluster, a sector and a sound group.

In a recording and reproduction apparatus of the type described above, data of a program or track as a set of audio data are sometimes recorded physically discontinuously or discretely in a plurality of parts. This is because, as regards audio data or the like recorded by a user, even if they are recorded over a plurality of parts, there is no trouble in a reproduction operation by successively accessing the parts to reproduce them, and this allows efficient use of recordable areas and so forth.

To this end, link information is provided, and for example, by designating a part table to be linked based on the numbers 01h to FFh given to the individual part tables, the part table can be linked.

In particular, in the management table section in the U-TOC sector 0, one part table represents one part, and, for example, for a tune formed from three parts linked to each other, the part positions are managed with three part tables linked with the link information.

It is to be noted that the link information is actually represented by a value of byte positions in the U-TOC sector 0 obtained by a predetermined calculation processing. That is, a part table is designated by 304+(link information)×8(th byte).

Each of the part tables 01h to FFh in the U-TOC sector 0 indicates contents of the part in the following manner with the pointers (P-DFA, P-EMPTY, P-FRA, P-TNO1 to P-TNO255) in the pointer section.

The pointer P-DFA indicates a defective region on the magneto-optical disc 90 and designates a part table or the top one of a plurality of part tables which represents a track portion (=part) or represent track portions (=parts) which provides or provide a defective region because of damage to the same. In short, if the magneto-optical disc 90 includes a defective part, one of the part tables 01h to FFh is recorded in the pointer P-DFA, and in the corresponding part table, the defective part is indicated with start and end addresses. Further, if the magneto-optical disc 90 includes another defective part, the part table of this defective part is designated as the link information in the first-mentioned part table, and also in the part table, the defective part is indicated. If no other defective part is included, then the link information is set, for example, to 00h, which indicates absence of any further link.

The pointer P-EMPTY indicates a part table of a non-used part or the top one of a plurality of non-used part tables in the management table section. Where a non-used part table is present, any one of 01h to FFh is recorded in the pointer P-EMPTY.

Where a plurality of non-used part tables are present, such part tables are successively designated with link information from the part table designated by the pointer P-EMPTY such that all of the non-used part tables are linked on the management table section.

The pointer P-RFA indicates a free area including an erased area on the magneto-optical disc 90 into which data can be written and designates a part table or the top one of a plurality of part tables which includes or include a part or parts as a track portion or portions which forms or form a free area. In particular, if a free area is present, then one of 01h to FFh is recorded in the pointer P-FRA, and in a part table corresponding to it, the part which forms the free area is indicated with start and end addresses. Further, where a plurality of such parts are present, or in other words, where a plurality of such part tables are present, the part tables are successively designated with link information until the link information of 00h is found.

Figure 7:
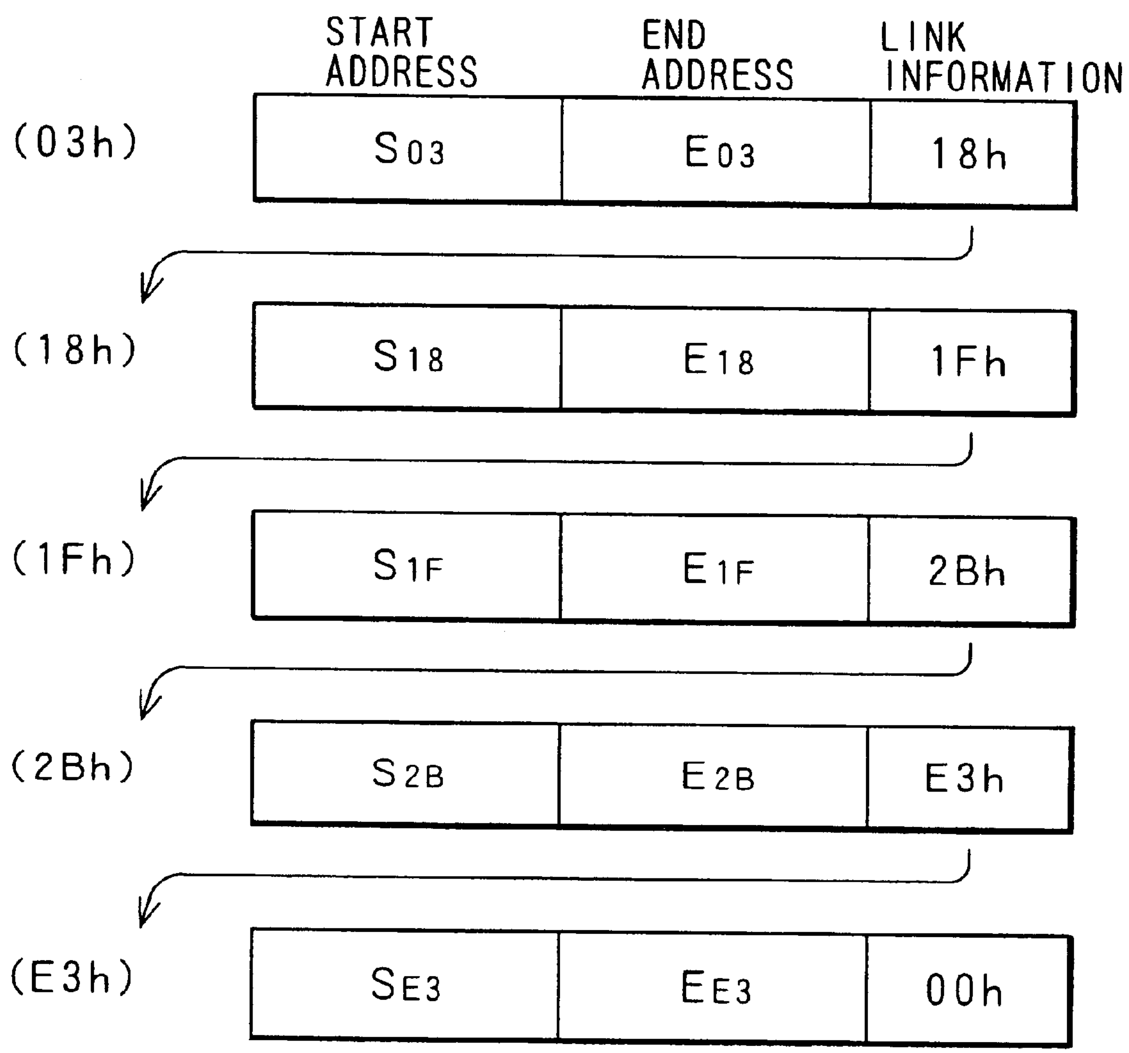
FIG. 7 is a diagrammatic view illustrating a form of a link provided by the U-TOC sector 0 of the disc.

FIG. 7 schematically illustrates a manner of management of parts which form a free area with part tables. In FIG. 7, the parts 03h, 18h, 1Fh, 2Bh and E3h form a free area and are successively linked beginning with the pointer P-FRA. Also such defective region as described above and non-used part tables are managed in a similar manner.

Referring back to FIG. 6, the pointers P-TNO1 to P-TNO255 indicate tracks of tunes or the like recorded on the magneto-optical disc 90 by a user. For example, the pointer P-TNO1 designates a part table which indicates a part or a top one with respect to time of a plurality of parts in which data of the first track are recorded.

For example, if a tune of the first program as a first track is recorded without being divided, that is, recorded in one part, on the disc, the recording area of the first track is designated with start and end addresses in a part table indicated by the pointer P-TNO1.

Further, if a tune of the second program as a second track is recorded discretely in a plurality of parts on the disc, then the parts for indicating the recorded positions of the second track are designated in accordance with an order in time. In particular, beginning with a part table designated by the pointer P-TNO2, the other part tables are successively designated in accordance with an order in time with link information to link the parts until the part table whose link information is 00h is reached. The manner of linkage is similar to that described hereinabove with reference to FIG. 7.

Since all parts in which, for example, data of the second tune are recorded are successively designated and recorded in this manner, when reproduction of the second tune or overwrite recording into the region of the second tune is to be performed using the data of the U-TOC sector 0, the optical head 3 and the magnetic head 6*a* can be controlled to access the discrete parts to extract the continuous music information or to effect recording with the recording area used efficiently.

In this manner, with the re-writable magneto-optical disc 90, management of the areas on the disc is performed based on the P-TOC and management of tunes, a free area and so forth recorded in the recordable service area is performed based on the U-TOC.

4-2 U-TOC Sector 1

FIG. 8 shows the format of the U-TOC sector 1. The U-TOC sector 1 is a data region into which inputted character information is recorded when a track name is to be applied to a recorded track or a disc name as information of the name or the like of the disc itself is to be applied to the disc.

In the U-TOC sector 1, pointers P-TNA1 to P-TNA255 are prepared as a pointer section which corresponds to recorded tracks, and 255 slots 01h to FFh of 8 bytes designated by the pointers P-TNA1 to P-TNA255 and one slot 00h of 8 bytes are prepared. The U-TOC sector 1 is thus used for management of character data in a substantially similar manner to that of the U-TOC sector 0.

Character information representing a disc title or a track name is recorded in ASCII codes in each of the slots 01h to FFh.

For example, in a slot designated by the pointer P-TNA1, characters inputted corresponding to the first track by a user are recorded. Further, as a slot is linked with link information, a number of characters greater than 7 bytes (7 characters) may be inputted for one track.

It is to be noted that the slot 00h of 8 bytes is prepared as an area for exclusive use to record a disc name and is prevented from being designated by the pointer P-TNA(x).

Also in the U-TOC sector 1, the pointer P-EMPTY is used for management of non-used slots.

4-3 U-TOC Sector 2

FIG. 9 shows the format of the U-TOC sector 2. The U-TOC sector 2 is a data region in which recording dates/times of tunes recorded by a user are recorded principally.

In the U-TOC sector 2, pointers P-TRD1 to P-TRD255 are prepared as a pointer section which corresponds to tracks recorded, and a slot section designated by the pointers P-TRD1 to P-TRD255 is prepared. Further, 255 slots 01h to FFh of 8 bytes are prepared in the slot section, and the U-TOC sector 2 is used for management of date/time data substantially in a similar manner to that of the U-TOC sector 0.

In the slots 01h to FFh, recording date/times of tracks as tunes are recorded in 6 bytes, in which values corresponding to the year, the month, the day, the hour, the minute and the second are recorded successively for each one byte. The remaining 2 bytes are prepared for a maker code and a model code, and code data representing a manufacturer of a recording apparatus used for recording of the tune and code data representing a type of the recording apparatus used for recording are recorded in them.

For example, if a track as a first tune is recorded onto the disc, then the recording date/time, the maker code of the recording apparatus used and the model code are recorded into a slot designated by the pointer P-TRD1. The recording date/time data are automatically recorded by the system controller 11 referring to an internal clock.

The slot 00h of 8 bytes is prepared as an area for exclusive use to record the recording date/time of the disc and is prevented from being designated by the pointer P-TRD(x).

It is to be noted that, also in the U-TOC sector 2, the slot pointer P-EMPTY is used for management of slots which are not used. In such non-used slots, link information is recorded in place of a model code. Thus, the non-used slots are linked with such link information beginning with the slot pointer P-EMPTY to manage the non-used slots.

4-4 U-TOC Sector 4

Figure 10:
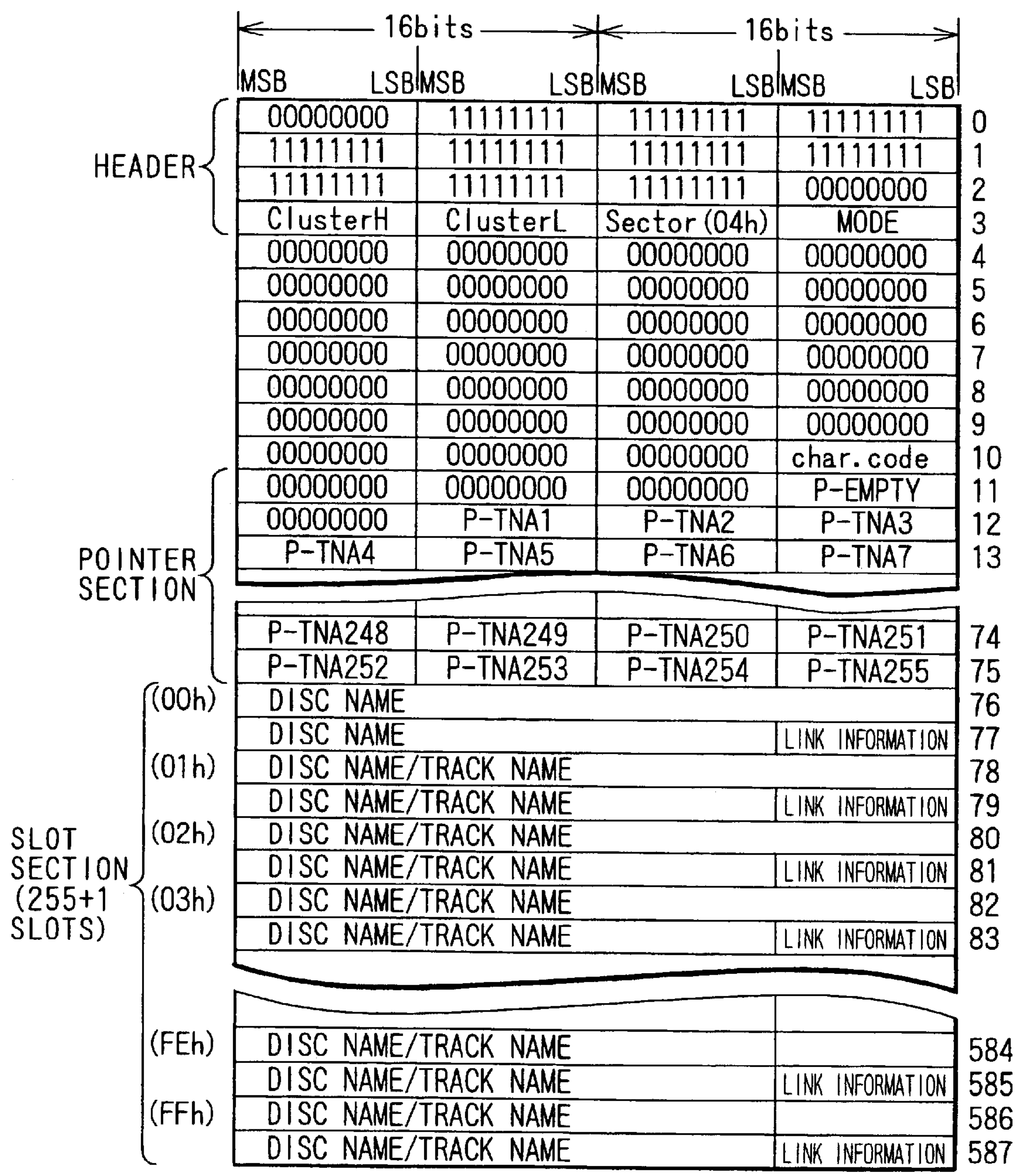
FIG. 10 is a diagrammatic view illustrating the U-TOC sector 4 of the disc.

FIG. 10 shows the U-TOC sector 4. The U-TOC sector 4 is a data area into which inputted character information is recorded when a tune name as a track name is to be applied to a track recorded by a user or a disc name is to be applied to the disc similarly to the U-TOC sector 1 described hereinabove. As can be seen from comparison of FIG. 10 with FIG. 8, the format of the U-TOC sector 4 is substantially similar to that of the U-TOC sector 1.

However, the U-TOC sector 4 allows recording of 2 byte codes as code data corresponding to a kanji or a European character, and in addition to data of the U-TOC sector 1 of FIG. 8, an attribute of a character code is recorded at a predetermined byte position.

Management of character information of the U-TOC sector 4 is performed with pointers P-TNA1 to P-TNA255 and slots 01h to FFh designated by the pointers P-TNAl to P-TNA255.

It is to be noted that the recording and reproduction apparatus 1 of the present embodiment can handle a reproduction only disc on which no U-TOC is formed. Where such a reproduction only disc is used, it may have character information of a disc name and track names recorded in the P-TOC thereof.

In particular, sectors substantially similar to the U-TOC sector 1 and the U-TOC sector 4 are prepared as P-TOC sectors, and a disc maker can record a disc name and track names on the P-TOC sectors in advance.

5. AUX-TOC 5-1 AUX-TOC Sector 0

In the disc 90 in the present embodiment, regions in which AUX data files and the AUX-TOC are to be recorded are set as described hereinabove with reference to FIGS. 5A and 5B, and character information, image information and so forth independent of tracks of programs such as tunes can be recorded as AUX data files.

Such AUX data files are managed with the AUX-TOC. The AUX-TOC is recorded three times repetitively over 3 clusters, and accordingly, as a management data structure, 32 sectors in one cluster can be used similarly as in the U-TOC.

In the present embodiment, the AUX-TOC sectors 0 to 5 are set to manage the AUX data files as described below.

First, the format of the AUX-TOC sector 0 is described with reference to FIG. 11.

The AUX-TOC sector 0 is used as an area allocation table principally for management of a free area in the overall AUX data region.

As seen from FIG. 11, in the AUX-TOC sector 0, a header including a sector address (Sector)=00h and mode information (MODE)=02h is recorded first, and the four characters of "M", "D", "A" and "D" are recorded in the form of ASCII codes in a region of four bytes at predetermined byte positions. The characters "M", "D", "A" and "D" indicate a format ID and are recorded commonly at a same byte position in the AUX-TOC sectors which are hereinafter described.

Further, a maker code and a model code are recorded at predetermined byte positions following the format ID, and used sector information is recorded at predetermined byte positions following the maker code and the mode code.

The used sector information indicates a situation of use of sectors in the AUX-TOC.

The eight bits d8 to d1 which form the Used Sector 0 correspond to 0 to 7 sectors, respectively. In a similar manner, the 8 bits d8 to d1 of the Used Sector 1 correspond to 8 to 15 sectors, respectively. The 8 bits d8 to d1 of the Used Sector 2 correspond to 16 to 23 sectors, respectively. The 8 bits d8 to d1 of the Used Sector 3 correspond to 24 to 31 sectors, respectively.

In the AUX-TOC sector 0, a pointer section is formed from pointers P-EMPTY and P-BLANK.

In a table section, 99 part tables of 8 bits in which a start address, an end address and link information are formed such that management of the AUX data area may be performed in a similar manner as with the U-TOC sector 0 described hereinabove. In this instance, however, part tables 01h to 63h are used as the table section, but the remaining part tables 64h to FFh are not used with all 0s (zeros) placed therein.

It is to be noted that, although the part tables beginning with the part table 64h may possibly be used as the table section, for practical use, it is sufficient to use 99 part tables for management. Here, the reason why the part tables 01h to 63h are used as the effective table section is that it is determined taking a particular capacity of the buffer memory 13 into consideration.

The pointer P-EMPTY is used for management in the form of a linkage of non-used part tables in the AUX-TOC sector 0.

The pointer P-BLANK is used for management in the form of a linkage of part tables of a free area in the AUX data area, that is, non-recorded regions into which AUX data files can be recorded.

It is to be noted that a start address and an end address are represented in compacted representations and consequently designation up to a sound group position is allowed. However, in the AUX-TOC sector 0 in the present embodiment, it is prescribed to designate an address in a unit of a cluster, and all 0s are placed at the data position indicating a sound group unit in the sector, start address and end address.

Also the start address and the end address recorded in 3 bytes in the table section or the slot section in the AUX-TOC sectors 1 to 5 described below are represented in compacted representations. Further, the prescription of up to which data unit a start address or an end address designates is different among different sector contents, such prescriptions are hereinafter described suitably.

Where the AUX-TOC is formed on a reproduction only disc, no part table uses link information.

5-2 AUX-TOC Sector 1

The AUX-TOC sectors 1 to 3 are used for management of picture files as still picture information.

The AUX-TOC sector 1 shown in FIG. 12 is a management sector as a picture allocation table and is used for management of data files recorded as picture files in the AUX data area.

With the AUX-TOC sector 1, management of picture files is performed in a manner similar to that with the U-TOC sector 0.

In the present embodiment, the file length of a picture file of one still picture recorded in the AUX data area is not prescribed specifically. In the present embodiment, however, 100 picture files in the maximum including a cover picture can be managed as hereinafter described. Accordingly, also the number of substantially recordable picture files is 100.

The cover picture may be, for example, a cover picture which is a disc jacket or the like.

In the AUX-TOC sector 1, a sector address (Sector)=01h and mode information (MODE)=02h are recorded in the header.

As pointers P-PNO(x) to be used for management of 99 picture files other than the cover picture, pointers P-PNO1 to P-PNO99 are formed in the AUX-TOC sector 1. At individual byte positions in the pointers from the pointer P-PNO99 to the pointer immediately prior to the table section, 00h is recorded.

However, in order to allow the magneto-optical disc 90 to cope with a case wherein recording of a greater number of picture files is made possible by an expansion of an AUX data area or a change of the file size in the future, it is possible to set, as the pointers P-PNO(x), the pointers P-PNO100 to P-PNO255 to byte positions from the byte position following the pointers P-PNO1 to P-PNO99 to the byte position of the pointer P-PNO255 indicated in blankets in FIG. 12.

Further, the region of 2 bytes following the maker code and the model code is used for the pointers First PNO and Last PNO. In the pointer First PNO, the number x of the first one P-PNO(x) of used ones of the pointers P-PNO1 to P-PNO99, and the number x of the last one P-PNO(x) of used ones of the pointers P-PNO1 to P-PNO99 is recorded in the pointer Last PNO. For example, if it is assumed that, from among the pointers P-PNO1 to P-PNO99, the pointers P-PNO1 to P-PNO5 are used, then the pointer First PNO= 01h and the pointer Last PNO=05h are recorded.

In the pointer section, also the pointers P-PFRA and P-EMPTY are formed.

Further, in the table section, 99 part tables 01h to 63h in each of which a start address, an end address and a picture mode (S. Pict. mode) are recorded are formed as part tables of 8 bytes corresponding to the individual pointers. In this instance, similarly to the AUX-TOC sector 0, the remaining part tables 64h to FFh are not used with all 0s (zeros) placed therein.

The part table 00h is prevented from being designated by any pointer, and is used exclusively for address management of a picture file positioned as a cover picture. The picture mode (S. Pict. mode) mentioned above is provided also in the part table 00h for a cover picture.

The pointers P-PNO1 to P-PNO99 are used for management of regions, in each of which one picture file is recorded, by designating a particular part table. For example, in a part table designated by the pointer P-PNO1, a start address, an end address and a picture mode (S. Pict. mode) of a picture file of image data for a first picture are recorded.

It is to be noted that, with the AUX-TOC sector 1, file management which is performed by linking part tables with link information (Link-P) is not performed. In other words, one picture file is not recorded in sections physically spaced from each other.

However, non-used part tables in the AUX-TOC sector 1 are managed with link information, which is provided by the 8th byte of each part table, beginning with the pointer P-EMPTY.

The pointer P-PFRA in the AUX-TOC sector 1 is a pointer to be used for management of a free area where picture data whose amount is smaller than 1 cluster are recorded in a region of 1 cluster in the AUX data area and the region in the 1 cluster in which picture data are not recorded is a non-recorded region or recordable region and hence a free area. In short, an address of a section as a free area is recorded in a part table designated by the pointer P-PFRA.

The picture mode (S. Pict. mode) in each part table in the AUX-TOC sector 1 represents mode information including a copy status of a picture file recorded in an address designated by each part table.

The picture mode (S. Pict. mode) is defined, for example, in such a manner as illustrated in FIG. 19A.

The picture mode is composed of 8 bits d1 to d8, and a copy status is indicated by the two bits of d1 and d2. The copy status is information set regarding whether or not copying of a corresponding picture file is permitted.

In this instance, if the copy status is 0h, then this represents that copying is permitted, and the picture file can be copied any number of times.

If the copy status is 1h, this represents that copying of the picture file is permitted only once.

If the copy status is 2h, this represents that copying of the picture file is permitted only once over an authenticated data bus.

If the copy status is 3h, this represents that copying of the picture file is inhibited.

The remaining 6 bits d3 to d8 are undefined here.

If copying of data is performed for a certain picture file, then the copy status to be given to the picture file after copying is updated in such a manner as illustrated in FIG. 19B from contents of the copy status which has been given to the picture file before copying.

In particular, if the copy status of a certain picture file is 0h before copying, then the copy status 0h is given to the picture file also after copying. In other words, copying of the picture file is permitted any number of times.

On the other hand, if the copy status is 1h or 2h before copying, then the copy status is changed to 3h after copying so that later copying of the picture file is inhibited.

5-3 AUX-TOC Sector 2

FIG. 13 shows the format of the AUX-TOC sector 2. The AUX-TOC sector 2 is used as a picture information table and as a data region into which, where information called picture information is added to each picture file recorded, the information as the picture information is recorded as character information. Here, the picture information in the present embodiment may include a picture name, a recording date/time and a URL (Uniform Resource Locator) of the Internet.

Here, before the AUX-TOC sector 2 is described, a structure of a picture information file recorded in the table section of the AUX-TOC sector 2 is described with reference to FIG. 20. The picture information file here includes information of picture information corresponding to one picture file.

Figure 20:
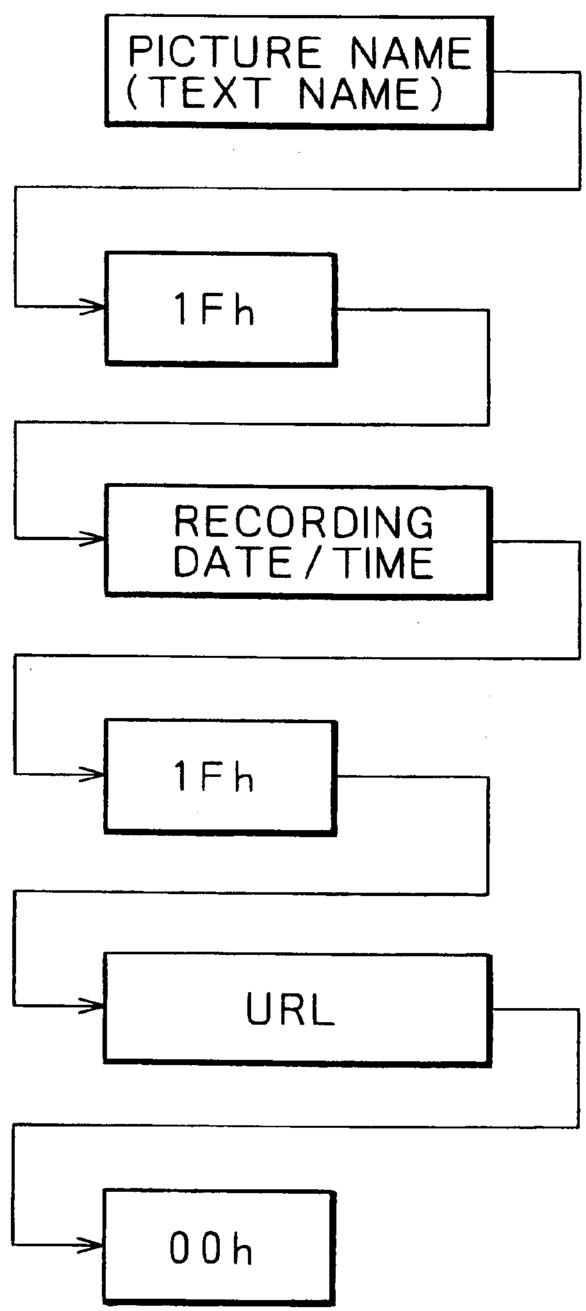
FIG. 20 is a diagrammatic view showing a data structure of a picture (text) information file on the disc.

As seen from FIG. 20, the picture information file has a data unit as a picture name disposed at the top thereof in the form of ASCII codes or some other character codes. The picture name is recorded in accordance with the format of character information recorded in a slot of the U-TOC sector 4 shown in FIG. 10.

Next to the data unit as a picture name, 1Fh indicating a delimiting point between data units is disposed, and a data unit for the recording date/time is disposed next to 1Fh. The recording date/time is recorded in accordance with the format of the recording date/time recorded in a slot of the U-TOC sector 2 shown in FIG. 9 using 6 bytes as described above.

Next to the data unit of the recording date/time, 1Fh mentioned above is disposed, and character information as a URL is disposed next to this 1Fh. The URL may be recorded as an ASCII code from the MSB (Most Significant Bit) without depending upon a character code (character.code) which will be hereinafter described. Then, 00h is disposed at the last end of the file.

It is to be noted that, where one of the data units of the picture name, recording date/time and URL has no substantive contents, 00h can be recorded in place of the data unit.

In regard to the URL described above, for example, where the picture file is obtained by downloading it from a web page of the Internet, the URL of the web page is applied as the URL to the picture file.

Referring back to FIG. 13, the AUX-TOC sector 2 is described.

First, in the header of the AUX-DOC sector 2, a sector address (Sector)=02h and mode information (MODE)=02H are recorded.

Further, in the AUX-TOC sector 2, pointers P-PIF1 to P-PIF99 are prepared in the pointer section so as to correspond to individual picture files recorded on the disc. Further, in the slot section, 255 slots 01h to FFh of 8 bytes which can be designated by the pointers P-PIF1 to P-PIF99 and one slot 00h of 8 bytes are prepared. However, the pointers P-PIF can be expanded up to P-PIF255.

In a region of 2 bytes following the maker code and the model code, pointers First PIF and Last PIF are recorded. The pointer First PIF has recorded therein the number of the first one P-PIF of used ones of the pointers P-PIF1 to P-PIF99. The pointer Last PIF has recorded therein the number of the last one P-PIF of the used ones of the pointers P-PIF1 to P-PIF99.

In the slots 00h to FFh, character information as picture information files are recorded in the form of ASCII codes or some other character codes. The type of characters recorded is defined by a character code (described as chara.code in FIG. 13) recorded at a predetermined byte position on the AUX-TOC sector 2.

The character code is defined such that, for example, 00h designates the ASCII code; 01h designates the modified ISO. 8859-1 code; 02h designates the music shifted JIS (Japan Industrial Standard) code; 03h designates the KS C 5601-1989 code (Korean language); and 04h designates the GB 2312-80 code (Chinese language).

The pointers P-PIF1 to P-PIF99 designate particular part tables in which picture information files of file numbers corresponding to the numbers of the individual pointers are recorded. For example, in a slot designated by the pointer P-PIF1, characters corresponding to a picture of a first picture file are recorded. It is to be noted that the slot 00h of 8 bytes is used as an exclusive area for starting of recording of a picture information file corresponding to the cover picture and is prevented from being designated by the pointer P-PIF(x).

The slots are linked with link information so that a picture information file corresponding to one picture file may be recorded even if the size thereof is greater than 7 bytes.

The pointer P-EMPTY is used for management of non-used slots in the form of a link.

It is to be noted that different AUX-TOC sectors may be set for the picture name, recording date/time and URL such that they may be managed individually. However, where various character information applied to picture files is managed collectively as a picture information file as seen in FIGS. 13 and 20, the recording region of the disc is utilized effectively. This is because the amount of data (number of TOC sectors) required for management information is smaller than that where different AUX-TOC sectors are provided for the picture name, recording date/time and URL to manage them.

5-4 AUX-TOC Sector 3

The AUX-TOC sector 3 shown in FIG. 14 is used as a picture playback sequence table in which management information for outputting a picture file, that is, displaying an image of the picture file, in synchronism with reproduction of a program such as a tune.

In the header of the AUX-TOC sector 3, a picture address (Sector)=03h and mode information (MODE)=02h are recorded.

Further, as the pointer section corresponding to recorded picture files, pointers P-TNP1 to P-TNP99 are prepared. The pointers P-TNP can be expanded up to P-TNP255. The pointers P-TNP1 to P-TNP99 correspond to track numbers of audio data recorded in a unit of a track in the program area. In short, the pointers P-TNP1 to P-TNP99 correspond to the first to 99th tracks.

In the table section, 99 part tables 01h to 63h of 8 bytes designated by the pointers P-TNPl to P-TNP99 and one part table 00h of 8 bytes are prepared. Also in this instance, all 0s are recorded in the remaining part tables 64h to FFh which are not used. In the pointers First TNP and Last TNO following the maker code and the model code, the number of the first one P-TNP of used ones of the pointers P-TNP1 to P-TNP99 and the number of the last one P-TNP of the used ones of the pointers P-TNP1 to P-TNP99 are recorded, respectively.

In each of the part tables designated by the pointers P-TNP1 to P-TNP99, a start address and an end address are recorded in the form of offset addresses from the address of the top position of the track. With the AUX-TOC sector 3, an address up to a unit of a sound group is designated.

In the 4th byte of each part table, a particular picture file is indicated as a pointer P-PNOj. The pointer P-PNOj has a value corresponding to a corresponding one of picture files (P-PNO1 to P-PNO99) managed with the AUX-TOC sector 1. Further, another part table can be linked with link information. In other words, it is possible to define a plurality of picture files so that they can be displayed on a same track.

For example, when reproduction of a tune of a first track is performed, if it is intended to output a picture of the first picture file at a particular timing during the reproduction, then a start address and an end address of a picture outputting period are recorded into a part table designated by the pointer P-TNP1 corresponding to the first track, and as a picture to be outputted, a particular picture file is indicated with the pointer P-PNOj. Here, a case wherein it is desired to display or output a picture of the first picture file for a period until one minute and 30 seconds pass after a point of time after one minute passes after reproduction of the first track is begun is considered. In this instance, an address point which corresponds to just one minute after the beginning of reproduction of the first track and another address which corresponds to one minute and 30 seconds are recorded as a start address and an end address in the form of offset addresses, respectively, into a part table designated with the pointer P-TNP1. Then, the pointer P-PNOj is set to the value of P-PNO1 so that it may designate the first picture file.

Where it is desired to switchably display a plurality of pictures during reproduction of one track, part tables are linked to manage the picture files to be outputted and the outputting periods.

It is to be noted that, while the part table 00h corresponds to the cover picture, since it is prescribed that, in principle, the cover picture be not outputted in synchronism with an audio track, all 0s are recorded as the start address and the end address of the part table 00h.

By the way, if the start address and the end address of a part table corresponding to a certain track are both all 0s, then a picture of a picture file indicated by the designated pointer P-PNOJ is displayed within a period in which sound of the track is outputted.

If only the end address is all 0s, then a picture file designated with the pointer P-PNOj is outputted until a start address of a picture file to be displayed subsequently is reached within a period of reproduction of the track.

If both of the start address and the end address are different from all 0s and have an equal value, displaying and outputting of the picture file are inhibited.

Also with the AUX-TOC sector 5, non-used part tables are managed using a link from the pointer P-EMPTY.

5-5 AUX-TOC Sector 4

The AUX-TOC sectors 4 and 5 are used for management of text files.

First, the AUX-TOC sector 4 shown in FIG. 15 is a management sector as a text allocation table and is used for management of data files recorded as text files in the AUX data area.

With the AUX-TOC sector 4, management of text files is performed in a similar manner to that with the U-TOC sector 0.

If it is assumed that the AUX data area is used entirely for recording of text files, then text data for 38 clusters×32 sectors=2,324 bytes can be recorded there. Such text data can be managed as 255 files in the maximum with the AUX-TOC sector 4. However, it is assumed here that up to 100 files including one cover picture file are managed as hereinafter described.

It is to be noted that the file length of one text file is equal to the length of one sector.

One particular text file can be regarded as a text file (cover text) corresponding to the cover picture of the disc.

In the header of the AUX-TOC sector 4, a sector address (Sector)=04h and mode information (MODE) are recorded.

As pointers P-TXNO(x) to be used for management of text files, pointers P-TXNO1 to P-TXNO99 are formed in the AUX-TOC sector 6. The pointers P-TXNO1 to P-TXNO99 correspond to the track numbers of the audio tracks. It is to be noted that the pointers P-TXNO can be expanded up to P-TXNO255. Consequently, here, 99 text files corresponding to the first to 99th audio tracks in the maximum can be managed except the cover text file.

Also the pointers P-PFRA and P-EMPTY are formed in the pointer section.

Further, as part tables of 8 bytes corresponding to the individual pointers, 99 part tables 01h to 63h in each of which a start address, an end address and a text mode are recorded are formed in the table section. The remaining part tables 64h to FFh are not used with all 0s stored therein.

It is to be noted that contents of a definition of the text mode are hereinafter described.

The part table 00h is prevented from being designated by any pointer. Here, however, the part table 00h is used exclusively for management of an address of a text file determined as a cover text and the text mode.

The pointers P-TXNO1 to P-TXNO99 are used for management of regions, in each of which one text file is recorded, each by designating a particular part table. For example, in a part table designated with the pointer P-TNXO1, a start address, an end address and a text mode of the first text file are recorded as a file number.

It is to be noted that, since a text file is handled in a unit of a sector as described above, the start address and the end address are each described up to a sector unit, and 0h is placed in the data position for indicating a sound group.

Further, with the AUX-TOC sector 6, file management which is performed with part tables linked with link information is not performed. In other words, one text file is not recorded in sections physically spaced from each other.

However, non-used part tables in the AUX-TOC sector 6 are managed with link information, which is provided by the 8th byte of each part table, beginning with the pointer P-EMPTY.

In the pointer P-PFRA in the AUX-TOC sector 4 data of a text file whose amount is smaller than 1 cluster are recorded in a region of 1 cluster in the AUX data area. Further, the pointer P-PFRA serves as a pointer for management of a free area where the region in the 1 cluster in which data are not recorded is a non-recorded region as a recordable region and hence a free area. Also for the free area management, the 8th byte of each part table may be used as link information to allow the part tables to be linked to each other so that a plurality of sections spaced from each other may be managed as a free area.

Here, contents of a definition of the text mode set in each part table of the AUX-TOC sector 4 are described with reference to FIG. 21.

The text mode is a region at the position of the fourth byte in each part table and is formed from 8 bits d1 to d8 (1 byte).

Of the 8 bits d1 to d8, the two bits d1 and d2 indicate a copy status. The copy status is similar to the copy status (S. Pict. mode) regarding a picture file described hereinabove with reference to FIG. 19A, and therefore, overlapping description of it is omitted here.

The two bits d3 and d4 indicate contents of the text file. In this instance, if the two bits d3 and d4 are 0 h, then it indicates that the text file is a sung text.

In particular, it is indicated that the text file is a text of the words of a tune of a corresponding audio track. If the bits d3 and d4 are 1h, then it indicates that the text file is a text in which artist information such as the name of the artist who plays the tune in the corresponding audio track is described.

If the bits d3 and d4 are 2h, then it indicates that the text file describes a liner note such as explanation annexed to an album, and if the bits d3 and d4 are 3h, then it indicates that the text file describes some other information.

The one bit of d5 indicates presence or absence of a time stamp inserted in the text file. If the bit d5 is 0, then it indicates absence of a time stamp, but if the bit d5 is 1, then it indicates presence of a time stamp. It is to be noted that a time stamp is hereinafter described with reference to FIG. 22.

The three bits of d6, d7 and d8 represent a character code. The character code is set such that, for example, 0h designates the ASCII code; 1h designates the modified ISO. 8895-1 code; 2h designates the music shifted JIS code; 3h designates the KS C 5601-1989 code (Korean language); and 4h designates the GB 2312-80 code (Chinese language). The character code is undefined (reserved) for 5h and 6h. The character code 7h designates a plain text. By defining the text file as a plain text file, it is possible to provide expandability to the character code.

5-6 AUX-TOC Sector 5

FIG. 16 shows a format of the AUX-TOC sector 5. The AUX-TOC sector 5 is used as a text information table and used as a data area into which, when text information, that is, information of a text name, a recording date/time and a URL of the Internet, is applied to each text file recorded, the information as the text information is recorded as character information.

It is to be noted that a text information file recorded in the table section of the AUX-TOC sector 5 has a structure similar to that of a picture information file described hereinabove with reference to FIG. 20. More particularly, a text information file has a similar structure except that a data unit of a picture name in FIG. 20 is a data unit of a text name.

In the format of the AUX-TOC sector 5 shown in FIG. 16, a sector address (Sector)=05h and mode information (MODE)=02h are recorded in the header.

Further, in the AUX-TOC sector 5, pointers P-TXIF1 to P-TXIF99 are prepared in the pointer section in a corresponding relationship to text files recorded. Further, in the slot section, 255 slots 01h to FFh of 8 bytes which can be designated by the pointers P-TXIF1 to P-TXIF99 and one slot 00h of 8 bytes are prepared. It is to be noted that the pointers P-TXIF can be expanded up to P-TXIF255.

Further, in the pointer First TXIF following the maker code and the model code, the number of the first one P-TXIF of used ones of the pointers P-TXIF1 to P-TXIF99 is recorded, and in the pointer Last TXIF, the number of the last one P-TXIF of the used ones of the pointers P-TXIF1 to P-TXIF99 is recorded.

In the slots 00h to FFh of the table section, character information of text information files is recorded in the form of the ASCII code or some other character code. The type of characters to be recorded is defined by a character code (chara.code) recorded at a predetermined byte position on the AUX-TOC sector 2.

Also in this instance, the character code is set similarly as in the AUX-TOC sector 2 such that, for example, 00h designates the ASCII code; 01h designates the modified ISO. 8895-1 code; 02h designates the music shifted JIS code; 03h designates the KS C 5601-1989 code (Korean language); and 04h designates the GB 2312-80 code (Chinese language).

The pointers P-TXIF1 to P-TXIF99 designate particular part tables in which text information files of file numbers corresponding to the numbers of the individual pointers are recorded. For example, in a slot designated by the pointer P-TXIF1, characters corresponding to a picture of the first text file are recorded. It is to be noted that the slot 00h of 8 bytes is used as an area for exclusive use for starting of recording of a cover text information file corresponding to a cover text, and is prevented from being designated with the pointer P-TXIF(x).

The slots described above can be linked with link information so that a text information file corresponding to one text file can be treated even if the text information file has a size greater than 7 bytes.

Further, the pointer P-EMPTY is used for management non-used slots in the form of a link.

Also in this instance, different AUX-TOC sectors may be set for the text name, recording date/time and URL such that they may be managed individually. However, where various character information applied to picture files is managed collectively as text information files with the AUX-TOC sector 5, the number of TOC sectors as the amount of data required for management information is reduced similarly as with an information file.

6. Data File 6-1 Picture File Sector

Two kinds of data files including a picture file and a text file which are AUX data files managed with the AUX-TOC sectors formed in such a manner as described above are described below.

As regards a picture file, the file length of one still picture may be an arbitrary one. The image size of a still picture is 640×480 dots, and a picture file is based on the JPEG format baseline. Since management of picture files is performed with the AUX-TOC, a bit stream of a file extends from the SOI (Start Of Image) marker to the EOI (End Of Image) marker prescribed in the JPEG standards.

Further, since the sector format is the mode 2 and the 3rd layer ECC is not used, the effective byte number as an image data capacity of one sector is 2,324 bytes. As an example, if it is assumed that a picture file of the JPEG has a size of 1 cluster (=32 sectors), then the actual data size ranges from 72,045 (=2,324×31+1) bytes to 74,368 (=2,324×32) bytes.

Figure 17:
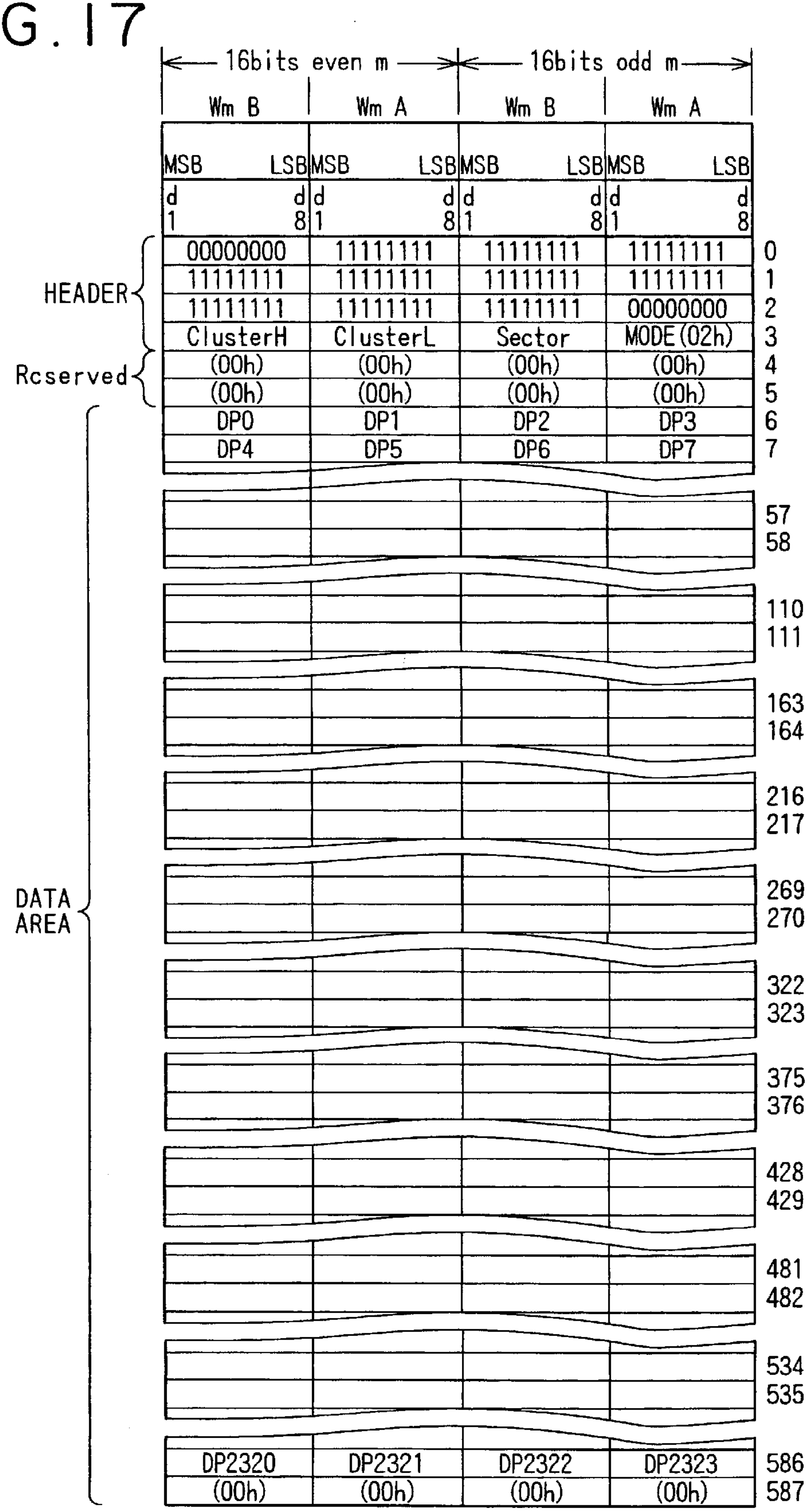
FIG. 17 is a diagrammatic view illustrating a picture file sector of the disc.

The format of sectors which form such picture files as described above is such as, for example, illustrated in FIG. 17.

Referring to FIG. 17, a header of 16 bytes which includes the synchronization pattern, a cluster address (Cluster H, Cluster L), a sector address (Sector) and mode information (02h) is provided at the top of the format, and the following 8 bytes are undefined (Reserved).

Then, as indicated as data DP0 to DP2323, a region as a data area in which image data of 2,324 bytes are recorded is provided.

In each of the last 4 bytes, 00h is recorded. Alternatively, however, error detection parities may be recorded in the last 4 bytes.

6-2 Text File Sector

In a text file, text data of the ASCII, Modified ISO 8859-1, Music Shifted JIS or the like defined by the text mode of the AUX-DOC sector 4 can be recorded.

Figure 18:
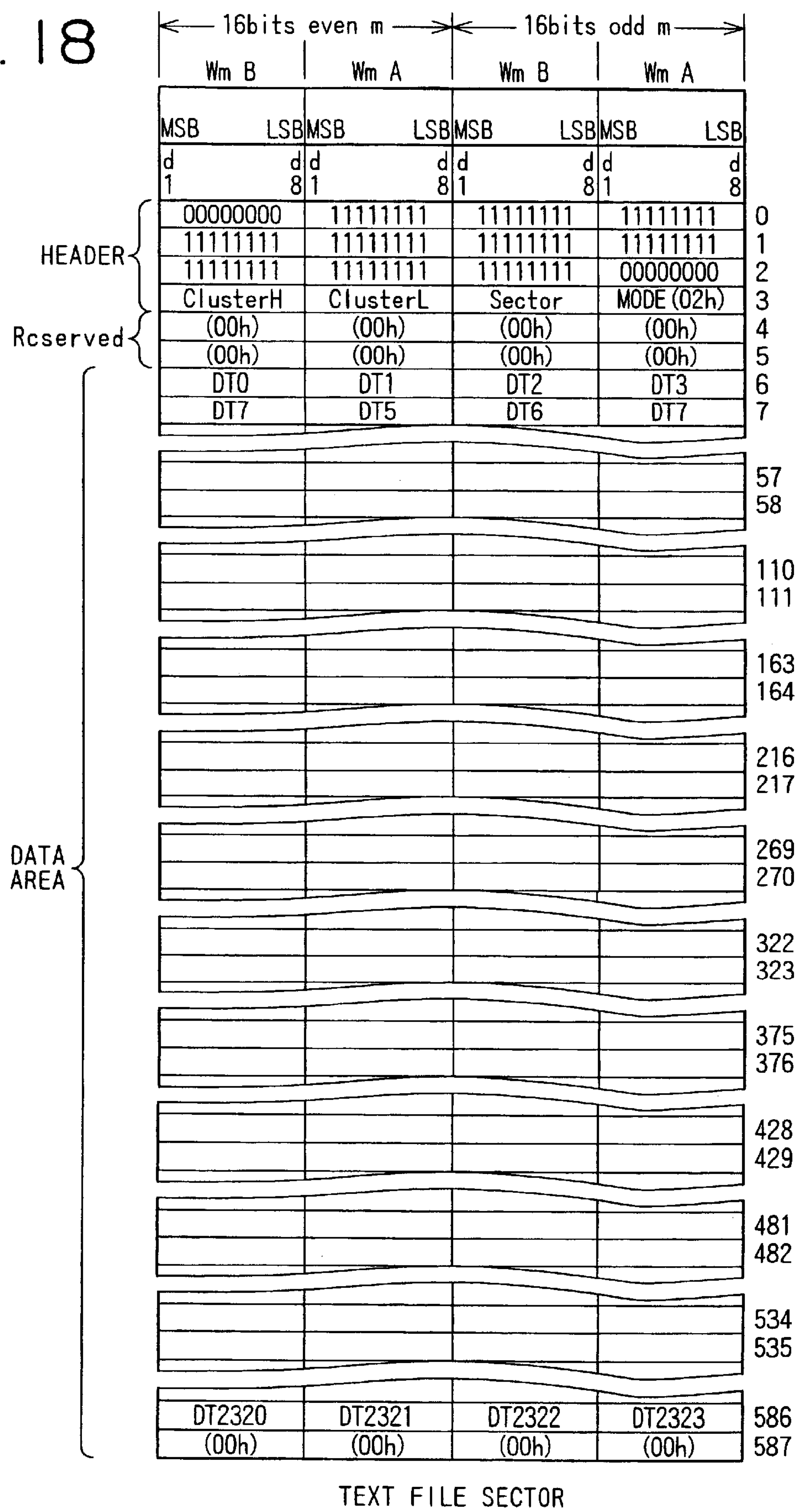
FIG. 18 is a diagrammatic view illustrating a text file sector of the disc.

The format of a sector which forms a text file is such as, for example, shown in FIG. 18. Referring to FIG. 18, similarly as in a picture file, a header (16 bytes) and an undefined (Reserved) region (8 bytes) are provided from the top of the text file. Following them, a data area is provided in which data as text files of 2,324 bytes are recorded as indicated as data DT0 to DT2323.

In each of the last 4 bytes, 00h is provided. Alternatively, however, error detection parities may be recorded in the last 4 bytes.

Figure 22:
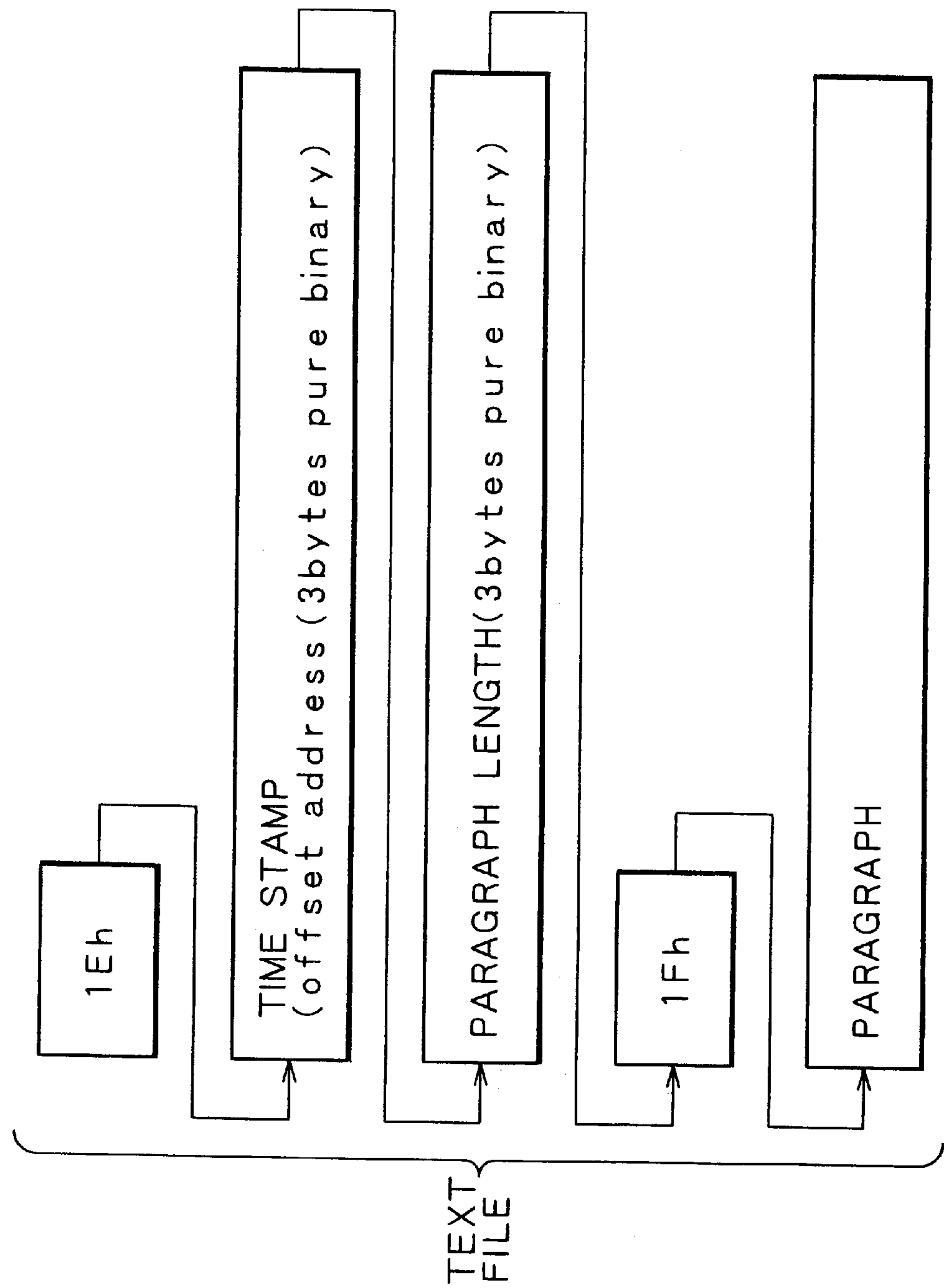
FIG. 22 is a diagrammatic view showing a data structure of a text file on the disc where the text file includes a time stamp.

A data structure of a text file recorded in a text file sector is shown in FIG. 22. It is to be noted, however, that the text file shown has a data structure corresponding to a case wherein presence of a time stamp (d5="1") is set as the text mode of the AUX-TOC sector 4.

As seen from FIG. 22, in the text file, 1Eh which indicates a delimiting point of each text file is disposed, and following this, a data unit (3 bytes pure binary) indicating a time stamp is disposed.

The time stamp defines a displaying or outputting timing of a text file synchronized with reproduction of a corresponding audio track and is indicated by an offset address of the corresponding audio track.

Following the data unit indicating a time stamp, a data unit (3 bytes pure binary) of a paragraph length indicative of a data length of a data unit of a paragraph is disposed. Further, following data of 1Fh, a data unit of a paragraph (substantive character information) is disposed.

7. Program Search and AUX Data File Search 7-1 Example of Operation

The recording and reproduction apparatus of the present embodiment is constructed such that, if any of the program search keys 23*a* and 23*b* and the AUX data file search keys 23*c* and 23*d* described hereinabove with reference to FIG. 29 is operated, a program search with reference to a program and an AUX data search with reference to an AUX data file reproduced in synchronism with a program are performed. Here, detailed examples of a program search and an AUX data search are described with reference to FIGS. 23A, 23B, 23C, 23D and 23E and 24 to 26.

It is to be noted that, in the following description, an AUX data file reproduced in synchronism with a program is a picture file for the convenience of description.

In FIGS. 23A, 23B, 23C, 23D and 23E, a relationship between programs on a certain disc and picture files reproduced in synchronism with the programs is illustrated as an example.

Figure 23:
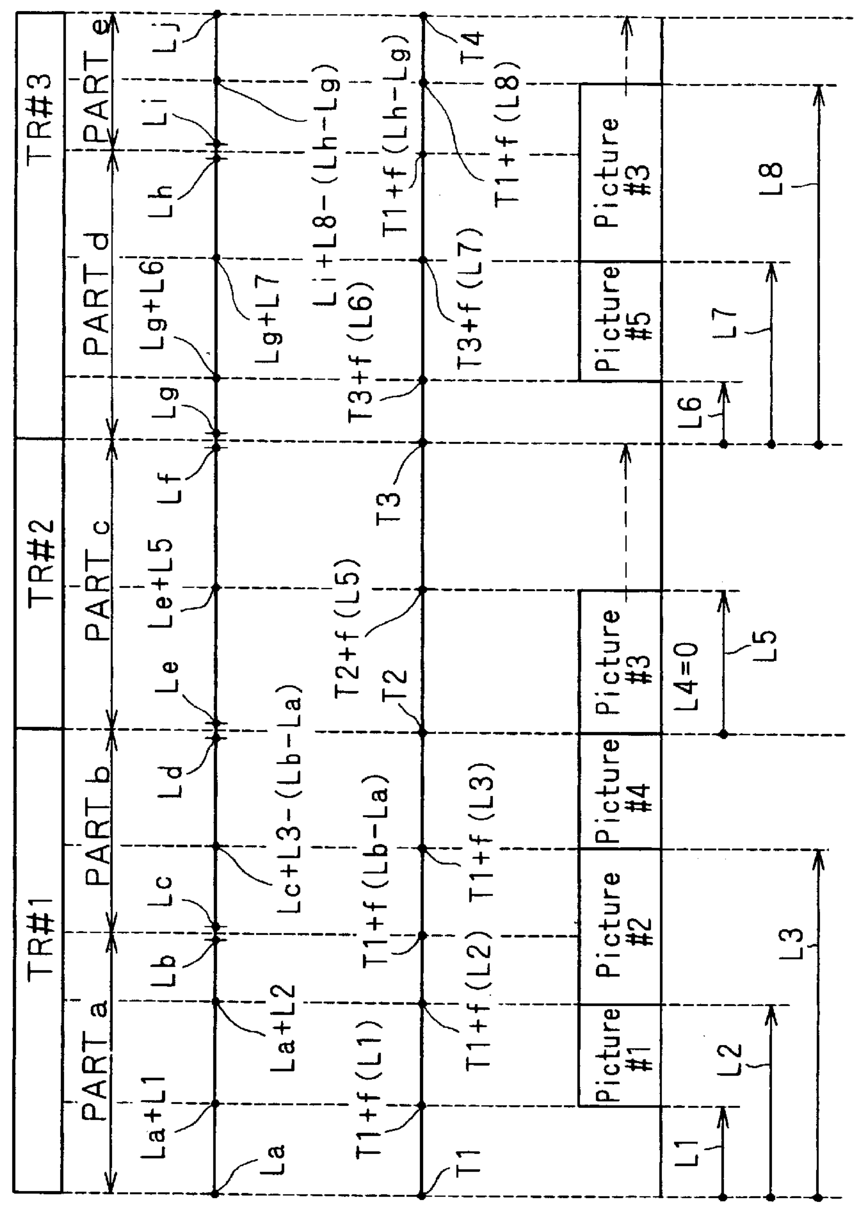
FIG. 23A is a diagrammatic view showing programs recorded on tracks in accordance with the reproduction time base in an example of a management condition wherein the tracks and picture files to be reproduced and outputted in synchronism with the tracks are managed.
FIG. 23B is a diagrammatic view showing addresses on the disc on which the programs are recorded in the example of the management condition wherein the tracks and picture files to be reproduced and outputted in synchronism with the tracks are managed.
FIG. 23C is a diagrammatic view showing reproduction times of the programs in the example of the management condition wherein the tracks and picture files to be reproduced and outputted in synchronism with the tracks are managed.
FIG. 23D is a diagrammatic view showing the picture files reproduced and displayed or outputted in synchronism with the programs in accordance with the reproduction times in the example of the management condition wherein the tracks and picture files to be reproduced and outputted in synchronism with the tracks are managed.
FIG. 23E is a diagrammatic view showing playback addresses of the picture files shown in FIG. 23D in the example of the management condition wherein the tracks and picture files to be reproduced and outputted in synchronism with the tracks are managed.

FIG. 23A shows audio data of programs recorded on the disc in accordance with a reproduction time base, and FIG. 23B shows addresses on the disc at which the programs are recorded. FIG. 23C illustrates reproduction times of the programs, and FIG. 23D show picture files reproduced and displayed or outputted in synchronism with the programs in accordance with the reproduction times. FIG. 23E shows playback addresses of the picture files shown in FIG. 23D, which are defined by contents of the AUX-TOC sector 3 described hereinabove with reference to FIG. 14.

It is assumed that, on the disc, as tracks of audio programs, 3 tracks TR #1, #2 and #3 are recorded. Also it is assumed that the tracks TR #1, #2 and #3 are recorded in the order of the track number (#n) in principle.

Further, it is assumed that the tracks TR #1, #2 and #3 are recorded in such a manner as seen in FIGS. 23B and 24 on the disc.

The track TR #1 is composed of two parts including a part a of addresses La to Lb and another part b of addresses Lc to Ld, and the parts a and b are managed with link information in the U-TOC sector 0 such that they are linked to each other. In this instance, the address La is an address of the innermost circumference of the disc, and if an address of the compacted representation is not used, the address La actually is La =(0032h (cluster), 00h (sector), 0h (sound group)).

The track TR #2 is composed of one part c of addresses Le to Lf.

Also the track TR #3 here is composed of two parts including a part d of addresses Lg to Lh and another part e of addresses Li to Lj, and it is designated with link information in the U-TOC sector 0 that the two parts d and e be linked to each other.

In this instance, as seen in FIG. 24, following an address Lk of an outer circumference side of the disc from the end address of the part e on the rear side of the track TR #3, no real data is recorded. Accordingly, an area from the address Lk to the end address of the program area is defined as a free area. For example, if the disc has a recordable time of 74 minutes, then the actual end address of the program area is substantially 08CAh (cluster).

Further, each track shown in FIG. 23A corresponds to a reproduction time as seen in FIG. 23C. In this instance, it is prescribed that reproduction of the track TR #1 be started at the time T1; reproduction of the track TR #2 be started at the time T2; and reproduction of the track TR #3 be started at the time T3.

It is to be noted that a reproduction time illustrated in FIG. 23C can be determined, for example, with regard to the track TR #1,by conversion from an offset address of the track TR #1 being reproduced at present with respect to the time T1=address L1, and here, it is represented as a function. For example, the reproduction time of the track TR #1 represented by the address La+L1 is represented as T1+f(L1). Further, as regards the reproduction time at a delimiting position of a part, for example, the delimiting position between the parts a and b of the track TR #1 is represented as T1+f(Lb−La), and the delimiting position between the parts d and e of the track TR #3 is represented as T3+f(Lh−Lg).

Further, it is assumed that, as AUX data files recorded on the disc, five picture files Picture #1, #2, #3, #4 and #5 are recorded. Furthermore, it is assumed that the synchronous reproduction timings of the picture files with the tracks are prescribed in such a manner as seen in FIGS. 23D and 23E.

Here, the picture files Picture #1, #2 and #4 are reproduced in synchronism with the track TR #1. Display of the picture file Picture #1 is started at a position indicated by the offset address L1 (reproduction time T1+f(L1)) after the beginning of reproduction of the track TR #1, and is ended at a point of time at which display of the picture file Picture #2 is started at a position indicated by the offset address L2 (T1+f(L2)).

Display of the picture file Picture #2 is started at the position indicated by the offset address L2 (reproduction time T1+f(L2)), and is ended at a point of time at which display of the picture file Picture #4 is started at a position indicated with the offset address L3(T1+f(L3)). In this instance, it is prescribed that the picture file Picture #2 be displayed or outputted over reproduction of the part a and the part b.

Display of the picture file Picture #4 is started at the timing indicated by the offset address L3 (reproduction time T1+f(L3)), and is ended at a point of time at which the display of the track TR #1 is ended.

Here, the address of the track TR #1 corresponding to the offset address L3 can be determined by calculation of Lc+L3−(Lb31 La) as seen in FIG. 23B because the track TR #1 is formed from the parts a and b.

As regards the track TR #2, it is prescribed that the picture file Picture #3 be displayed over a period after a reproduction starting point of time of the track TR #2 (offset address L4 from the address Le=0, reproduction time T2) till a point of time indicated by the offset address L5 (reproduction time T2+f(L5)).

The picture files Picture #5 and #3 are reproduced in synchronism with the track TR #3. It is prescribed that the picture file Picture #3 be reproduced also in synchronism with the track TR #1. As can be recognized from this, in the present format, one picture file may be prescribed to be reproduced in synchronism with a plurality of tracks.

Display of the picture file Picture #5 is started at a position indicated by the offset address L6 with reference to the starting point of time (address Lg, reproduction time T3) of reproduction of the track TR #3, and is ended at a point of time at which display of the picture file Picture #3 is started at a position indicated by the offset address L7 (T3+f(L7)).

Display of the picture file Picture #3 is started at the position indicated by the offset address L7 (reproduction time T3+f(L7)), and is ended at a point of time indicated by the offset address L8 (reproduction time T3+f(L8)).

Also here, the address of the track TR #3 corresponding to the offset address L8 can be determined by calculation of Li+L8−(Lh−Lg) as seen in FIG. 23B because the track TR #3 is formed from the parts d and e.

In order to allow reproduction of the disc to be performed in such a manner as illustrated in FIGS. 23A, 23B, 23C, 23D and 23E, the programs (tracks TR #1, #2 and #3) and the AUX data files (Picture #3, #4 and #5) are managed with the management information of the U-TOC and the AUX-TOC. Here, contents of the management information corresponding to FIGS. 23A, 23B, 23C, 23D and 23E are described with reference to FIGS. 25 and 26.

FIG. 25 illustrates contents of the U-TOC sector 0 of the disc which is reproduced in such a manner as illustrated in FIGS. 23A, 23B, 23C, 23D and 23E. Reproduction of the tracks TR #1, #2 and #3 illustrated in FIGS. 23A and 23B is defined by the U-TOC sector 0.

In this instance, a cluster address (Cluster H=00h, Cluster L=one of 03h to 05h), a sector address (Sector)=00h and mode information (MODE)=02h are indicated in the header.

In this instance, since the three tracks TR #1 to #3 are recorded as programs, 01h and 03h are recorded in the track numbers First TNO and Last TNO at predetermined byte positions following the header. It is to be noted that, in FIG. 25, the track numbers First TNO and Last TNO are denoted as F.TNO and L.TNO, respectively. Further, 01h is recorded at the byte position for the sector use situation (US: Used sectors).

Further, 01h is recorded in the pointer P-TNO1 corresponding to the track TR #1. Consequently, in a part table 01h designated by the pointer P-TNO1, the start address La (=cluster (32h) and sector (00h)) and the end address Lb of the part a are recorded, and a link to the part table 02h is designated by link information 02h.

In the part table 02h of the destination of the link, the start address Lc and the end address Ld of the part b are recorded, and 00h is recorded in the link information, thereby representing absence of a further link. Consequently, management is performed such that the track TR #1 is formed by the link from the part a to the part b as seen from FIGS. 23A and 24.

Another part table 03h is designated by the pointer P-TNO2 corresponding to the track TR #2. The start address Le and the end address Lf are recorded in the part table 03h.

The pointer P-TNO3 corresponding to the track TR #3 designates the part table 04h. In the part table 04h, the start address Lg and the end address Lh of the part d are recorded, and the link information 05h is recorded, which indicates a link to the part table 05h. In the part table 05h of the destination of the link, the start address Li and the end address Lj of the part e are recorded, and the link information 00h is recorded, which indicates absence of a further link. Consequently, management is performed such that the track TR #3 is formed by the link from the part d to the part e as seen from FIGS. 23A and 24.

Here, the track modes in the part tables 01h to 05h which indicate the addresses of the parts a to e are set to E2h (=11100010) so that they may actually represent contents of information such as absence of protection of copyright of audio data, stereo, and presence of emphasis.

Further, 00h is placed in each of those pointers beginning with the pointer P-TNO4 and ending with the pointer P-TNO255 so as to indicate that the pointers are not used.

In this instance, the part table 06h is designated by the pointer P-FRA, and the start address Lk and the end address (cluster 8Ch, sector 00h) of a free area in the program area are indicated in the part table 06h. In this instance, the cluster 8Ch and the sector 00h correspond to the end address of the program area. Further, in this instance, the free area is formed not discretely in the program area, and accordingly, 00h is placed in the link information.

The pointer P-EMPTY designates the part table 07h, and the part tables 07h to FFh are linked with link information and managed as non-used part tables.

Further, assuming here that no defect area is involved, 00h is recorded in the pointer P-DFA.

FIG. 26 illustrates contents of the AUX-TOC sector 3 of the disc illustrated in FIGS. 23A, 23B, 23C, 23D and 23E. The AUX-TOC sector 3 defines outputting timings of the picture files (Picture #1 to #5) synchronized with reproduction of the tracks TR #1,#2 and #3 illustrated in FIGS. 23A and 23B. It is to be noted that, although the start addresses and the end addresses of the picture files (Picture #1 to #5) are actually managed as the recorded positions of them in the AUX data area with the AUX-TOC sector 1, description and illustration of the same are omitted.

In the AUX-TOC sector 3 illustrated in FIG. 26, the cluster address Cluster H=00h, Cluster L=one of 07h to 09h, the sector address (Sector)=03h and the mode information (MODE)=02h are indicated in the header.

In this instance, since the three tracks TR #1 to #3 are defined as tracks to be reproduced in synchronism with picture files, 01h and 03h which indicate the tracks TR #1 (first track) and TR #3 (last track) are recorded in the track numbers First TNO and Last TNO at predetermined byte positions following the header. It is to be noted that, in FIG. 26, the track numbers First TNP and Last TNP are denoted as F·TNP and L·TNP, respectively. This signifies that the pointers P-TNP1 to P-TNP3 in the pointer section are used.

Further, 01h is recorded in the pointer P-TNP1 corresponding to the track TR #1. In the slot 01h indicated by the pointer P-TNP1, the start offset address L1 and the end offset address (all 0s) with reference to the start address of the track TR #1 are recorded. Further, 01h indicating the picture file Picture #1 is recorded in the pointer P-PNOj in the slot 01h. Consequently, the picture file Picture #1 is displayed in synchronism with the track TR #1 for a period from the point of time indicated by the offset address L1 to the point of time at which display of a next picture file is started. Further, it is indicated by the link information 02h in the slot 01h that the slot 01 be linked to the slot 02h.

In the slot 02h, the start offset address L2 and the end offset address (all 0s) with reference to the start address of the track TR #1 are recorded. In the pointer P-PNOj, 02h indicating the picture file Picture #2 to be reproduced subsequently to the picture file Picture #1 is recorded. Further, 03h is recorded as the link information and indicates that the slot 02h be linked to the slot 03h.

In the slot 03h, the start offset address L3 and the end offset address (all 0s) with reference to the start address of the track TR #1 are recorded. In the pointer P-PNOj, 04h indicating the picture file Picture #4 to be reproduced subsequently to the picture file Picture #2 is recorded. Further, 00h is recorded as the link information and indicates that there is no picture file to be reproduced in synchronism with the track TR #1.

The contents described above thus designate that reproduction of the picture files Picture #1, #2 and #4 be performed in synchronism with the track TR #1 in such a manner as shown in FIGS. 23A, 23B, 23C, 23D and 23E.

Meanwhile, in the pointer P-TNP2 corresponding to the track TR #2, 04h is recorded. In the slot 04h indicated by the pointer P-TNP2, the start offset address L4 (=cluster 00h, sector 00h) and the end offset address L5 with reference to the start address of the track TR #2 are recorded. Further, 03h indicating the picture file Picture #3 to be reproduced in synchronism with the track TR #2 is recorded in the pointer P-PNOj in the slot 04h. Consequently, it is designated that the picture file Picture #3 be displayed in synchronism with the track TR #2 for a period from the reproduction starting point of time of the track TR #2 to the point of time indicated by the end offset address L5. In this instance, since the track TR #2 does not have another picture file to be displayed or outputted further, 00h is placed in the link information in the slot 04h.

In the pointer P-TNP3 corresponding to the track TR #3, 05h is recorded. In the slot 05h indicated by the pointer P-TNP3, the start offset address L6 and the end offset address (all 0s) with reference to the start address of the track TR #3 are recorded. Further, 05h indicating the picture file Picture #5 to be reproduced first in synchronism with the track TR #3 is recorded in the pointer P-PNOj in the slot 05h. Further, 06h is recorded as the link information 06h in the slot 05h and indicates that the slot 05h be linked to the slot 06h.

In the slot 06h, the start offset address L7 and the end offset address L8 with reference to the start address of the track TR #3 are recorded. In the pointer P-PNOj in the slot 06h, 03h indicating the picture file Picture #3 to be reproduced in synchronism with the track TR #3 subsequently to the picture file Picture #5 is recorded. Further, 00h is recorded as the link information in the slot 06h because there is no picture file to be displayed or outputted in the track TR #3.

The contents described above thus designate that displaying or outputting of the picture files Picture #5 and #3 be performed in synchronism with the track TR #3 in such a manner as seen in FIGS. 23A, 23B, 23C, 23D and 23E.

With the disc illustrated in FIGS. 23A, 23B, 23C, 23D and 23E, reproduction of a track and synchronized reproduction of a picture file corresponding to the track are determined based on the management information of the contents illustrated in FIGS. 25 and 26.

Now, a program search and an AUX data file search as examples of a search operation of the present embodiment are described in outline where a manner of reproduction is determined in such a manner as illustrated in FIGS. 23A, 23B, 23C, 23D and 23E.

First, an example of a program search operation is described.

Here, it is assumed that a certain address in the addresses La+L1 to La+L2 of the track TR #1 illustrated in FIGS. 23A, 23B, 23C, 23D and 23E is being reproduced. In this instance, audio reproduction of the track TR #1 is being performed and the picture file Picture #1 is being displayed or outputted.

Here, if it is assumed that a user presses the program search key 23*a* once as an AMS operation for the feeding direction, then in the recording and reproduction apparatus of the present embodiment, the top (address Le) of the track TR #2 is accessed to start audio reproduction. In this instance, since it is prescribed that reproduction outputting of the picture file Picture #3 be started at the same timing as the top of the track TR #2, the recording and reproduction apparatus operates so that also displaying or outputting of the picture file Picture #3 is performed simultaneously with the audio outputting.

On the other hand, it is assumed that, for example, a certain address in a top portion in the section of the addresses Le to Le+L5 of the track TR #2, for example, in a portion later than approximately less than 1 second later than the address Le, is being reproduced. In this instance, audio reproduction of the track TR #2 is being performed and the picture file Picture #3 is being displayed or outputted.

Here, it is assumed that the user presses the program search key 23*b* once as an AMS operation for the rewinding direction, then in the recording and reproduction apparatus, the top (address Le) of the track TR #2 is accessed to start audio reproduction. Then, also the picture file Picture #3 is displayed or outputted simultaneously with the audio outputting of the track TR #2.

Further, if it is assumed that a certain address in a top portion in the section of the addresses Le to Le+L5 of the track TR #2 is being reproduced and, for example, the user presses the program search key 23*b* twice within a predetermined short period while the picture file Picture #3 is being displayed or outputted, then in the recording and reproduction apparatus, the top (address La) of the track TR #1 is accessed to start audio reproduction. Since it is prescribed that there is no picture file to be reproduced in synchronism at the reproduction starting point of time of the track TR #1, synchronized display of a picture file is not performed at the point of time. However, if the reproduction of the track TR #1 is continued until the address La+L1 is reached, then synchronized reproduction of the picture file Picture #1 is started.

In this manner, in the program search, a search is performed with reference only to programs. Thus, the program search is a function similar to that of, for example, the conventional AMS which is performed for tracks.

It is to be noted that, in the case of the disc shown in FIGS. 23A, 23B, 23C, 23D and 23E, if a press operation of the program search key 23*b* for the rewinding direction is performed during reproduction of a top portion of the track TR #1 (first track), then reproduction is started from the top of the track TR #1. On the other hand, if the program search key 23*a* for the feeding direction is pressed during reproduction of the track TR #3 (last track), the press operation is invalidated or ignored.

Subsequently, an operation example of an AUX data file search is described.

Here, it is assumed that a certain point between the addresses La+L2 and Lc+L3−(Lb−La) of the track TR #1. In this instance, the picture file Picture #2 is being displayed or outputted.

If it is assumed here that the AUX data file search key 23*c* for the feeding direction is pressed once, then in the recording and reproduction apparatus, displaying of the picture file Picture #4 to be displayed following the picture file Picture #2 being displayed at present in the reproduction time is started. Further, the address Lc+L3−(Lb−La) which is a display starting timing of the picture file Picture #4 is accessed to start reproduction of the track TR #1 beginning with the address Lc+L3−(Lb−La). Actually, starting of displaying of the picture file Picture #4 and starting of reproduction of the track TR #1 beginning with the address Lc+L3−(Lb−La) are performed substantially at the same timing after the operation of the AUX data file search key 23*c*.

Then, for example, if the AUX data file search key 23*c* is pressed once while reproduction of the track TR #1 beginning with the address Lc+L3−(Lb−La) and displaying or outputting of the picture file Picture #4 are proceeding, then the recording and reproduction apparatus starts displaying of the picture file Picture #3 to be displayed subsequently to the picture file Picture #4 being displayed at present in the reproduction time. Further, the recording and reproduction apparatus accesses the address Le which is a display starting timing of the picture file Picture #3 to simultaneously start reproduction of the track TR #2 beginning with the top of the same.

Further, it is assumed that program reproduction at a certain point in the section of the addresses Le to Lf of the track TR #2 is being reproduced. In this instance, the picture file Picture #3 is displayed in the section of the addresses Le to Le+L5, but in the section of the addresses Le+L5 to Lf, displaying of a picture file is not performed.

Then, it is assumed that the AUX data file search key 23*c* is pressed once while a certain point of the track TR #2 is being reproduced.

Here, two different operation modes are available with the AUX data file search. One of the operation modes is an AUX data file reference mode in which a search operation is performed with reference to AUX data files at all.

In the AUX data file reference search mode, a search operation when the AUX data file search key 23*c* is pressed once while a certain point of the track TR #2 is being reproduced is an accessing operation to a reproduction starting point of time of the picture file Picture #5 synchronized with the track TR #3 to be displayed subsequently in the reproduction time.

In particular, displaying or outputting of the picture file Picture #5 to be displayed or outputted is started from the offset start address L6 with reference to the start address Lg of the track TR #3. Then, the address Lg+L6 is accessed at the same timing to start audio reproduction of the track TR #3 from the address Lg+L6.

In the meantime, the other mode of the AUX data file search is an AUX data file/program reference mode which includes both of a search operation with reference to AUX data files and another search operation with reference to tracks as programs.

In this operation mode, if the AUX data file search key 23*c* is pressed once while a certain point of time of the track TR #2 is being reproduced in such a manner as described above, not an accessing operation to the picture file Picture #5 but an accessing operation to the top (address Lg) of the track TR #3 is performed.

If the AUX data file search key 23*d* for the rewinding direction is pressed, then the following operation is performed.

For example, if the AUX data file search key 23*d* is operated while a certain address of the track TR #1 later than a top portion in the section of the addresses La+L2 to Lc+L3−(Lb−La) is being reproduced and the picture file Picture #2 is being displayed or outputted simultaneously, then the address La+L2 of the track TR #1 corresponding to the reproduction starting time of the picture file Picture #2 is accessed to start program reproduction. In this instance, the displaying or outputting of the picture file Picture #2 is continued.

On the other hand, if the AUX data file search key 23*d* is operated while a certain address of the track TR #1 in the top portion in the section of the addresses La+L2 to Lc+L3−(Lb−La) is being reproduced and the picture file Picture #2 is being displayed or outputted, then the address La+L1 of the track TR #1 corresponding to the reproduction starting time of the picture file Picture #1 which immediately precedes the picture file Picture #2 in the reproduction time is accessed to start program reproduction. Simultaneously, the displaying or outputting is switched from the picture file Picture #2 to the picture file Picture #1.

Further, for example, if the AUX data file search key 23*d* for the rewinding direction is pressed while a top portion in the section of the addresses Lg+L6 to Lc+L3−(Lb−La) of the track TR #3 is being reproduced and the picture file Picture #5 is being displayed simultaneously, then the accessing destination is different between the AUX data file reference mode and the AUX data file/program reference mode.

In the AUX data file reference mode, an accessing operation is performed to the picture file Picture #3 of the track TR #2 to be reproduced immediately preceding to the picture file Picture #5 of the track TR #3 in the reproduction time. In other words, an operation to access the start address Le of the track TR #2 to display the picture file Picture #3 is performed.

On the other hand, in the AUX data file/program reference mode, since a delimiting position between the tracks TR #2 and #3 is present between the picture file Picture #5 of the track TR #3 and the picture file Picture #3 of the track TR #2, an operation to access the start address Lg of the track TR #3 is performed. In this instance, since a picture file whose synchronized reproduction is to be started corresponding to the start address Lg of the track TR #3 is not present, displaying of a picture file is not started.

7-2 Processing Operation

Subsequently, a processing operation for realizing the search operations described above will be described.

Here, in order to realize the search operations of the present embodiment, the contents described in the U-TOC sector 0 are defined in the following manner:

| | |
|---|---|
| Number of parts for forming a track<br>tr: track number | partn(tr) |
| Start address of the nth part of the track indicated by the track number tr | sad(tr, n) |
| End address of the nth part of the track indicated by the track number tr | ead(tr, n) |
| Also the contents written in the AUX-TOC are defined in the following manner: | |
| Number of picture files whose synchronized reproduction are determined from a track indicated by the track number tr | np(tr) |
| Number of the mth picture file to be reproduced in a track indicated by the track number tr | pn(tr, m) |
| Offset address for reproduction of the mth picture file | ofst(tr, m) |
| Number of the track being reproduced upon execution of a reproduction operation of the recording and reproduction apparatus | CurTr |
| Value representing what numbered one in the track the picture file being reproduced is upon execution of a reproduction operation of the recording and reproduction apparatus | CurP |

If the definitions above are given, the parameters of the disc shown in FIGS. 23A, 23B, 23C, 23D and 23E are such as given below:

partn(1)=2 partn(2)=1 partn(3)=2
sad(1, 1)=La sad(1, 2)=Lc
ead(1, 1)=Lb ead(1, 2)=Ld
sad(2, 1)=Le ead(2, 1)=Lf
sad(3, 1)=Lg sad(3, 2)=Li
ead(3, 1)=Lh ead(3, 2)=Lj
np(1)=3 np(2)=1 np(3)=2
pn(1, 1)=1 pn(1, 2)=2 pn(1, 3)=4
pn(2, 1)=3
pn(3, 1)=5 pn(3, 2)=3
ofst(1, 1)=L1 ofst(1, 2)=L2
ofst(1, 3)=L3 ofst(2, 1)=L4=0
ofst(3, 1)=L6 ofst(3, 2)=L7

If it is tried to determine the address ad(tr, m) of the track corresponding to a timing at which reproduction and outputting for displaying of the mth picture file to be reproduced on the track is to be started, then where m=0, $$ad(tr, m)=sad(tr)$$

m=0 signifies that there is no picture file to be reproduced in synchronism at the reproduction starting point of time of the top of the track.

On the other hand, where m≠0, if the maximum integer M which satisfies the following expression (1)

$$\sum_{n=1}^{M}[ead(tr, n) - sad(tr, n)] < ofst(tr, m) \tag{1}$$

is represented by mo, the address ad(tr, m) is represented by $$ad(tr, m) = sad(tr, mo+1) + ofst(tr, mo+1) - \sum_{n=1}^{mo}[ead(tr, n) - sad(tr, n)] \tag{2}$$

If the address ad(tr, m) is calculated specifically with regard to the disc shown in FIGS. 23A, 23B, 23C, 23D and 23E, then the following results are obtained:

ad(1, 0)=sad(1, 1)=La as(1, 1)=La+L1 ad(1, 2)=La+L2 ad(1, 3)=Lc+L3−(Lb−La)

ad(2, 0)=sad(2, 1)=Le ad(2, 1)=Le+L4=Le ad(3, 0)=sad(3, 1)=Lg ad(3, 1)=Lg+L6 ad(3, 2)=Lg+L7

It is to be noted that, when the disc is loaded into the recording and reproduction apparatus of the present embodiment, the U-TOC and the AUX-TOC of the disc are read in from the management area of the disc and stored into the buffer memory 13 so that the information of the values of the addresses ad(tr, m) can later be determined by calculation making use of the U-TOC and the AUX-TOC stored in the buffer memory 13. The values of the addresses ad(tr, m) are stored, for example, into a predetermined region of an internal RAM of the system controller 11 or the buffer memory 13. Where the information of the address ad(tr, m) is stored in the memory in this manner, calculation need not be performed immediately prior to an accessing operation responsive to an operation of a search key, and consequently, the program is simplified. However, such calculation may be performed immediately before an accessing operation in this manner. In this instance, since the information of all of the addresses ad(tr, m) need not be stored into the memory, the capacity of the memory can be saved.

Subsequently, a processing operation of the system controller 11 is described based on the contents of the definitions given above.

Figure 27:
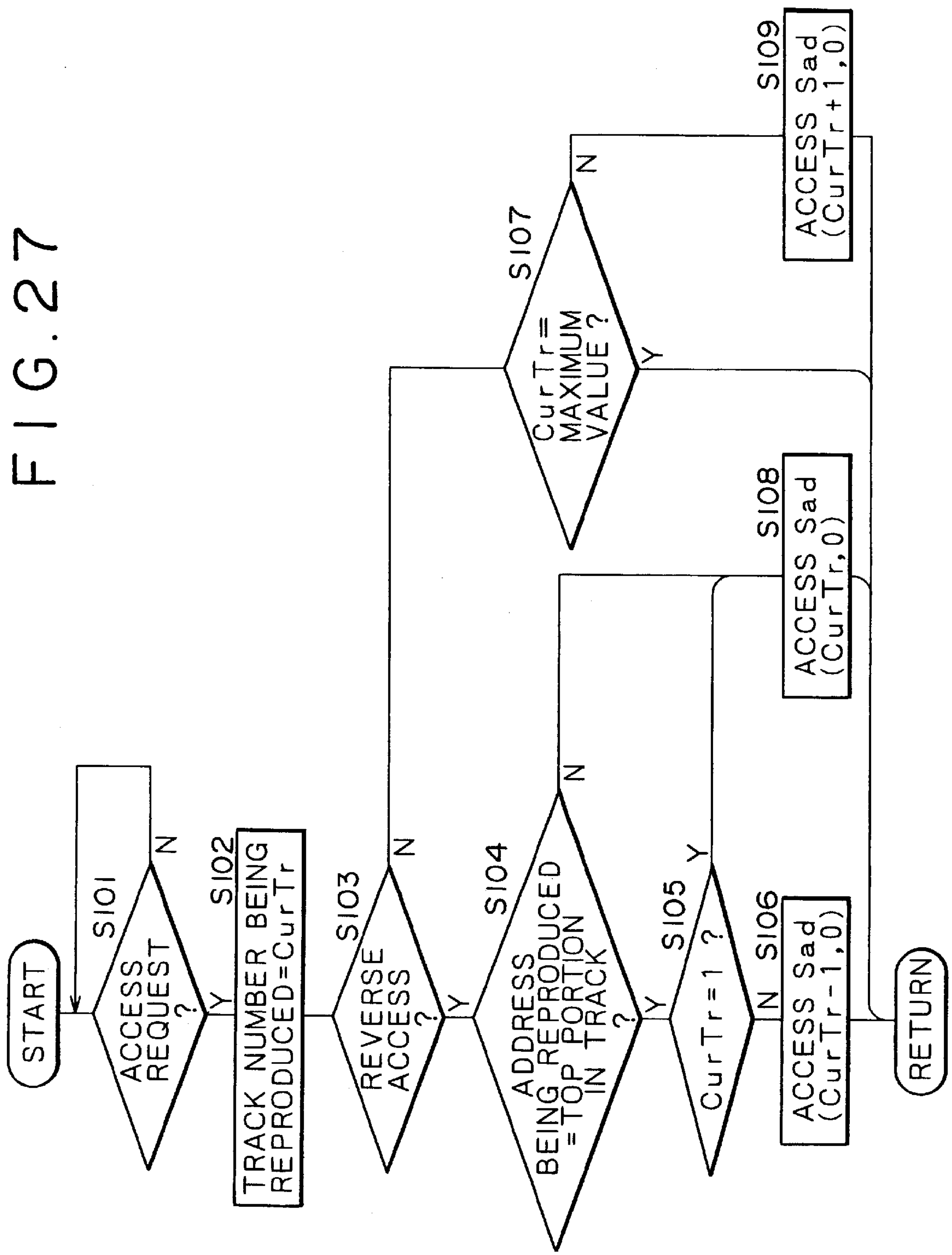
FIG. 27 is a flow chart illustrating a processing operation for realizing a search operation with reference to a program by the recording and reproduction apparatus shown in FIG. 1.

FIG. 27 is a flow chart illustrating a processing operation for realizing a search operation with reference to programs in response to an operation of the program search key 23*a* or 23*b*.

For example, if it is assumed that an operation of the program search key 23*a* or 23*b* is performed during reproduction of a program, then the system controller 11 receives an access request in step S101 and thus advances its control from step S101 to step S102.

In step S102, the system controller 11 sets the number of the track being reproduced at present, that is, upon the operation of the program search key 23*a* or 23*b*, to CurTr. Then, the system controller 11 advances the control to step S103.

In step S103, the system controller 11 discriminates whether or not reverse accessing should be performed. Here, if the key operation on which the discrimination in step S101 is based has been an operation of the program search key 23*a* for the feeding direction, then a negative result is obtained, but if the key operation has been an operation of the program search key 23*b* for the rewinding direction, then an affirmative result is obtained.

If it is discriminated in step S103 that reverse accessing should be performed, then the system controller 11 advances the control to step S104, in which it discriminates whether or not the address being reproduced at present is a top portion of the track. If an affirmative result is obtained in step S104, then the system controller 11 advances the control to step S105 so that processing for accessing a track immediately prior to the track being reproduced at present may be executed in principle as hereinafter described. On the other hand, if a negative result is obtained in step S104, then the system controller 11 advances the control to step S108 so that processing for accessing the top of the track being reproduced at present is executed in principle.

In step S105, the system controller 11 discriminates whether or not CurTr set in step S102 satisfies CurTr=1. If CurTr=1 is satisfied, then this signifies that the number of the track being reproduced at present is the track TR #1 (first track).

A negative result is obtained in step S105 when the value of CurTr is higher than 1 and this signifies that the number of the track being reproduced at present indicates not the first track. In this instance, the system controller 11 advances the control to step S106, in which it executes control processing for accessing the start address sad(CurTr−1, 0) of the program. In other words, the system controller 11 accesses the start address of the first part, that is, the top, of the track immediately preceding in the order of reproduction to the track being reproduced at present to perform reproduction.

On the other hand, if an affirmative result is obtained in step S105, then the system controller 11 advances the control to step S108, in which it executes control processing for accessing the start address sad(CurTr, 0) of the program to perform reproduction. To access the start address sad(CurTr, 0) signifies to access the top of the track being reproduced at present, and in the processing in step S108 after an affirmative result is obtained in step S105, the top of the track TR #1 is accessed.

Also when a negative result is obtained in step S104 described above, the system controller 11 advances the control to step S108 so that the top of the track being reproduced at present may be accessed to perform reproduction irrespective of the number of the track being reproduced at present.

On the other hand, if a negative result is obtained in step S103 described above, then the system controller 11 advances the control to step S107. In step S107, the system controller 11 discriminates whether or not CurTr has a maximum value. CurTr has a maximum value when the number of the track being reproduced at present indicates the last track, and this discrimination processing may be based on discrimination of, for example, whether or not the value of the last track number Last TNO of the U-TOC sector 0 and the value of CurTr are equal to each other.

If a negative result is obtained in step S107, then the system controller 11 advances the control to step S109, in which it executes control processing for accessing the address sad(CurTr+1, 0) to perform reproduction. To access the address sad(CurTr+1, 0) signifies to access the address of the top of a track next to the track being reproduced ate present.

On the other hand, if an affirmative result is obtained in step S107, then the system controller 11 ends this routine immediately. In particular, if an operation of the program search key 23*a* for the feeding direction is performed during reproduction of the last track, the system controller 11 ignores the operation and continues the reproduction of the last track.

It is to be noted that, though not shown in FIG. 27, when accessing is performed by the processing in any one of steps S106, S108 and S109 to perform reproduction of the track of the program to be reproduced subsequently, for example, for picture files, controlling processing for displaying or outputting by synchronized reproduction is executed in accordance with contents defined in the AUX-TOC sector 3. Similarly, for text files, control processing for displaying or outputting by synchronized reproduction is executed in accordance with contents of time stamps in the text file structure shown in FIG. 22.

FIG. 28 is a flow chart illustrating a processing operation for realizing a search operation with reference to AUX data files in response to an operation of the AUX data file search key 23*c* or 23*d.* As described above, a search operation with reference to AUX data files has the AUX data file reference mode which is an operation mode in which a search is performed with reference only to AUX data files at all and the AUX data file/program reference mode which is another operation mode which includes also a search with reference to programs. Here, a processing operation in accordance with the latter AUX data file/program reference mode is described.

Further, it is assumed that all AUX data files are picture files and include no text files. Furthermore, although this applies also to the processing operation described above with reference to FIG. 27, it is presumed that the U-TOC, AUX-TOC and AUX data in the management area are read out and stored into a predetermined region of the buffer memory 13 upon loading of the disc into the recording and reproduction apparatus so that they can thereafter be used at any time.

Further, for the convenience of description, it is assumed that a timing for erasure of a display for stopping reproduction outputting of all picture files is not prescribed. In other words, it is assumed that, for all picture files to be reproduced in synchronism with tracks, the offset end addresses in the AUX-TOC sector 3 have all 0s recorded therein. If this applies to FIGS. 23A, 23B, 23C, 23D and 23E, then based on the definitions described above, the picture file Picture #3 of the track TR #2 is kept displayed until program reproduction of the track TR #2 comes to an end as seen from a broken line arrow mark in FIGS. 23A, 23B, 23C, 23D and 23E. Similarly, also the picture file Picture #3 of the track TR #3 is kept displayed until program reproduction of the track TR #3 comes to an end as seen from another broken line arrow mark in FIGS. 23A, 23B, 23C, 23D and 23E.

Also in this instance, if it is assumed that an operation of the AUX data file search key 23*c* or 23*d* is performed during reproduction of a program, then the system controller 11 receives an access request in step S201 and thus advances its control from step S201 to step S02.

In step S202, the system controller 11 sets the number of the track being produced at present, that is, upon the operation of the AUX data file search key 23*c* or 23*d,* to CurTr and sets the display order number in the current track defined for the picture file being reproduced at present to CurP, and then advances the control to step S203. It is to be noted that, if a position of the current track preceding to the display timing of the first picture file, for example, like a section from the address La of the track TR #1 to a position immediately prior to the address La+L1, as shown in FIGS. 23A, 23B, 23C, 23D and 23E, is being reproduced, then the system controller 11 sets CurP to CurP=0.

In step S203, the system controller 11 discriminates whether or not reverse accessing should be performed. If the key operation on which the access request is based has been an operation of the AUX data file search key 23*c* for the feeding direction, then a negative result is obtained and the system controller 11 advances the control to step S213, but if the key operation has been an operation of the AUX data file search key 23*d* for the rewinding direction, then an affirmative result is obtained and the system controller 11 advances the control to step S204.

In step S204, the system controller 11 discriminates whether or not the address of the track being reproduced at present is within a range which can be regarded as a position immediately after the address ad(CurTr, CurP) (a position within a top portion). If an affirmative result is obtained in step S204, then the system controller 11 advances the control to step S205 so that it thereafter executes processing for accessing corresponding to a display starting time of a picture file immediately preceding in the reproduction time to the picture file being displayed or outputted at present in such a manner as hereinafter described in principle. On the other hand, if a negative result is obtained in step S204, then the system controller 11 advances the control to step S212 so that it thereafter executes processing for accessing corresponding to a display starting time of the picture file being displayed or outputted at present in such a manner as hereinafter described in principle.

In step S205, the system controller 11 discriminates that CurP set in step S202 above satisfies CurP=1 and thus indicates the picture to be reproduced first in the track. Here, if CurP=1 is satisfied, then the system controller 11 advances the control to step S208, but if CurP=1 is not satisfied, then the system controller 11 advances the control to step S206.

In step S206, the system controller 11 further discriminates whether or not CurP set in step S202 above satisfies CurP=0. Here, if it is discriminated that CurP=0 is not satisfied, or in other words, if it is discriminated that the picture file being reproduced at present is to be reproduce second or later in the track, then the system controller 11 advances the control to step S207.

In step S207, the system controller 11 reads out the picture file designated by pn(CurTr, CurP−1) from the buffer memory 13. The picture file pn(CurTr, CurP−1) is a picture file immediately preceding in the reproduction time to the picture file being reproduced at present.

Then, for example, decoding processing by the JPEG decoder 26 is performed for the picture file read out from the buffer memory 13 to obtain data with which the picture file can be displayed on the display section 24. Then, the system controller 11 establishes a waiting condition for displaying of the picture file and then advances the control to step S208.

In step S208, the system controller 11 accesses the address ad(CurTr, CurP−1) of the program area of the disc to perform program reproduction. If the processing in step S208 is executed after the processing in steps S205, S206 and S207, then the accessing to the address ad(CurTr, CurP−1) is accessing to an address which coincides with a display starting timing of a picture file immediately preceding to the picture file being reproduced at present in the current track.

On the other hand, if the processing in step S208 is executed immediately after the processing in step S205, then the accessing to the address ad(CurTr, CurP−1) is accessing to the top of the track being reproduced at present because of CurP−1=0. In this instance, however, it is considered that there is no picture file whose reproduction is to be started in synchronism with the top of the track being reproduced at present. In other words, an operation which also includes a search with reference to programs, that is, an operation of the AUX data file/program reference mode, is obtained here.

After the processing in step S208, control processing for displaying a picture is executed in step S209. Consequently, apparently a picture is displayed simultaneously with outputting of sound of audio data whose reproduction has been started from the address accessed in step S208 described above.

Here, if the processing in step S209 is executed after the processing in steps S205→S206→S207→S208, then displaying of the picture file indicated by pn(CurTr, CurP−1) whose displaying has been waited for in step S207 described above. The processing procedure in steps S205→S206→S207→S208→S209 realizes, in response to a press operation of the AUX data file search key 23*d* while the second or following picture file in a certain track is displayed, an operation of accessing a display starting timing of a picture file immediately preceding in order in the same track. In the case of FIGS. 23A, 23B, 23C, 23D and 23E, 30A and 30B, an operation of accessing, in response to an operation of the AUX data file search key 23*d* while, for example, the track TR #1 and the top of the picture file Picture #2 (immediately after the address La+L1 or so) are being reproduced, the track TR #1 and the start position (ad(1, 2)=La+L1) of the picture file Picture #1 to perform program reproduction and simultaneously switch to display the picture file Picture #1 is obtained.

On the other hand, if step S209 is reached after the processing in steps S205→S208, then processing for displaying a picture in step S209 is not actually performed. In the case of FIGS. 23A, 23B, 23C, 23D and 23E, 30C and 30D, an operation of accessing, in response to an operation of the AUX data file search key 23*d* while, for example, the track TR #1 and the top (immediately the address La+L1 or so) of the picture file Picture #1 are reproduced, the start position (ad(1, 0)=sad(1)=La) of the track TR #1 to perform only program reproduction.

If an affirmative result that CurP=0 is satisfied is obtained in step S206, then the system controller 11 advances the control to step S210.

In step S210, the system controller 11 reads out the picture file at pn(CurTr−1, np(CurTr−1)) and establishes a display waiting condition. Here, the picture file at pn(CurTr−1, np(CurTr−1)) is the last picture in a track (CurTr−1) immediately preceding to the track being reproduced at present. This is because np(CurTr−1) indicates the number of pictures to be reproduced in synchronism with the track indicated by CurTr−1, that is, the last picture.

In next step S211, the system controller 11 accesses the address ad(CurTr−1, np(CurTr−1)). In particular, the system controller 11 accesses the address of the program area at the reproduction start timing of pn(CurTr−1, np(CurTr−1)) read out by the processing in step S210 described above to perform program reproduction. Then, the system controller 11 advances the control to step S209.

In the case of FIGS. 23A, 23B, 23C, 23D and 23E, 30E and 30F, an operation obtained when the processing in step S209 is executed after the processing in steps S206→S210→S211 is executed corresponds, for example, to an operation when, from a condition wherein program reproduction is being performed in the top portion of the section of addresses Lg to Lg+L6 of the track TR #3, the display starting position of the picture file Picture #3 corresponding to the track TR #2, in this instance, the address ad(2, 3)=Le, is accessed to reproduce the track TR #2 from the top and simultaneously display the picture file Picture #3.

By the way, particularly in the case of the track TR #2 as a track to whose top a display starting timing of a picture file is prescribed, ofst(2, 1)=L4=0, and ad(2, 0)=ad(2, 1). Here, for example, if a case wherein accessing to the top of the track TR #2 is to be performed as the processing in step S211 described hereinabove is considered, the address ad(2, 0) is accessed in step S211, and after the accessing, CurP changes from CurP=0 to CurP=1 immediately. In other words, it is considered that the address changes from ad(2, 0) to ad(2, 1) immediately. By handling the parameter in this manner, in step S209 following step S211, the picture file Picture #2 is displayed simultaneously with starting of reproduction of the track TR #2.

If it is discriminated in step S204 that the portion immediately after the address ad(CurTr, CurP) is not being reproduced, then the control advances to step S212 so that processing for accessing the address ad(CurTr, CurP) to perform program reproduction is executed.

In particular, the address of the track corresponding to the reproduction starting time of the picture file being reproduced at present is accessed to perform program reproduction. For example, in the case of FIGS. 23A, 23B, 23C, 23D and 23E, 30G and 30H, from a condition wherein positions of the track TR #1 and the picture file Picture #2 later than the top of the reproduction section (in the proximity of a position immediately after the address La+L2) are being reproduced, the top (address La+L2) of the picture file Picture #2 and a corresponding portion of the track TR #2 are accessed to start reproduction. During the accessing operation, the displaying of the picture file Picture #2 is continued, and control processing for starting a display of a picture file (display switching) is not executed particularly.

If CurP set in step S202 described above satisfies CurP=0, then the address ad(CurTr, 0) is accessed in step S212. In other words, the access point is returned to the top of the current track to start program reproduction. In the case of FIGS. 23A, 23B, 23C, 23D and 23E, 30I and 30J, this corresponds to an operation when, for example, from a condition wherein a certain address of the track TR #3 later than the top portion in the reproduction section of the addresses Lg to Lg+L6 is being reproduced, the start address Lg of the track TR #3 is accessed to start reproduction. In short, an operation including a program reference search, which is an operation of the AUX data file/program reference mode, is obtained also here.

If it is discriminated in step S203 that reverse accessing should not be performed, then the system controller 11 advances the control to step S213. In step S213, the system controller 11 discriminates whether or not CurP=np(CurTr) is satisfied, or in other words, whether or not the picture file being reproduced at present is a picture file to be reproduced last in the reproduction order on the track.

If a negative result is obtained in step S213, then the system controller 11 advances the control to step S214, in which it reads out a picture file designated by pn(CurTr, CurP+1) from the buffer memory 13 and places it into a display waiting state. The picture file pn(CurTr, CurP+1) is a picture file next in the reproduction time to the picture file being reproduced at present on the track being reproduced at present. Then, the system controller 11 advances the control to step S215, in which it accesses the address ad(CurTr, CurP+1) to perform program reproduction. The address ad(CurTr, CurP+1) is the address of the program corresponding to the reproduction starting timing of the picture file indicated by pn(CurTr, CurP+1) above. Then, the system controller 11 advances the control to step S209, in which it starts displaying of the picture file which has been placed into the display waiting state in step S214 described above.

The processing in steps S213→S214→S215→S209 corresponds, in the case of FIGS. 23A, 23B, 23C, 23D and 23E, 30K and 30L, to an operation wherein, for example, when the AUX data file search key 23*c* is operated during reproduction of the track TR #1 (CurTr=1) and the picture file Picture #2 (CurP=2), the picture file Picture #4 (CurP+1=4) is displayed and program reproduction is started simultaneously from the address Lc+L3−(Lb−La) of the track TR #1 (CurTr=1) at the display starting timing of the picture file Picture #4 in response to the operation of the AUX data file search key 23*c*.

On the other hand, if an affirmative result is obtained in step S213 and consequently it is determined that the picture file being reproduced at present is a picture file to be reproduced last in the reproduction order on the track, then the system controller 11 advances the control to step S216.

Here, an affirmative result is obtained when the track (CurTr) being reproduced at present is the last track and also the picture file (CurP) being reproduced at present is the last file corresponding to the current track. In this instance, this routine is ended without particularly executing any further processing. In other words, the operation of the AUX data file search key 23*c* based on which the discrimination in step S201 has been made is invalidated or ignored. The processing of ending the routine after the processing in steps S213→S216 is illustrated in FIGS. 30M and 30N. Even if the AUX data file search key 23*c* is operated during reproduction of the track TR #3 and the picture file Picture #3, the operation is ignored and reproduction of the track TR #3 and the picture file Picture #3 is continued as it is.

On the other hand, a negative result is obtained in step S216 when the track (CurTr) being reproduced at present is not the last track although the picture file (CurP) being reproduced at present is the last file corresponding to the current track.

Accordingly, in this instance, the system controller 11 advances the control to step S217, in which it accesses the address ad(CurTr+1, 0) to perform program reproduction, and then the present routine is ended. In other words, the top of a track next to the track (CurTr) being reproduced at present is accessed. The processing in steps S213→S216→S217 corresponds to an operation wherein, in the case of FIGS. 30O and 30P, when the AUX data file search key 23*c* is operated during reproduction of the track TR #2 and the picture file Picture #3, program reproduction is started from the top of the track TR #3 and the picture file Picture #0. Here, for example, where there is a picture file whose display start timing is prescribed to the top of a track like the track TR #2 in FIGS. 23A, 23B, 23C, 23D and 23E, after accessing to the address ad(CurTr+1, 0), it is regarded that a transition from CurP=0 to CurP=1 occurs immediately as described above, and consequently, it is handled that a transition from the address ad(CurTr+1, 0) to the address ad(CurTr+1, 1) occurs immediately. Consequently, by a required processing operation after the present routine is ended, control processing is executed such that the picture file at pn(CurTr, 1) is read out from the buffer memory 13 and displayed immediately after accessing to the address ad(CurTr+1, 0).

It is to be noted that, while, in the embodiment described above, only picture files are searched in a search with reference to AUX data files, the recording apparatus of the present embodiment is constructed such that it can reproduce also text files as AUX data files. Accordingly, where the manner of management of text files with the AUX-TOC described above is presumed, also an apparatus wherein text files are searched in a search with reference to AUX data files is included in the present invention. Further, it is otherwise possible to construct a recording apparatus such that it searches both of picture files and text files in a search with reference to AUX data files.

Further, as described in connection with the embodiment above, a search with reference to AUX data files has two available modes including the operation mode wherein a search operation with reference to AUX data files is performed at all, that is, the AUX data file reference mode, and the operation mode wherein a search operation with reference to AUX data files includes also a search with reference to programs, that is, the AUX data file/program reference mode. Thus, the recording apparatus may be constructed such that one of the operation modes can be selected arbitrarily by an operation of a user.

Further, in the present invention, when a search is performed with reference to data files, reproduction of a program is started without fail from an address corresponding to a reproduction outputting starting time of a data file searched out, depending upon a manner of utilization, it is possible to adopt another construction wherein, as a search operation with reference to data files, only data files are displayed or outputted in accordance with the order of reproduction prescribed for the programs while corresponding reproduction of program sound is not performed.

Further, while it is described in the embodiment above that all data files as AUX data are read out and stored into the buffer memory 13, for example, upon loading of a disc, the recording and reproduction apparatus of the present embodiment may alternatively be constructed such that, since reading out of data from the disc is performed intermittently while the accumulated amount of audio program data stored in the buffer memory 13 is supervised, a reproduction operation is performed in such a manner that, for example, a preferential order is provided to the programs to be read out from the disc in accordance with the reproduction proceeding time of the programs to be reproduced, and when the accumulated amount is comparatively small, the AUX data files are read out in accordance with the preferential order from the disc and stored into the buffer memory 13, but if the accumulated amount of audio data in the buffer memory 13 becomes comparatively large, then a reading out operation of the audio data from the disc is switchably performed. In this instance, for example, upon reproduction of audio data immediately after a disc is loaded, there is no need of waiting for completion of accumulation of AUX data files into the buffer memory 13, and therefore, audio reproduction can be started rapidly as much.

Further, while, in the embodiment described above, the present invention is applied to a recording and reproduction apparatus which allows recording and reproduction onto and from a disc, the present invention can naturally be applied to a reproduction only apparatus.

As described above, according to the present invention, a reproduction apparatus includes program reference search means for allowing reproduction of, for example, main data as audio programs and synchronous reproduction of data files of images, character information or the like as sub data whose reproduction outputting times with respect to reproduction times of the main data are prescribed and for accessing a start address of an object program with reference to the programs of the main data to start reproduction, and data file reference accessing means for accessing an address of a program corresponding to a reproduction starting time of a data file whose reproduction time is prescribed with respect to a reproduction time of the program.

Consequently, for example, as a search operation responsive to a searching operation of a user, a search operation by the data file reference accessing means wherein the search operation is performed with reference to a reproduction start time of a data file is realized in addition to an ordinary search operation by the program reference search means which is performed in a unit of a program. Further, if both of the program reference search means and the data file reference accessing means according to the present invention are used, also a search operation which is performed with reference to both of program files and data files, that is, the AUX data file/program reference mode, is realized.

Since such variations of search functions are obtained, it is possible for a user not only to perform, for example, a search with reference to programs as in the prior art, but also, for example, to search and display data files in accordance with reproduction times prescribed with reference to reproduction times of programs and listen to and confirm reproduction sound of programs synchronized with reproduction outputting times of the searched data files. Such a search function with reference to data files is particularly useful to a reproduction apparatus having a function of reproducing and displaying data files as sub data in synchronism with program reproduction of main data, and this significantly augments the convenience of use to the user.

While a preferred embodiment of the present invention has been described using specific terms, such description is for illustrative purposes only, and it is to be understood that changes and variations may be made without departing from the spirit or scope of the following claims.

What is claimed is:

1. A reproduction apparatus for reproducing main data, sub data related to the main data, and management data for managing the main data and a reproduction start point of the sub data from a recording medium, comprising:

reproduction means for reproducing the main data, the sub data, and the management data on the recording medium;

first input means for inputting a search operation to a top portion of a unit of the main data;

second input means for inputting a search operation to a top portion of a unit of the sub data;

calculation means for calculating a reproducing start position of the main data corresponding to the searched top portion of the sub data in accordance with the management data; and control means for controlling said reproduction means to access the reproducing start position of the main data based on a calculation result of said calculation means when the second input means is operated during a synchronized reproduction of a predetermined unit of the main data and a corresponding unit of the sub data.

2. A reproduction apparatus according to claim 1, wherein, when an instruction to perform a search in a feeding direction is inputted by said second input means during reproduction of a unit, which is positioned at the most rearward position, of the sub data to be reproduced in synchronism with one of two adjacent units of the main data which is positioned forwardly with respect to the other, said control means feeds, based on the reproducing start position calculated by said calculation means, said reproduction means to a top portion of the rearwardly positioned unit of the main data.

3. A reproduction apparatus according to claim 1, further comprising top portion discrimination means for discriminating whether or not a top portion of a unit of the sub data to be reproduced in synchronism with a unit of the main data being reproduced is being reproduced, and wherein, when an instruction to perform a search in a direction reverse to a feeding direction is inputted by said second input means while said top portion discrimination means discriminates that the unit, which is positioned at the most forward position, of the sub data to be reproduced in synchronism with the unit of the main data is being reproduced, said control means feeds, based on the reproducing start position calculated by said calculation means, said reproduction means to a top portion of the unit of the main data being reproduced.

4. A reproduction apparatus according to claim 1, further comprising top portion discrimination means for discriminating whether or not a top portion of a unit of the sub data to be reproduced in synchronism with a unit of the main data being reproduced is being reproduced, and wherein, when an instruction to perform a search in a direction reverse to a feeding direction is inputted by said second input means while said top portion discrimination means discriminates that a reproduction position of the unit of the sub data being reproduced in synchronism with the unit of the main data being reproduced is not in the top portion, said control means feeds, based on the reproducing start position calculated by said calculation means, said reproduction means to the top portion of the unit of the sub data being reproduced.

5. A reproduction apparatus according to claim 1, further comprising top portion discrimination means for discriminating whether or not a top portion of a unit of the sub data to be reproduced in synchronism with a unit of the main data being reproduced is being reproduced, and wherein, when an instruction to perform a search in a direction reverse to a feeding direction is inputted by said second input means while said top portion discrimination means discriminates that a top portion of a second or following unit of the sub data to be reproduced in synchronism with a unit of the main data being reproduced is being reproduced, said control means feeds, based on the reproducing start position calculated by said calculation means, said reproduction means to a top portion of a preceding unit of the sub data which is positioned immediately preceding to the second or following unit of the sub data being reproduced.

6. A reproduction apparatus according to claim 1, wherein, when an instruction to perform a search in a feeding direction is inputted by said second input means during reproduction of one of a plurality of units of the sub data to be reproduced in synchronism with a unit of the main data, said control means feeds, based on the reproducing start position calculated by said calculation means, said reproduction means to a top portion of one of the plurality of units of the sub data which is positioned immediately rearwardly of the unit of the sub data being reproduced.

7. A reproduction apparatus according to claim 1, wherein, when an instruction to perform a search in a feeding direction is inputted by said second input means during reproduction of the unit, which is positioned at the most rearward position, of the sub data to be reproduced in synchronism with a unit of the main data which is positioned at the most rearward position, said control means continues the reproduction of the unit of the sub data being reproduced as it is.

8. A reproduction method for reproducing main data, sub data related to the main data, and management data for managing the main data and a reproduction start point of the sub data from a recording medium, comprising the steps of:

reproducing the main data, the sub data, and the management data on the recording medium;

inputting a search operation to a top portion of a unit of the sub data;

calculating a reproducing start position of the main data corresponding to the searched top portion of the sub data in accordance with the management data; and accessing the reproducing start position of the main data based on a calculation result of said calculating step when the search operation to the top portion of the unit of the sub data is inputted during a synchronized reproduction of a predetermined unit of the main data and a corresponding unit of the sub data.

9. A reproduction method according to claim 8, wherein, when an instruction to perform a search in a feeding direction is inputted during reproduction of a unit, which is positioned at the most rearward position, of the sub data to be reproduced in synchronism with one of two adjacent units of the main data which is positioned forwardly with respect to the other, a reproduction position is fed to a top portion of the rearwardly positioned unit of the main data based on the reproducing start position calculated at said calculation step.

10. A reproduction method according to claim 8, further comprising a step of discriminating whether or not a top portion of a unit of the sub data to be reproduced in synchronism with a unit of the main data being reproduced is being reproduced, and wherein, when an instruction to perform a search in a direction reverse to a feeding direction is inputted while it is discriminated that the unit, which is positioned at the most forward position, of the sub data to be reproduced in synchronism with the unit of the main data is being reproduced, a reproduction position is fed, based on the reproducing start position, to the top portion of the unit of the main data being reproduced.

11. A reproduction method according to claim 8, further comprising a step of discriminating whether or not a top portion of a unit of the sub data to be reproduced in synchronism with a unit of the main data being reproduced is being reproduced, and wherein, when an instruction to perform a search in a direction reverse to a feeding direction is inputted while it is discriminated that a reproduction position of the unit of the sub data being reproduced in synchronism with the unit of the main data being reproduced is not in the top portion, the reproduction position is fed, based on the reproducing start position, to the top portion of the unit of the sub data being reproduced.

12. A reproduction method according to claim 8, further comprising a step of discriminating whether or not a top portion of a unit of the sub data to be reproduced in synchronism with a unit of the main data being reproduced is being reproduced, and wherein, when an instruction to perform a search in a direction reverse to a feeding direction is inputted while it is discriminated that a top portion of a second or following unit of the sub data to be reproduced in synchronism with a unit of the main data being reproduced is being reproduced, the reproduction position is fed, based on the reproducing start position, to a top portion of a preceding unit of the sub data which is positioned immediately preceding to the second or following unit of the sub data being reproduced.

13. A reproduction method according to claim 8, wherein, when an instruction to perform a search in a feeding direction is inputted during reproduction of one of a plurality of units of the sub data to be reproduced in synchronism with a unit of the main data, the reproduction position is fed, based on the reproducing start position to a top portion of one of the plurality of units of the sub data which is positioned immediately rearwardly of the unit of the sub data being reproduced.

14. A reproduction method according to claim 8, wherein, when an instruction to perform a search in a feeding direction is inputted during reproduction of the unit, which is positioned at the most rearward position, of the sub data to be reproduced in synchronism with a unit of the main data which is positioned at the most rearward position, the reproduction of the unit of the sub data being reproduced is continued as it is.

* * * * *